US00RE45218E

(19) United States
(12) Reissued Patent
Oshima et al.

(10) Patent Number: US RE45,218 E
(45) Date of Reissued Patent: Oct. 28, 2014

(54) OFDM SIGNAL TRANSMISSION SYSTEM, PORTABLE TERMINAL AND E-COMMERCE SYSTEM

(71) Applicant: Panasonic Corporation, Kadoma (JP)

(72) Inventors: Mitsuaki Oshima, Kyoto (JP); Kenichiro Hayashi, Kyoto (JP); Sadashi Kageyama, Hyogo (JP); Seiji Sakashita, Osaka (JP); Takao Isogawa, Kanagawa (JP); Hisashi Takayama, Osaka (JP)

(73) Assignee: Panasonic Corporation, Osaka (JP)

(21) Appl. No.: 13/645,012

(22) Filed: Oct. 4, 2012

Related U.S. Patent Documents

Reissue of:
(64) Patent No.: 7,809,407
Issued: Oct. 5, 2010
Appl. No.: 11/622,521
Filed: Jan. 12, 2007

U.S. Applications:
(62) Division of application No. 10/002,621, filed on Dec. 5, 2001, now Pat. No. 7,203,158.

(30) Foreign Application Priority Data

| | | |
|---|---|---|
| Dec. 6, 2000 | (JP) | 2000-371539 |
| Dec. 6, 2000 | (JP) | 2000-371570 |
| Dec. 28, 2000 | (JP) | 2000-403517 |

(51) Int. Cl.
*H04M 1/00* (2006.01)

(52) U.S. Cl.
USPC ..... 455/566; 455/564; 455/414.1; 455/414.2; 235/462.45; 235/462.01; 235/472.01; 235/472.02; 705/5; 705/6; 705/7.18

(58) Field of Classification Search
CPC ... G06Q 10/02; G06Q 10/1093; H04M 3/432; H04W 4/02
USPC ..... 455/556.1, 414.1, 414.2; 705/5, 6, 7.18
See application file for complete search history.

(56) References Cited

U.S. PATENT DOCUMENTS

| | | | |
|---|---|---|---|
| 5,151,692 | A | 9/1992 | Hirahara |
| 5,171,976 | A | 12/1992 | Bone, Jr. |
| 5,212,368 | A | 5/1993 | Hara |
| 5,602,377 | A | 2/1997 | Beller et al. |

(Continued)

FOREIGN PATENT DOCUMENTS

| | | |
|---|---|---|
| EP | 1605654 | 4/1997 |
| EP | 1045543 | 10/2000 |

(Continued)

OTHER PUBLICATIONS

Samsung Electronics News: Samsung Electronics Develops World's First TV Phone [online], Samsung Electronics, Dec. 1, 1999.

(Continued)

*Primary Examiner* — Vladimir Magloire
(74) *Attorney, Agent, or Firm* — Greenblum & Bernstein P.L.C.

(57) ABSTRACT

A portable terminal includes a receiver, a barcode former configured to form barcodes and a display. The barcode former forms a barcode from the data received by the receiver and the display displays the formed barcode.

20 Claims, 56 Drawing Sheets

(56) References Cited

U.S. PATENT DOCUMENTS

| | | | |
|---|---|---|---|
| 5,767,896 | A | 6/1998 | Nemirofsky |
| 5,802,241 | A | 9/1998 | Oshima |
| 5,808,694 | A | 9/1998 | Usui et al. |
| 5,864,753 | A | 1/1999 | Morita et al. |
| 5,920,053 | A | 7/1999 | DeBrouse |
| 5,930,767 | A | 7/1999 | Reber et al. |
| 5,939,699 | A | 8/1999 | Perttunen et al. |
| 5,953,047 | A | 9/1999 | Nemirofsky |
| 6,006,992 | A | 12/1999 | Watanabe et al. |
| 6,037,998 | A | 3/2000 | Usui et al. |
| 6,075,570 | A | 6/2000 | Usui et al. |
| 6,082,620 | A | 7/2000 | Bone, Jr. |
| 6,119,096 | A | 9/2000 | Mann et al. |
| 6,133,874 | A | 10/2000 | Krasner |
| 6,144,848 | A | 11/2000 | Waish et al. |
| 6,512,919 | B2 | 1/2003 | Ogawasawara |
| 6,636,888 | B1 | 10/2003 | Bookspan et al. |
| 6,732,080 | B1 | 5/2004 | Blants |
| 6,792,258 | B1 | 9/2004 | Nokes et al. |
| 6,792,292 | B1 | 9/2004 | Chatani |
| 6,810,006 | B2 | 10/2004 | Michon et al. |
| 6,898,569 | B1 | 5/2005 | Bansal et al. |
| 7,058,610 | B1 | 6/2006 | Pintsov |
| 7,139,591 | B2 | 11/2006 | Challaghan et al. |
| 7,209,955 | B1 | 4/2007 | Major et al. |
| 7,257,545 | B1 | 8/2007 | Hung |
| 8,054,218 | B2 | 11/2011 | Gelbman |
| 2001/0034717 | A1 | 10/2001 | Whitworth |
| 2001/0035971 | A1 | 11/2001 | Koakutsu et al. |
| 2002/0060246 | A1 | 5/2002 | Gobburu et al. |
| 2002/0116541 | A1 | 8/2002 | Parker et al. |
| 2009/0125429 | A1 | 5/2009 | Takayama |

FOREIGN PATENT DOCUMENTS

| | | |
|---|---|---|
| EP | 1146418 | 10/2001 |
| EP | 1161072 | 12/2001 |
| JP | 62-137912 | 6/1987 |
| JP | 63-102381 | 7/1988 |
| JP | 3-222531 | 10/1991 |
| JP | 4-82775 | 7/1992 |
| JP | 482775 | 7/1992 |
| JP | 5-45645 | 2/1993 |
| JP | 5-263558 | 10/1993 |
| JP | 7-6193 | 1/1995 |
| JP | 7-500715 | 1/1995 |
| JP | 7-129708 | 5/1995 |
| JP | 7-146646 | 6/1995 |
| JP | 7-152848 | 6/1995 |
| JP | 7152848 | 6/1995 |
| JP | 8-16740 | 1/1996 |
| JP | 08-242213 | 9/1996 |
| JP | 8-275077 | 10/1996 |
| JP | 9-149439 | 6/1997 |
| JP | 9-508993 | 9/1997 |
| JP | 9508993 | 9/1997 |
| JP | 10-49571 | 2/1998 |
| JP | 10-70479 | 3/1998 |
| JP | 10-075431 | 3/1998 |
| JP | 10-214284 | 8/1998 |
| JP | 99/009502 | 2/1999 |
| JP | 11-66222 | 3/1999 |
| JP | 1166222 | 3/1999 |
| JP | 11-127131 | 5/1999 |
| JP | 11-146393 | 5/1999 |
| JP | 11-196062 | 7/1999 |
| JP | 11-261906 | 9/1999 |
| JP | 2000-285324 | 10/2000 |
| JP | 2000-299888 | 10/2000 |
| JP | 2000299888 | 10/2000 |
| JP | 2000-306003 | 11/2000 |
| JP | 2000-324274 | 11/2000 |
| JP | 2000306003 | 11/2000 |
| JP | 2001-005883 | 1/2001 |
| JP | 2001-175904 | 6/2001 |
| JP | 2001-256388 | 9/2001 |
| JP | 2001-283117 | 10/2001 |
| JP | 2001-325468 | 11/2001 |
| JP | 2001-344545 | 12/2001 |
| JP | 2002-24865 | 1/2002 |
| JP | 2002-024445 | 2/2002 |
| WO | 92/01258 | 1/1992 |
| WO | 94/00842 | 1/1994 |
| WO | 98/25158 | 6/1998 |
| WO | 99/09778 | 2/1999 |
| WO | 00/60436 | 10/2000 |

OTHER PUBLICATIONS

Mobile Media Magazine, vol. 66, Dec. 2000, pp. 50-53, with a partial English language translation.
"News & Topics", Mobile Media Magazine, Dec. 2000, p. 13, with a partial English language translation.
""Book Bar Design", Professional DTP", Kohgaku-sha Co. Ltd., Jan. 1, 2000, Jan. issue of 2000, first print, p. 51.
U.S.A. (U.S. Appl. No. 13/780,563) Office action, mail date is Jan. 10, 2014.
U.S.A. (U.S. Appl. No. 13/780,609) Office action, mail date is Jan. 9, 2014.
U.S.A. (U.S. Appl. No. 13/780,633) Office action, mail date is Jan. 10, 2014.
U.S.A. (U.S. Appl. No. 13/737,485) Office action, mail date is Jan. 9, 2014.
U.S.A. (U.S. Appl. No. 13/780,575) Office action, mail date is Jan. 30, 2014.
Reissue U.S. Appl. No. 13/737,512, Official Action mail date Jun. 26, 2013.
Reissue U.S. Appl. No. 13/737,485, Official Action mail date Jul. 25, 2013.
Reissue U.S. Appl. No. 13/780,563, Official Action, mail date Aug. 30, 2013.
U.S.A. (U.S. Appl. No. 13/780,595) Office action, mail date is Apr. 23, 2014.
U.S.A. (U.S. Appl. No. 13/780,633) Office actions, mail date is Apr. 24, 2014.
U.S.A. (U.S. Appl. No. 13/737,485) Office action, mail date is Apr. 24, 2014.
U.S.A. (U.S. Appl. No. 13/780,609) Office action, mail date is May 8, 2014.
English Language Abstract of JP 11-127131.
English Language Abstract of JP 11-196062.
English Language Abstract of JP 11-261906.
English Language Abstract of JP 8-275077.
English Language Abstract of JP 8-16740.
English Language Abstract of JP 7-146646.
English Language Abstract of JP 2000-285324.
English Language Abstract of JP 2000-306003.
English Language Abstract of JP 10-49571.
English Language Abstract of JP 5-263558.
English Language Abstract of JP 3-222531.
English Language Abstract of JP 2001-256388.
English Language Abstract of JP 2001-325468.
English Language Abstract of JP 2001-344545.
English Language Abstract of JP 2001-17504.
English Language Abstract of JP 2001-283117.
English Language Abstract of JP 08-242213.
English Language Abstract of JP 62-13712.
English Language Abstract of JP 11-146393.
English Language Abstract of JP 2002-024445.
English Language Abstract of JP 2001-005883.
English Language Abstract of JP 10-214284.
English Language Abstract of JP 2002-24865.
English Language Abstract of JP 2002-24445.
English Language Abstract of JP 7-6193.
English Language Abstract of JP 5-45645.
English Language Abstract of JP 7-129708.
English Language Abstract of JP 10-70479.
English Language Abstract of JP 9-149439.

(56) References Cited

OTHER PUBLICATIONS

English Language Abstract of JP 2000-299888.
English language Abstract of JP 9-508993.
English language Abstract of JP 7-152848.
""Book Bar Design", Professional DTP", Kohgaku-sha Co. Ltd., Jan. 1, 2000, January issue of 2000, first print, p. 51.
English language Abstract of JP 11-66222.
English language Abstract of JP 10-075431, Mar. 17, 1998.

| MODE | 1 | | | | 2 | | | | 3 | | | |
|---|---|---|---|---|---|---|---|---|---|---|---|---|
| EFFECTIVE SYMBOL PERIOD LENGTH(μ SEC) | 252 | | | | 504 | | | | 1008 | | | |
| GUARD PERIOD RATIO | 1/32 | 1/16 | 1/8 | 1/4 | 1/32 | 1/16 | 1/8 | 1/4 | 1/32 | 1/16 | 1/8 | 1/4 |
| GUARD PERIOD LENGTH (μ SEC) | 7.875 | 15.75 | 31.5 | 63 | 15.75 | 31.5 | 63 | 126 | 31.5 | 63 | 126 | 252 |

FIG. 4

TMCC INFORMATION

| BIT ASSIGNMENT | DESCRIPTION | |
|---|---|---|
| B20~B21 | SYSTEM DESCRIPTION | |
| B22~B25 | TRANSMISSION PARAMETER SWITCHING INDEX | |
| B26 | EMERGENCY ALARM BROADCASTING START FLAG | |
| B27 | CURRENT INFORMATION | PARTIAL RECEPTION FLAG |
| B28~B40 | | LAYER A TRANSMISSION PARAMETER INFORMATION |
| B41~B53 | | LAYER B TRANSMISSION PARAMETER INFORMATION |
| B54~B66 | | LAYER C TRANSMISSION PARAMETER INFORMATION |
| B67 | NEXT INFORMATION | PARTIAL RECEPTION FLAG |
| B68~B80 | | LAYER A TRANSMISSION PARAMETER INFORMATION |
| B81~B93 | | LAYER B TRANSMISSION PARAMETER INFORMATION |
| B94~B106 | | LAYER C TRANSMISSION PARAMETER INFORMATION |
| B107~B121 | RESERVED | |

TRANSMISSION PARAMETER INFORMATION

| DESCRIPTION | NUMBER OF BITS |
|---|---|
| CARRIER MODULATION SYSTEM | 3 |
| CONVOLUTIONAL CODING RATE | 3 |
| INTERLEAVE LENGTH | 3 |
| NUMBER OF SEGMENTS | 4 |

FIG. 7

CONTENT OF PROGRAM INFORMATION

| CONTENTS INFORMATION | | CHANNEL SELECTION INFORMATION | | TIME INFORMATION | |
|---|---|---|---|---|---|
| TITLE | GENRE | FREQUENCY INFORMATION | TRANSMISSION INFORMATION | START TIME | END TIME |
| ○○○ | SPORTS | F0 | M0 | Ts0 | Te0 |
| ×××  | DRAMA | F1 | M1 | Ts1 | Te1 |
| △△△ | MUSIC | F2 | M2 | Ts2 | Te2 |
| ⋮ | ⋮ | ⋮ | ⋮ | ⋮ | ⋮ |

FIG. 14

FIG. 20(a) NORMAL BROADCASTING STATION

FIG. 20(b) DATA BROADCASTING THROUGH PARTIAL TRANSMISSION BY NORMAL BROADCASTING STATION

FIG. 20(c) DEDICATED DATA BROADCASTING STATION

TRANSMISSION INFORMATION PATTERN FILE

| OVERALL PATTERN NUMBER EXAMPLE | 554 1ST PATTERN NUMBER | 526 1ST TRANSMISSION INFORMATION: FFT SIZE | GUARD RATIO | PARTIAL BROADCASTING IDENTIFIER | OPERATING FREQUENCY | 555 2ND PATTERN NUMBER | 525 2ND TRANSMISSION INFORMATION: MODULATION SYSTEM | CODING RATE | TIME INTERLEAVE LENGTH | 610 OPERATING FREQUENCY CONTROL TABLE: OVERALL OPERATING FREQUENCY | 1ST CH-ID | FREQUENCY INFORMATION | 609 2ND CH-ID | FREQUENCY INFORMATION | 3RD CH-ID | 614 FREQUENCY INFORMATION | 615 LATEST OPERATION TIME CONTROL TABLE: LATEST | 616 2ND LATEST | 613 3RD LATEST |
|---|---|---|---|---|---|---|---|---|---|---|---|---|---|---|---|---|---|---|---|
| | 1 | 2K | 1/8 | 1 | | 1 | DQPSK | 1/2 | 0.25 | | 14-1 | 1.5 | 24-2 | 0.8 | 4-3 | 0.6 | 14-1 | 14-1 | |
| | 2 | 4K | 1/32 | 0 | | 2 | 64QAM | 5/6 | 0.5 | | 26-1 | | | | | | | | |
| | 3 | 8K | 1/16 | 1 | | 3 | 16QAM | 2/3 | 0.125 | | | | 14-1 | 0.5 | | | 14-1 | | 14-1 |
| | 4 | 4K | 1/16 | 1 | | 4 | DQPSK | 2/3 | 0.5 | | | | | | 149 | 0.3 | | 14-1 | 14-1 |
| | | | | | | 5 | 64QAM | | | | | | | | | | | | |
| | • | | | | | — | | | | | | | | | | | | | |
| | • | | | | | — | | | | | | | | | | | | | |
| | • | | | | | — | | | | | | | | | | | | | |
| | • | | | | | — | | | | | | | | | | | | | |
| 16x16 MODES | 16 | | | | | 16 | | | | | | | | | | | | | |
| 8BIT = 1BYTE | 16 = 4BIT | | | | | 16 = 4BIT | | | | | | | | | | | | | |

FIG. 22

| FIG. 24-1 | FIG. 24-2 |
|---|---|

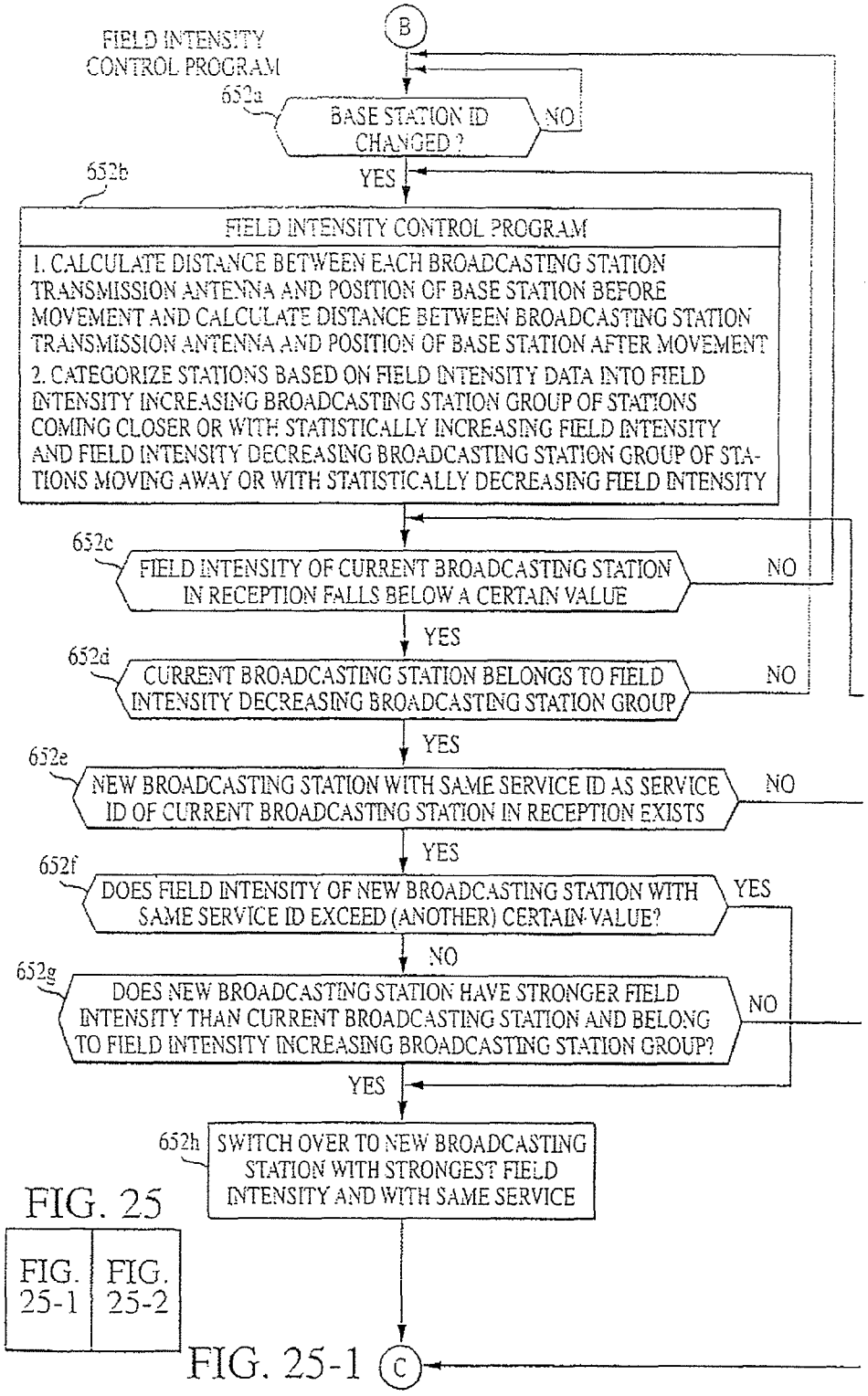
B
FIELD INTENSITY CONTROL PROGRAM
652a
BASE STATION ID CHANGED ?
NO
YES
652b
FIELD INTENSITY CONTROL PROGRAM
1. CALCULATE DISTANCE BETWEEN EACH BROADCASTING STATION TRANSMISSION ANTENNA AND POSITION OF BASE STATION BEFORE MOVEMENT AND CALCULATE DISTANCE BETWEEN BROADCASTING STATION TRANSMISSION ANTENNA AND POSITION OF BASE STATION AFTER MOVEMENT
2. CATEGORIZE STATIONS BASED ON FIELD INTENSITY DATA INTO FIELD INTENSITY INCREASING BROADCASTING STATION GROUP OF STATIONS COMING CLOSER OR WITH STATISTICALLY INCREASING FIELD INTENSITY AND FIELD INTENSITY DECREASING BROADCASTING STATION GROUP OF STATIONS MOVING AWAY OR WITH STATISTICALLY DECREASING FIELD INTENSITY
652c
FIELD INTENSITY OF CURRENT BROADCASTING STATION IN RECEPTION FALLS BELOW A CERTAIN VALUE
NO
YES
652d
CURRENT BROADCASTING STATION BELONGS TO FIELD INTENSITY DECREASING BROADCASTING STATION GROUP
NO
YES
652e
NEW BROADCASTING STATION WITH SAME SERVICE ID AS SERVICE ID OF CURRENT BROADCASTING STATION IN RECEPTION EXISTS
NO
YES
652f
DOES FIELD INTENSITY OF NEW BROADCASTING STATION WITH SAME SERVICE ID EXCEED (ANOTHER) CERTAIN VALUE?
YES
NO
652g
DOES NEW BROADCASTING STATION HAVE STRONGER FIELD INTENSITY THAN CURRENT BROADCASTING STATION AND BELONG TO FIELD INTENSITY INCREASING BROADCASTING STATION GROUP?
NO
YES
652h
SWITCH OVER TO NEW BROADCASTING STATION WITH STRONGEST FIELD INTENSITY AND WITH SAME SERVICE
FIG. 25
FIG. 25-1
FIG. 25-2
FIG. 25-1
C

| FIG. 28-1 | FIG. 28-2 |
|---|---|

MENU SCREEN
590
BC CODE
MENU

BC MODE
590
501
BC MODE
NEXT SCREEN
592a
COUPON REGISTRATION NUMBER
592
21218 50563403
725
726
727
592
593
1
2
3
4
5
6
7
8
9
*
0

BC
T
BC MODE
T MODE
736
Airline Ticket List
From WAS To NYC
Flight | Fee | Time | Seat
1. UAO162 | 99 | 14:10 | 14B
2. DLO617 | 110 | 16:20 | 33D
3. AM1612 | 130 | 18:10 | 25F
3. HM951 | 150 | 13:00 | 29A Ticket List
PLACE: 52nt ST, Broad way
Theater | Name | Fee | Time | Seat
1. Fontain | "Root" | 50 | 19:00
2. Max51 | "Dogs" | 55 | 19:30
3. Silver | "Kings" | 60 | 19:30

Attraction List
Attraction | Time | No. | Area
1. Cable Car | 11:30 | 14 | A
2. Jet coaster | 13:00 | 4 | B
3. Stream | 14:15 | 2 | D

MENU SCREEN

BC MODE

| FIG. 41-1 | FIG. 41-2 |
|---|---|

DATA STRUCTURE OF ELECTRONIC MONEY

DATA STRUCTURE OF ELECTRONIC MONEY DISPLAYED WITH BARCODE

OFDM SIGNAL TRANSMISSION SYSTEM, PORTABLE TERMINAL AND E-COMMERCE SYSTEM

Matter enclosed in heavy brackets [ ] appears in the original patent but forms no part of this reissue specification; matter printed in italics indicates the additions made by reissue.

CROSS-REFERENCE TO RELATED APPLICATION

The present application is a divisional application of pending U.S. patent application Ser. No. 10/002,621, filed on Dec. 5, 2001, which claims priority based upon Japanese Patent Application Nos. 2000-371539 filed on Dec. 6, 2000, 2000-371570 filed on Dec. 6, 2000; and 2000-403517 filed on Dec. 28, 2000, the contents of which are expressly incorporated by reference herein in their entirety.

*NOTICE: More than one reissue application has been filed of U.S. Pat. No. 7,809,407. In particular, continuation reissue application Ser. Nos. 13/737,485, 13/737,512 and 13/737,531 were each filed on Jan. 9, 2013. Additionally, further continuation reissue applications Ser. Nos. 13/780,563, 13/780,633, 13/780,609, 13/780,595, and 13/780,575 were each filed on Feb. 28, 2013.*

BACKGROUND OF THE INVENTION

1. Field of the Invention

The present invention relates to an OFDM signal transmission system used for digital terrestrial broadcasting and electronic commerce using communications.

2. Description of the Related Art

Regardless of the type of a transmission path such as satellite, cable and terrestrial, broadcasting is being digitalized more and more on a worldwide scale in recent years. Of these digital broadcasting systems, the European and Japanese digital broadcasting systems use an Orthogonal Frequency Division Multiplex (hereinafter referred to as "OFDM") transmission system.

The OFDM transmission system modulates multiple carriers orthogonal to one another with information to be transmitted for every symbol period, multiplexes those modulated signals and transmits the multiplexed signal. When the number of carriers used increases, the symbol period of each modulated signal becomes extremely long, and therefore the OFDM transmission system is characterized in that it is less susceptible to multi-path interference.

Furthermore, the OFDM transmission system provides a redundant period called a "guard period" for every symbol period, thereby prevents interference between symbols and further enhances resistance to multi-path interference. Such a redundant period can be provided because the symbol period of an OFDM signal is extremely long and a reduction of the transmission capacity due to the addition of the redundant period can be confined within an allowable range.

FIG. [48] *1* is a schematic view showing a configuration of an OFDM signal. Hereinafter, a period necessary to transmit information will be referred to as an "effective symbol period and the effective symbol period plus a guard period" as a whole will be referred to as a "symbol period". As shown in the hatching in the figure, the guard period of the OFDM signal is a cyclic copy of the last part (copy part) of the effective symbol period.

Then, FIG. [49] *2* will explain how the guard period increases the resistance to multi-path interference. A desired signal or a delay signal in the figure denotes an OFDN signal that has arrived with a time difference of $\tau$ and G1 and G2 denote guard periods of the first and second symbols respectively and S0, S1 and S2 denote effective symbol periods of the 0th, first and second symbol respectively. Here, the desired signal and the delay signal receive different symbols during period A and period B and receive the same signal during period C. That is, as far as time difference $\tau$ is shorter than the guard period, interference between symbols by the delay signal remains within the guard period and never adversely affects the effective symbol period of the desired signal.

Using the OFDM transmission system as the transmission system for digital terrestrial broadcasting makes it possible to implement an SFN (Single Frequency Network) that constructs a relay network using a single frequency by capitalizing on this feature of high resistance to multi-path interference and use frequency resources effectively.

FIG. [50(a)] *3*(*a*) shows a case where a large-scale SFN is constructed using a high power relay station and FIG. [50(b)] *3*(*b*) shows a case where a small-scale SFN is constructed using a small power relay station. When FIG. [50(a)] *3*(*a*) is compared with FIG. [50(b)] *3*(*b*), the distance between relay station 1A and relay station 2A is larger in FIG. [50(a)] *3*(*a*) and the time difference until a broadcast signal arrives from the respective relay stations at reception point 3A is also greater. Therefore, constructing the large-scale SFN shown in FIG. [50(a)] *3*(*a*) requires a longer guard period than constructing the small-scale SFN shown in FIG. [50(b)] *3*(*b*).

However, taking a longer guard period requires an increased redundant time accordingly, and for all the increased symbol period based on the OFDM transmission system, reducing the transmission capacity poses a problem when high definition television (hereinafter referred to as "HDTV") video signals with a high volume of information are broadcast.

Therefore, when minimizing the reduction of transmission capacity due to a guard period to construct a large-scale SFN, it is advantageous to take a longer symbol period.

On the other hand, the digital terrestrial broadcasting system in Japan adopts Differential Quaternary Phase Shift Keying (hereinafter referred to as "DQPSK") or time interleave that scatters data of symbols adjacent in terms of time as the modulation system of each carrier, and thereby allows stable reception even in a mobile unit reception environment where the transmission path characteristic changes with time.

In this case, a shorter symbol period is less susceptible to time variations and allows stable reception performance even during a high-speed movement.

Thus, an optimal symbol period length varies depending on the service contents when HDTV video images are broadcast using a large-scale SFN or when services are broadcast to a mobile unit traveling at high speed, etc.

In order to respond to such a demand, as shown in FIG. [51] *4*, the digital terrestrial broadcasting system in Japan provides three types of mode with different effective symbol period lengths and four types of guard period ratio (ratio of guard period length to effective symbol period length) for the respective modes. Hereafter, this combination of a total of 12 types will be referred to as "transmission mode". Of these types, for example, both the guard period ratio 1/8 and the guard period ratio 1/4 in mode 3 have the same guard period length of 126 μsec.

Once the locations of relay stations of a broadcaster are determined, it is possible to estimate a maximum value of differences in time required for a broadcast signal to arrive from each relay station at a reception point within the service area and a necessary guard period length is determined from the numerical value. This numerical value varies from one relay network to another, and therefore the guard period length and the accompanying effective symbol period length may vary depending on the region or broadcaster etc.

Furthermore, when the guard period length determined by a relay station is, for example, aforementioned 126 μsec, the broadcaster can select whether the guard period ratio in mode 3 should be set to 1/8 or the guard period ratio in mode 2 should be set to 1/4. At this time, it is also possible to switch between these two transmission modes depending on the service content of a program, for example, using the guard period ratio 1/8 in mode 3 to increase the transmission capacity for a program broadcasting HDTV images and the guard period ratio 1/4 in mode 2 to provide services to high-speed mobile units stably for a program broadcasting services for mobile units.

Furthermore, after a broadcasting service is started, when the distance between relay stations decreases due to additions of relay stations and the aforementioned time difference decreases, the necessary guard period length also decreases. However, since the guard period is a redundant period which would originally be unnecessary for transmission of information, the guard period length is naturally changed to a minimum necessary length from the standpoint of effective use of frequency resources.

As shown above, the transmission mode expressed by a combination of the effective symbol period length and guard period ratio may vary depending on the region or broadcaster and a certain broadcaster may also change with time.

On the other hand, demodulation processing for an OFDM signal on the receiving side extracts only the period necessary for demodulation from a received signal, applies Fast Fourier Transform (hereinafter referred to as "FFT") to the signal, thereby separates the carriers sent after being multiplexed and then applies detection processing according to each carrier modulation system. In the process of that processing, the transmission mode such as an effective symbol period length and guard period ratio constitutes indispensable information.

Thus, when the transmission mode of a received signal is unknown, the method for automatically acquiring the aforementioned transmission mode information from the received signal itself through signal processing is disclosed in Patent Gazette No. 2863747 or Patent Gazette No. 2879034, etc.

The prior arts disclosed in these literatures take advantage of the fact that a guard period of an OFDM signal is a cyclic copy of a signal at the tail of an effective symbol period, calculate a correlation between the received signal and a signal obtained by delaying the received signal by an estimated effective symbol period length, analyze the waveform of this correlation signal, and thereby decide the effective symbol period length and guard period length.

Conventionally, people have been conducting various kinds of electronic commerce, for example, purchasing products using a communication network such as the Internet. In such electronic commerce, products to be traded are posted on a homepage, for example. The user accesses this homepage from his/her own terminal over the Internet, selects a product to be purchased and at the same time enters user information that identifies the user.

Then, the user enters a credit number and an ID during a settlement period and specifies a settlement method such as payment on delivery. A homepage operating organization (center) authorizes the placement of an order for the product upon completion of such entries and a supplier that has received the order delivers the product to the user and receives payment according to the specified settlement method.

However, according to the transmission system using the aforementioned OFDM system, an OFDM signal is received and then the transmission mode is decided from the received signal, and therefore the time after the user selects desired information until the user receives the information includes a time for the above-described decision. which prevents quick response to the user's demand.

Furthermore, when a broadcaster switches between transmission modes according to the service content of a program as described above, demodulation processing is temporarily broken up immediately after the switchover and it is not until transmission mode decision processing is recovered from that state and the decision result is obtained that it is possible to output information after the switchover of the transmission mode, and therefore a supply of information to the user is suspended for a long time.

Furthermore, the aforementioned electronic commerce using a communication network involves problems concerning security and complexity of settlement. With regard to the security with the use of a credit card, there is concern about falsification, etc. With regard to settlement, settlement with a simpler procedure is accompanied by lower reliability of security. On the other hand, attempting to achieve both the security and ease of settlement results in an increase in the scale of system configuration.

SUMMARY OF THE INVENTION

It is an object of the present invention to provide an electronic commerce system with a simple configuration capable of achieving both reliability of security and ease of settlement.

This object is attained by providing a portable terminal with a reception section for receiving product information and service information and a barcode formation section for forming a barcode based on the received information, displaying the barcode formed by the barcode formation section on a display section, reading this barcode using a barcode reader provided for a terminal at a shop, etc. and thereby conducting electronic commerce.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 3(*b*) is a schematic diagram showing a configuration of a small-scale SFN;

FIG. 4 illustrates a ratio of a guard period length to an effective symbol period length in each mode according to a digital terrestrial broadcasting system;

FIG. 7 illustrates a content of TMCC information;

FIG. 8(*b*) is a flowchart showing an audiovisual mode of the CPU in FIG. 5;

FIG. 14 illustrates a content of program information;

FIG. 18(*b*) illustrates reception data in communication mode;

FIG. 20(*b*) illustrates bands of a broadcasting station that carries out partial broadcasting;

FIG. 20(*c*) illustrates a band diagram of a dedicated data broadcasting station;

FIG. 22 illustrates a transmission information pattern table, frequency control and time control tables;

FIG. 31(*b*) illustrates a screen in barcode mode;

FIG. 31(*c*) illustrates an airplane ticket selection screen;

FIG. 31(*d*) illustrates a musical entertainment selection screen;

FIG. 31(*e*) illustrates an attraction selection screen;

FIG. 32(*b*) illustrates pixels of the main display section;

FIG. 32(*c*) illustrates pixels of a sub-display section;

FIG. 32(*d*) illustrates a display pitch of a sub-display section;

FIG. 33(*b*) illustrates an B-B' sectional view of the display element in FIG. 32;

FIG. 39(*b*) illustrates a screen in barcode mode;

FIG. 42(*b*) illustrates a barcode display;

FIG. 43(*b*) is a timing chart of a barcode screen display when a barcode is displayed at intervals only at the start of data;

FIG. 45(*b*) illustrates a detection signal by a barcode reader;

FIG. 45(*c*) illustrates a quantity of reflected light;

FIG. 46(*b*) illustrates a data structure of encrypted electronic money;

FIG. 48(*b*) is a flow chart showing a processing procedure of a POS terminal that selectively establishes a communication session through a local radio communication with a barcode;

FIG. 49(*b*) is a flow chart showing a processing procedure of a POS terminal that establishes a communication session through a local radio communication by displaying a random number as a session ID with a barcode;

DETAILED DESCRIPTION OF THE PREFERRED EMBODIMENTS

Figure 1:
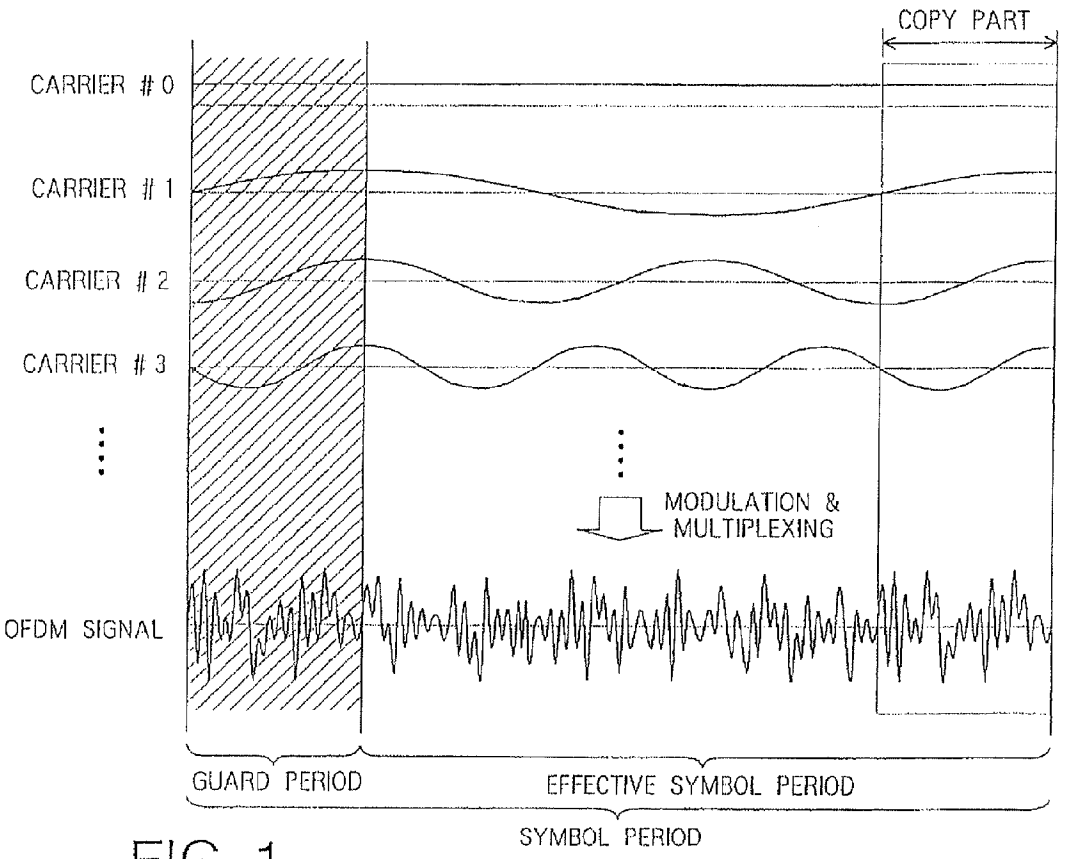
FIG. 1 is a schematic diagram showing a conventional configuration of an OFDM signal.
Figure 2:
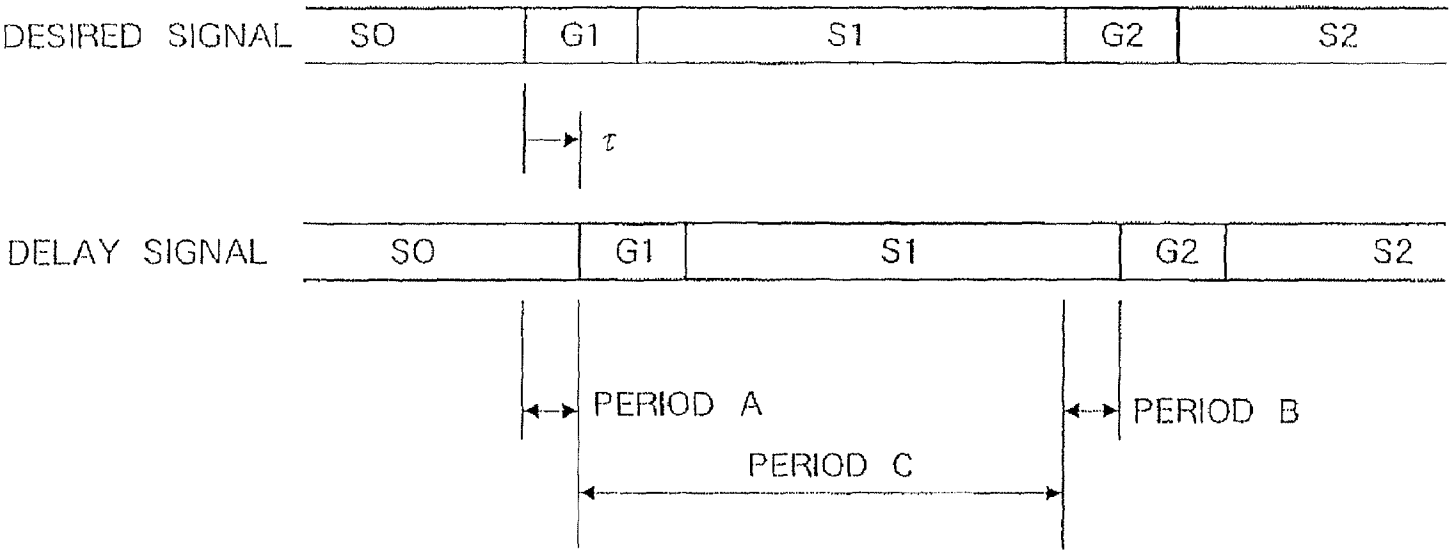
FIG. 2 is a schematic diagram illustrating an effect of a guard period.
Figure 3A:
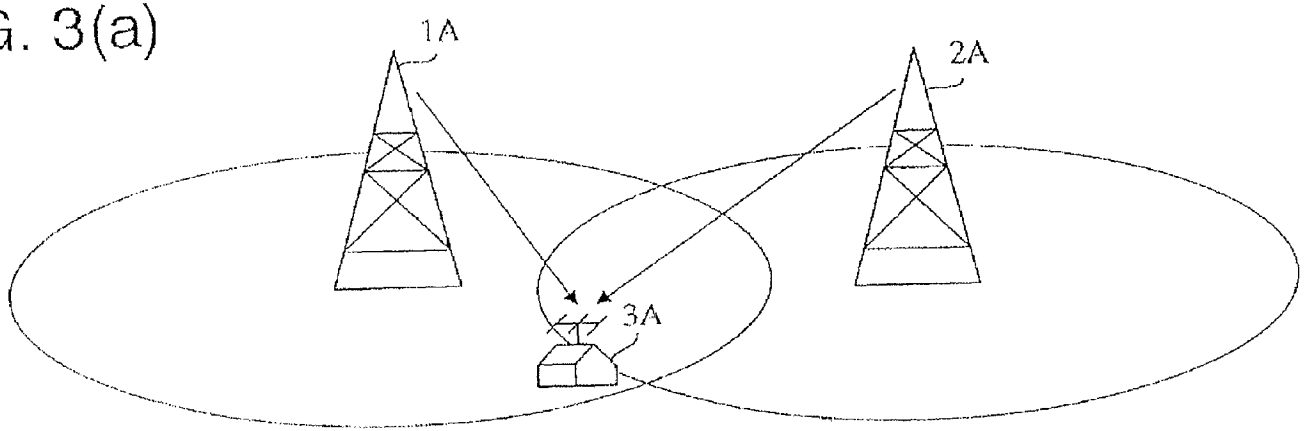
FIG. 3(*a*) is a schematic diagram showing a configuration of a large-scale SFN.
Figure 3B:
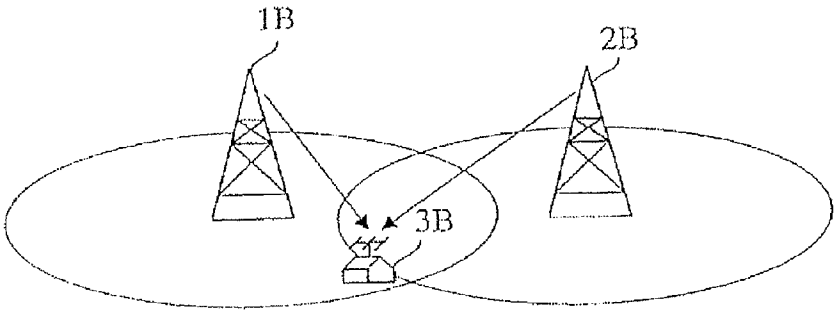
Figure 5:
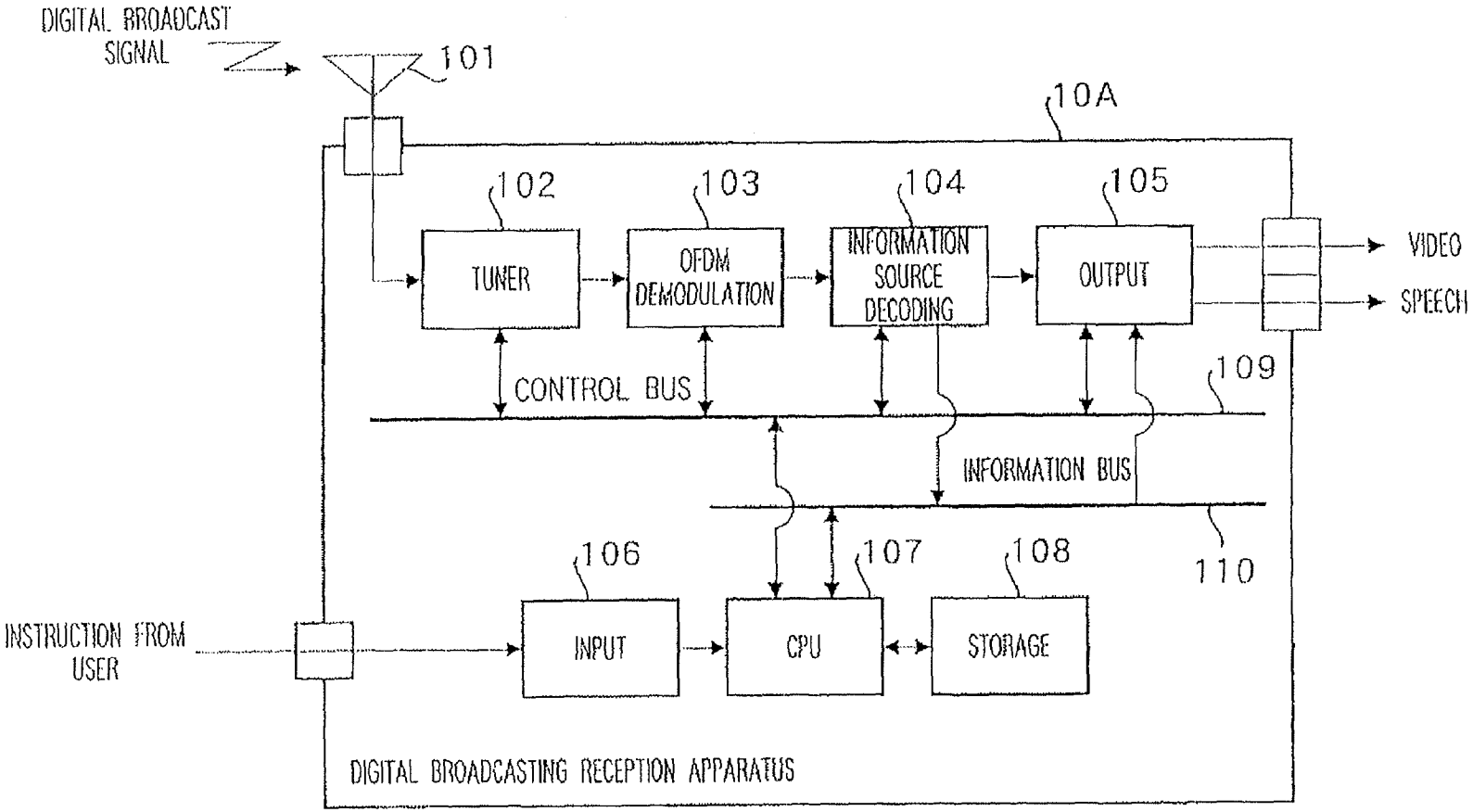
FIG. 5 is a block diagram showing a configuration of a digital terrestrial broadcasting reception apparatus according to a first embodiment of the present invention.
Figure 6:
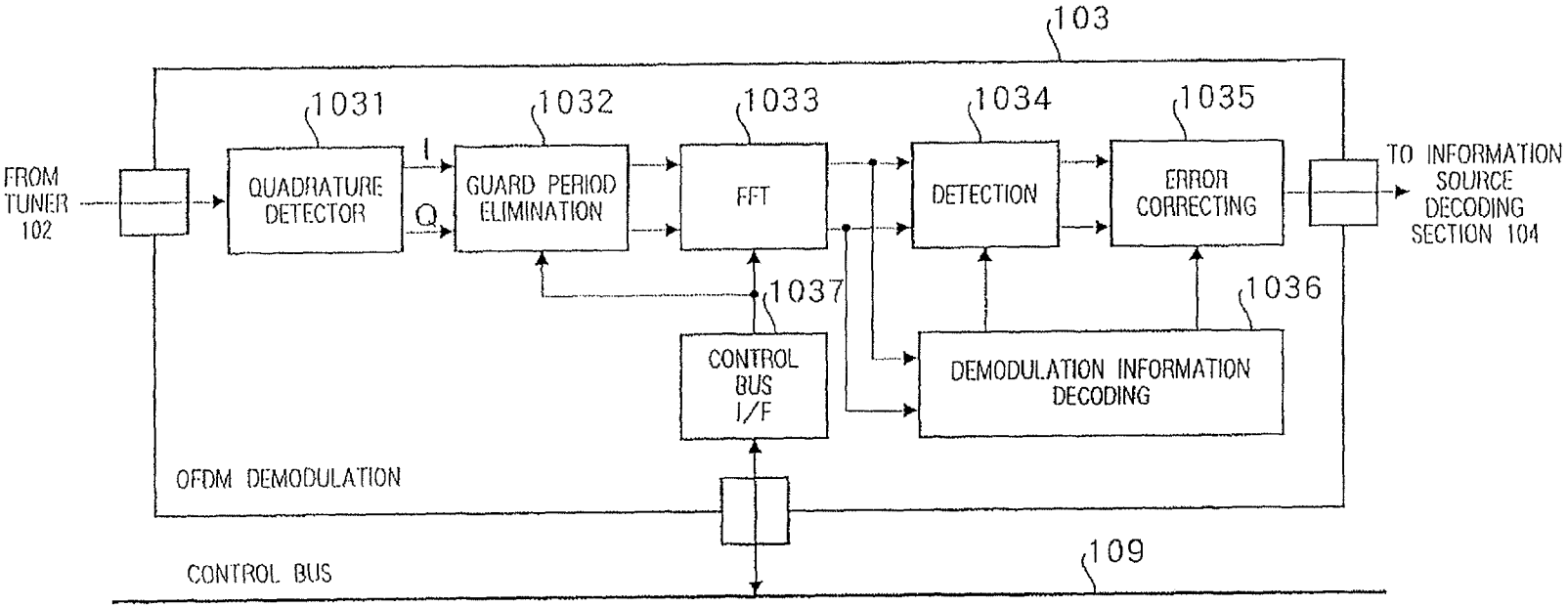
FIG. 6 is a block diagram showing an internal configuration example of the OFDM demodulation section in FIG. 5.
Figure 8:
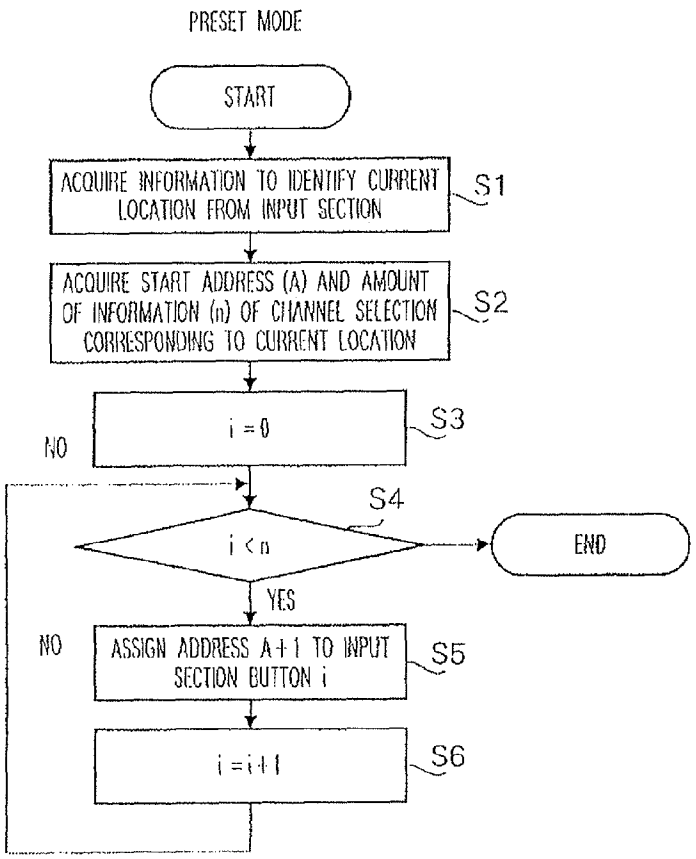
FIG. 8(*a*) is a flow chart showing a preset mode of the CPU in FIG. 5.
Figure 8:
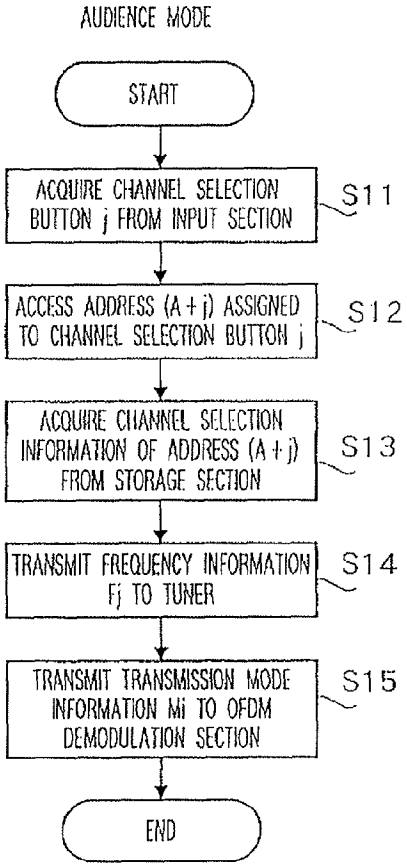
Figure 9:
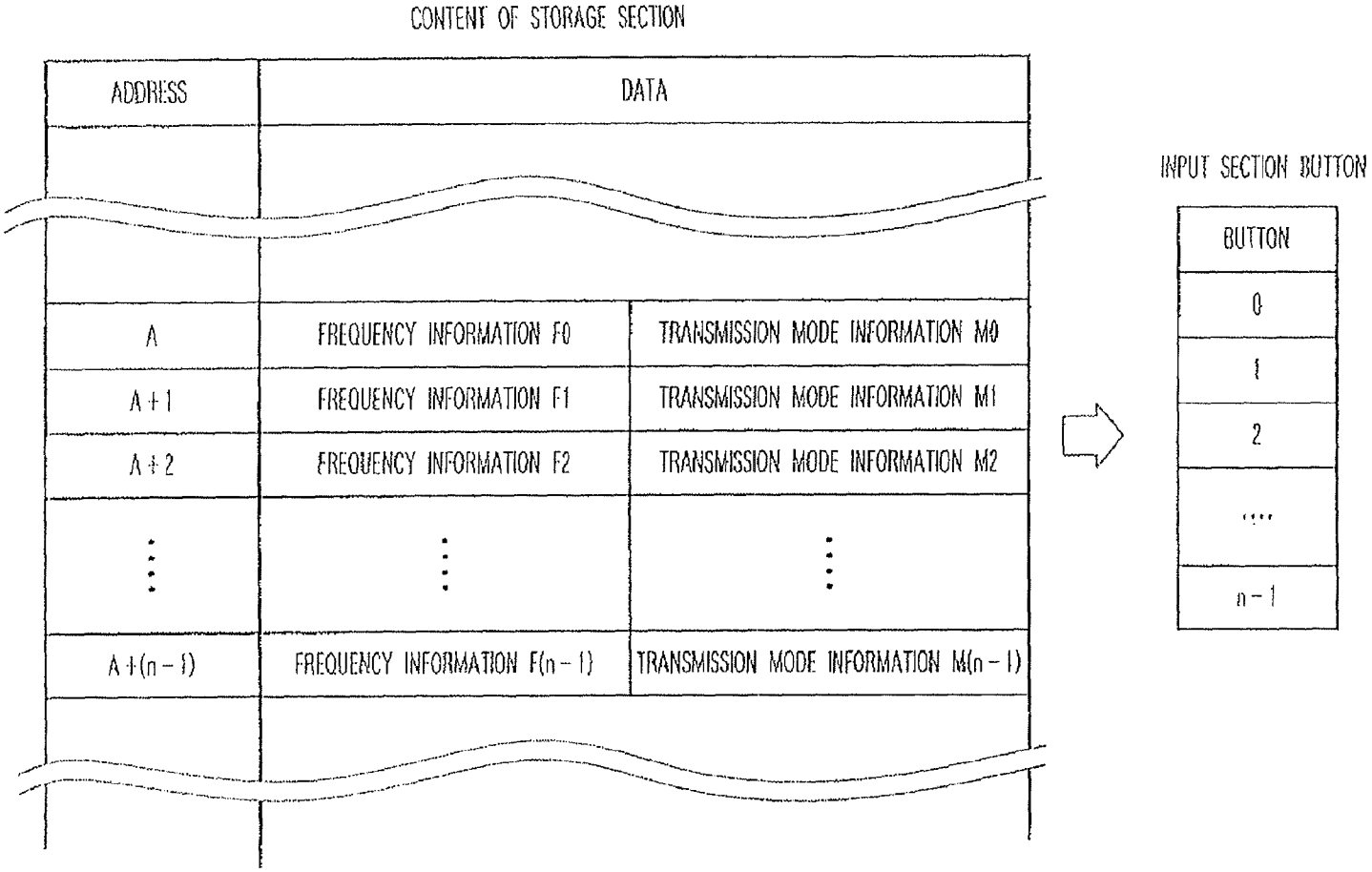
FIG. 9 illustrates a content of the storage section in FIG. 5.
Figure 10:
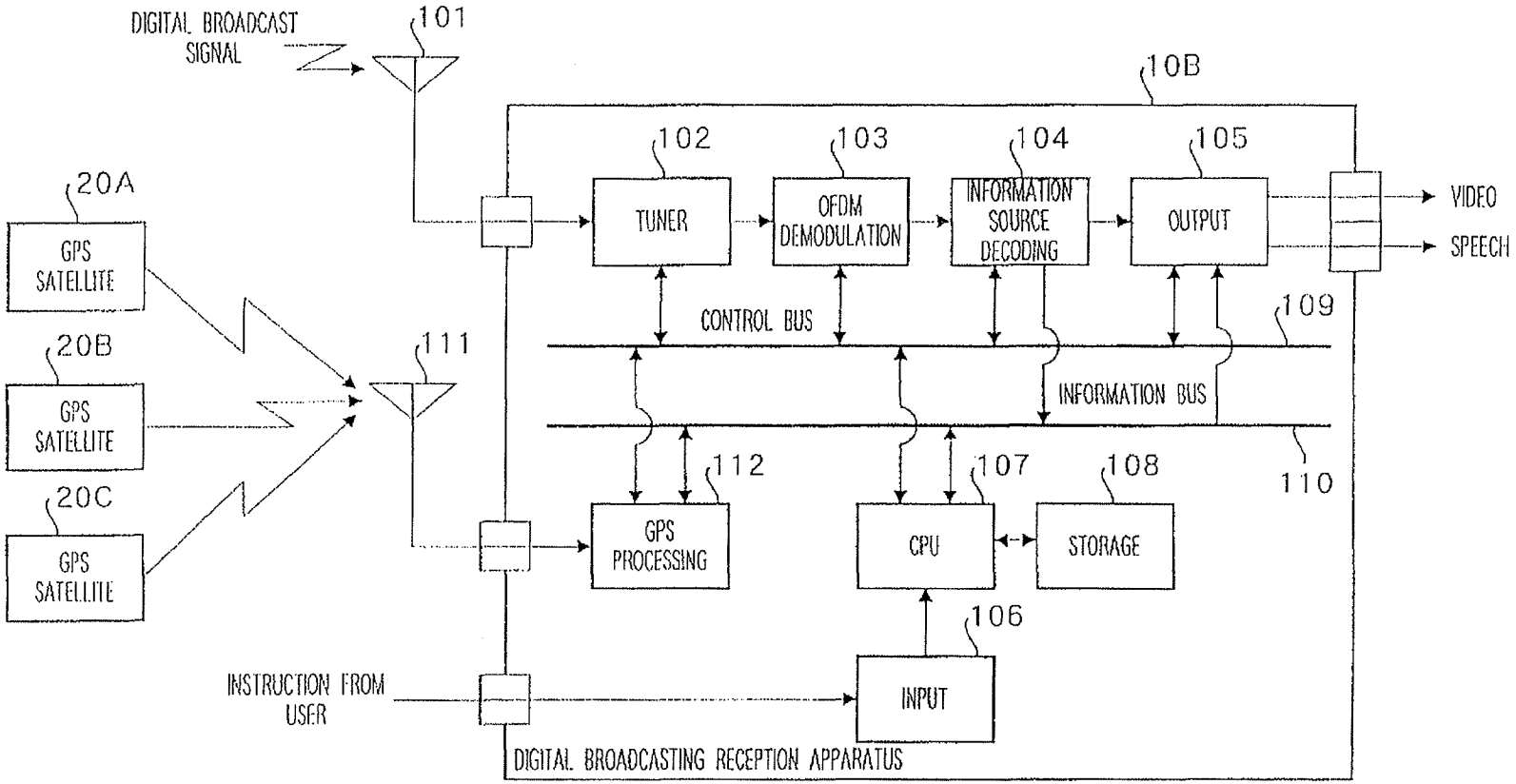
FIG. 10 is a block diagram showing a configuration of an OFDM signal transmission system according to a second embodiment of the present invention.
Figure 11:
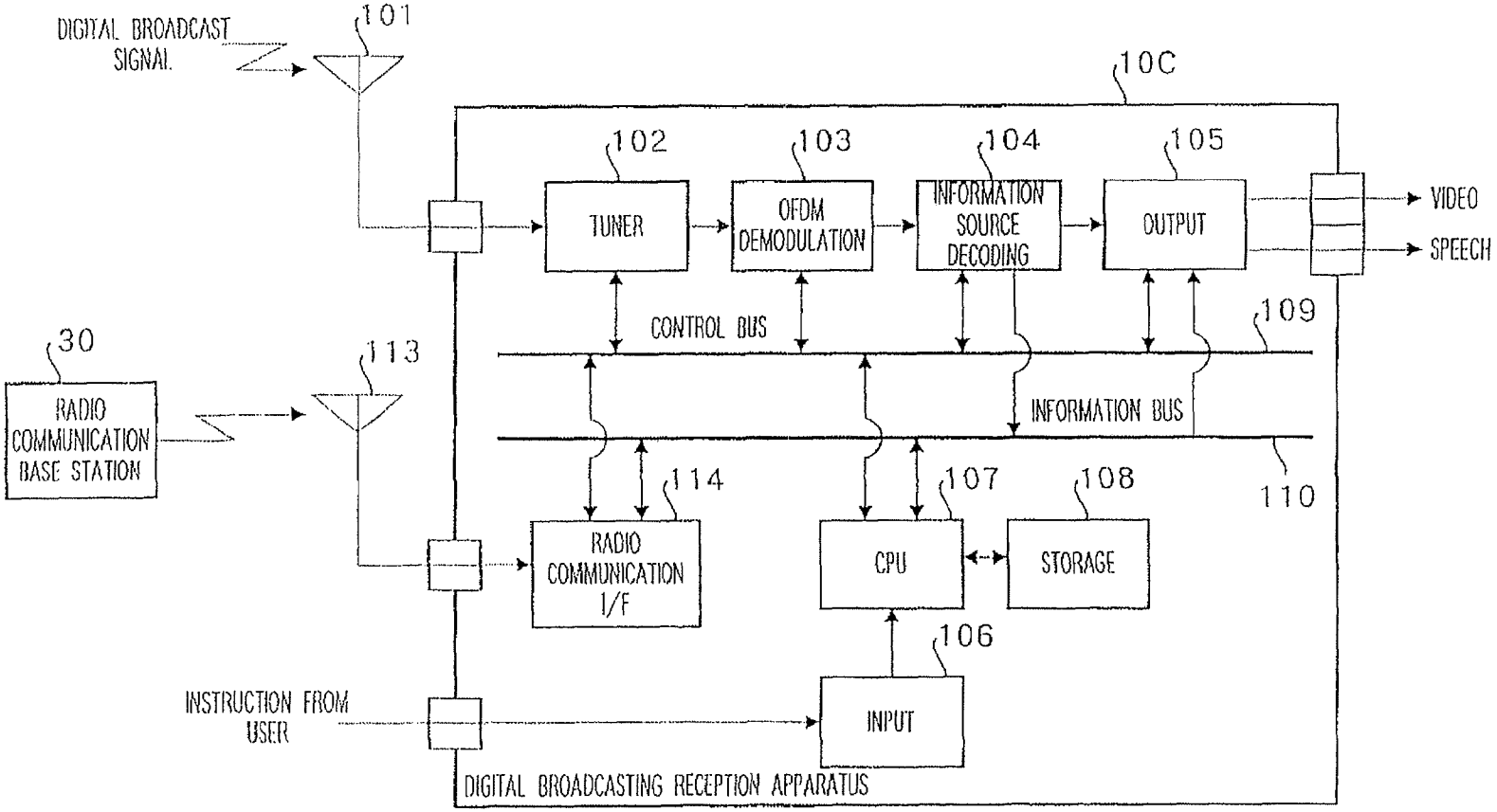
FIG. 11 is a block diagram showing a configuration of an OFDM signal transmission system according to a third embodiment of the present invention.
Figure 12:
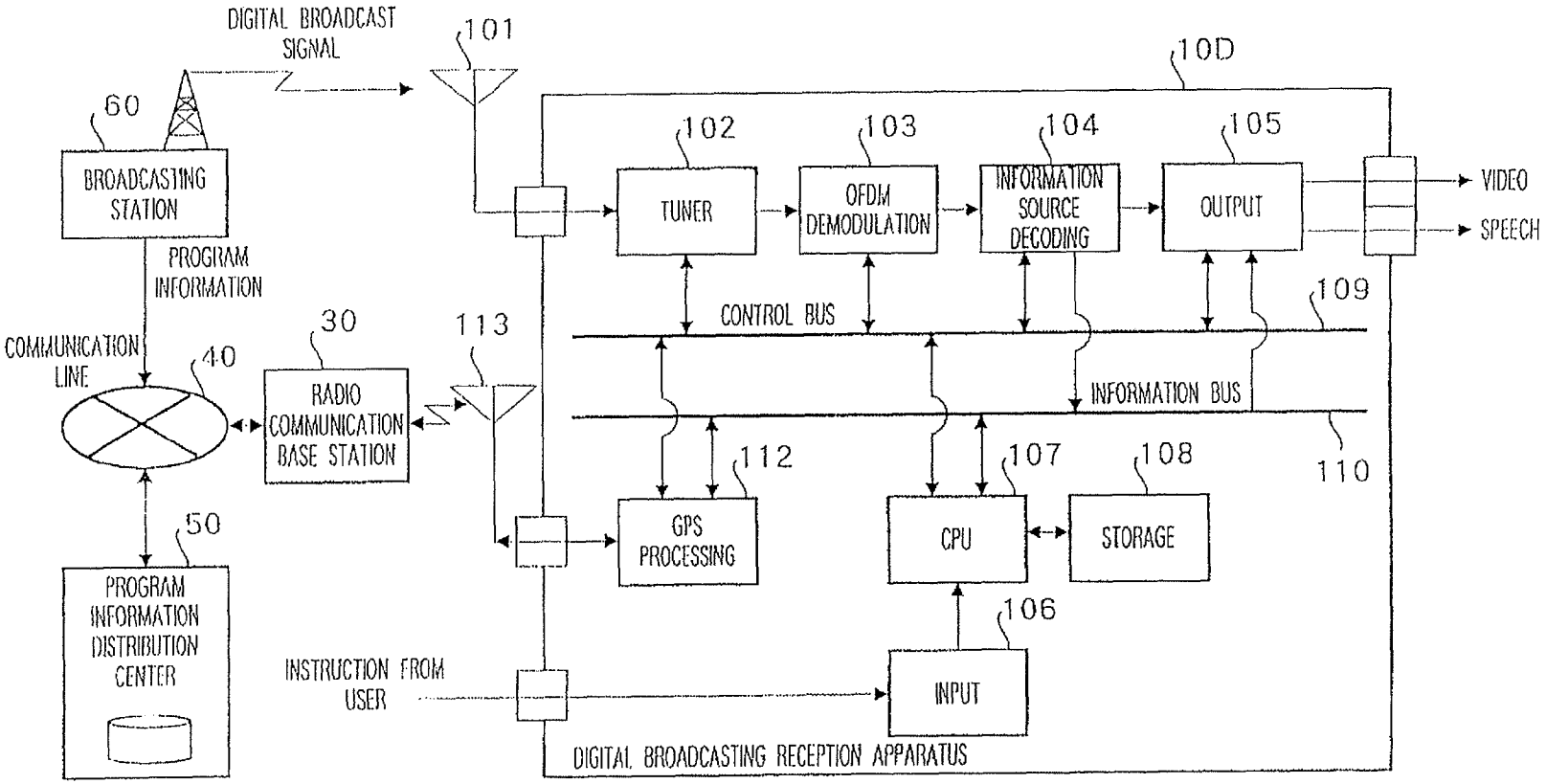
FIG. 12 is a block diagram showing a configuration of an OFDM signal transmission system according to a fourth embodiment of the present invention.
Figure 13:
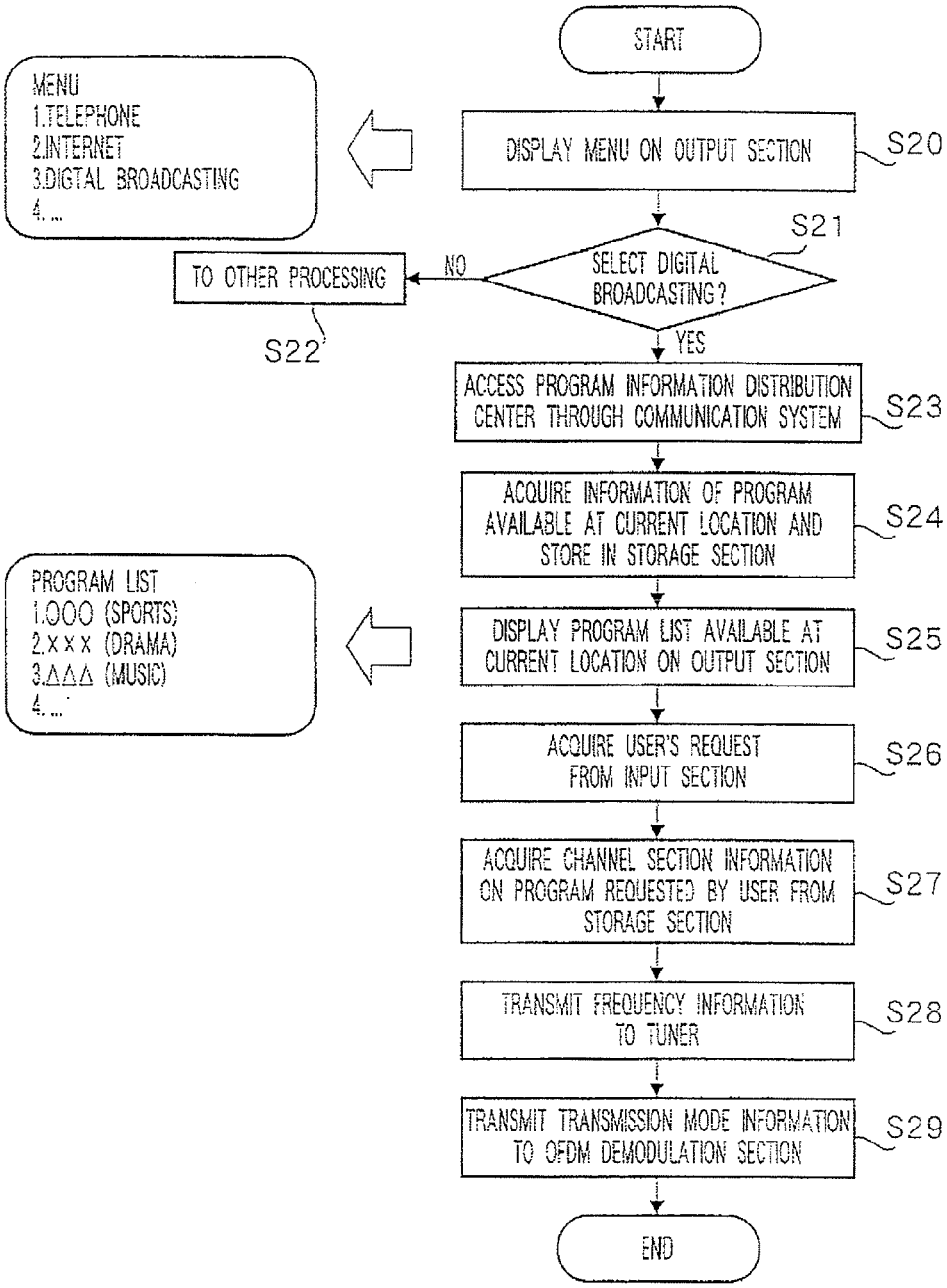
FIG. 13 is a flow chart showing an operation of the CPU in FIG. 12.
Figure 15:
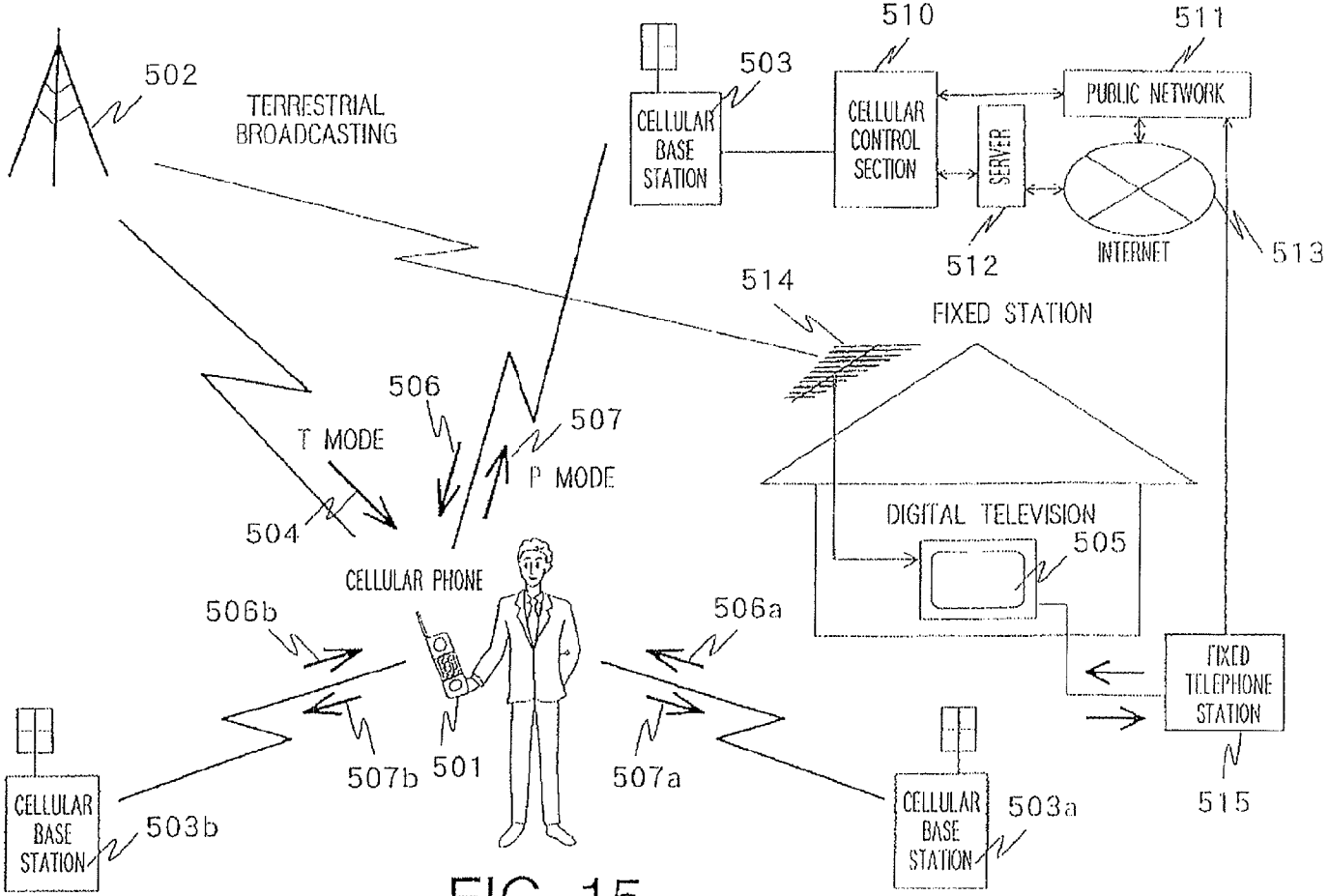
FIG. 15 is an overall view of a T mode cellular phone system according to a fifth embodiment of the present invention.
Figure 16:
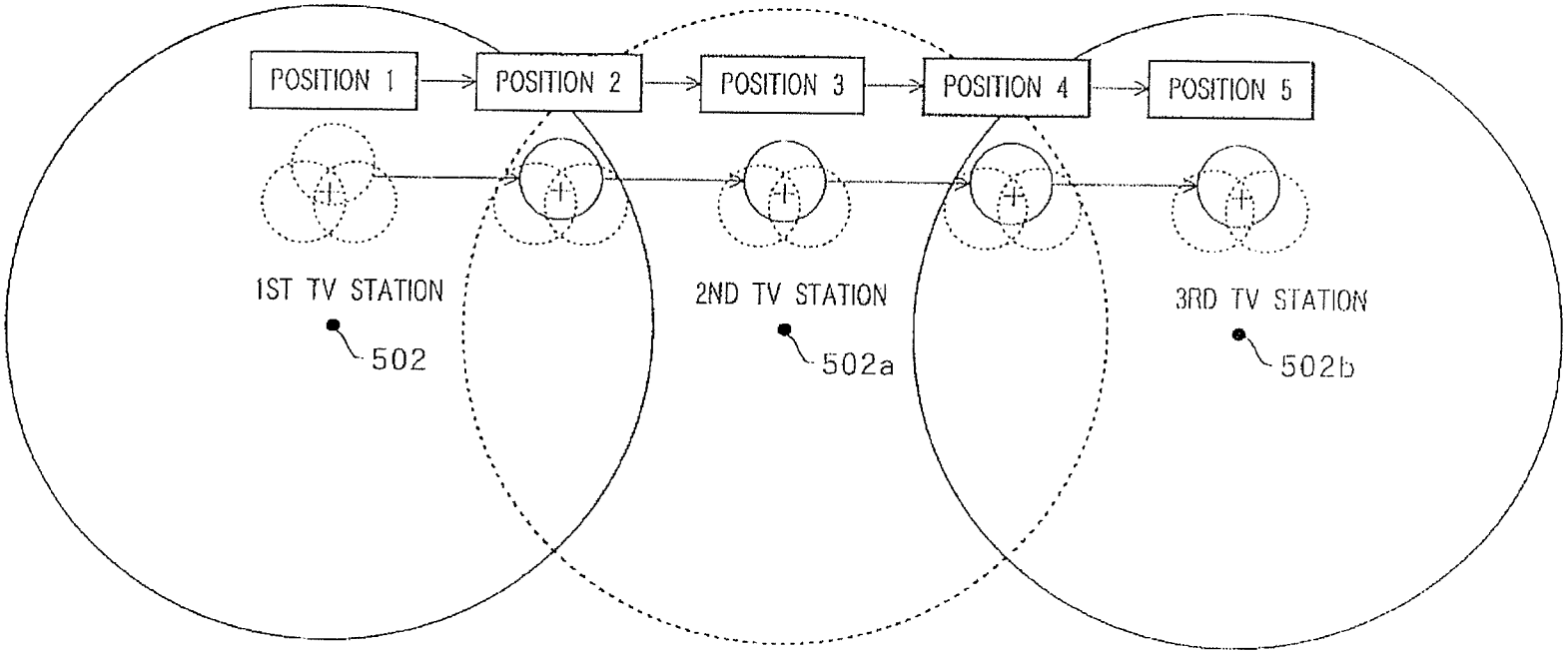
FIG. 16 illustrates a relationship between movements of a T mode cellular phone and a plurality of service areas.
Figure 17:
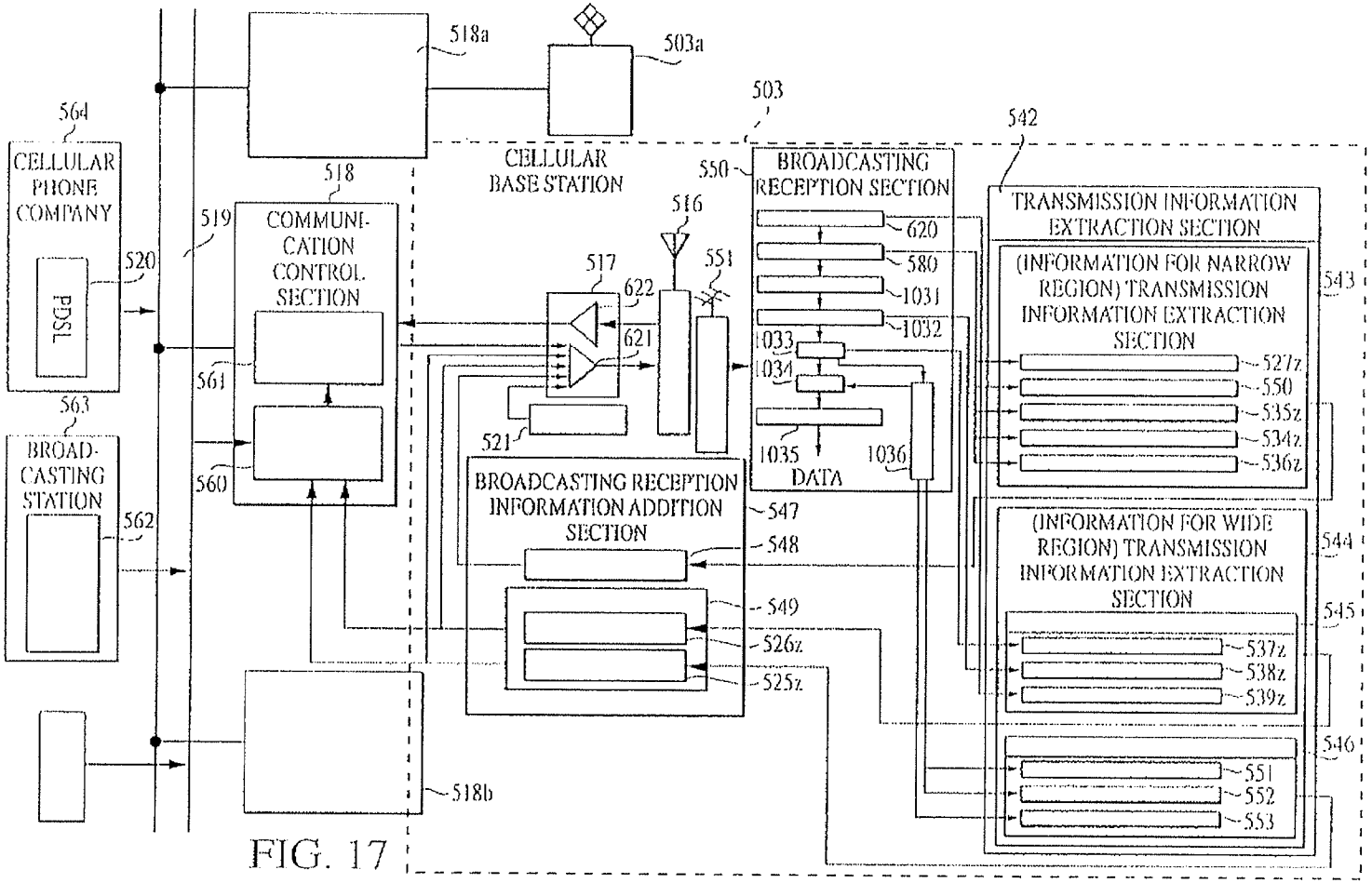
FIG. 17 is a block diagram showing a configuration of a cellular base station according to the fifth embodiment.
Figure 18A:
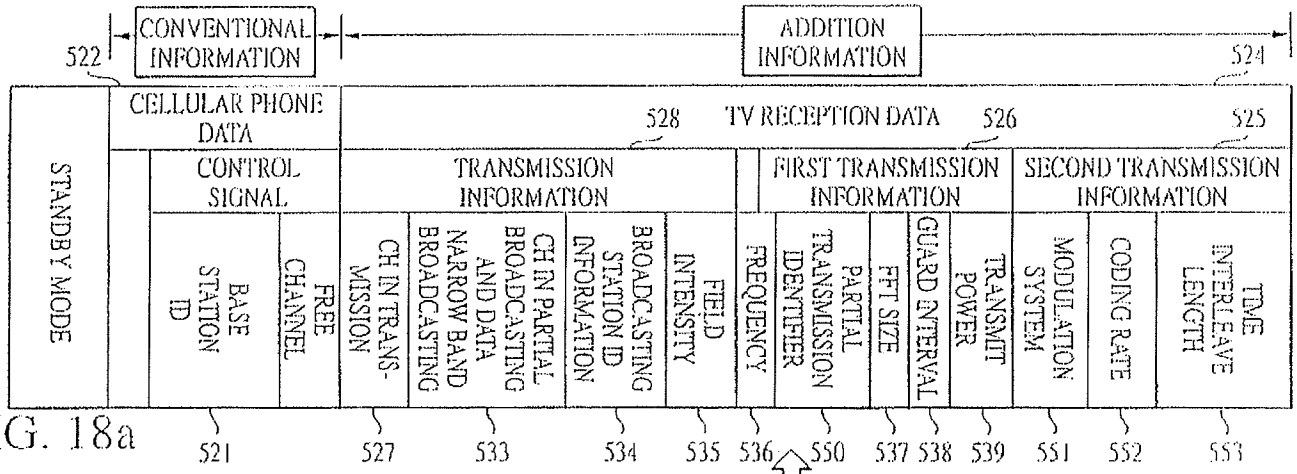
FIG. 18(*a*) illustrates reception data in standby mode.
Figure 18B:
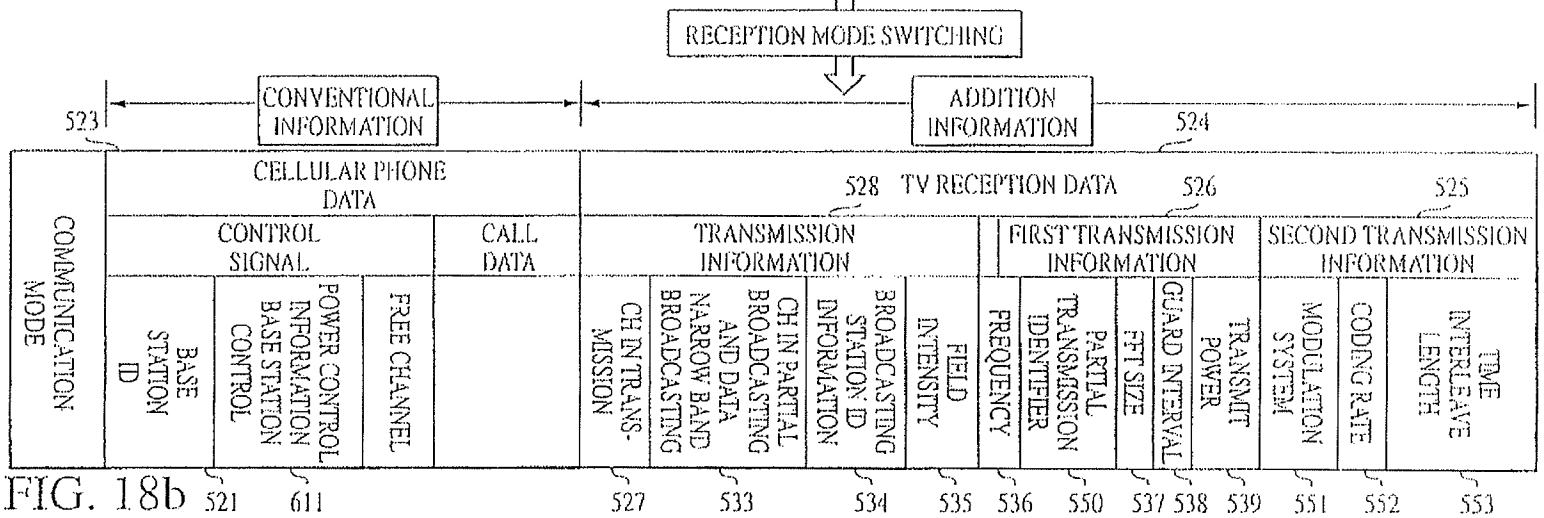
Figure 19:
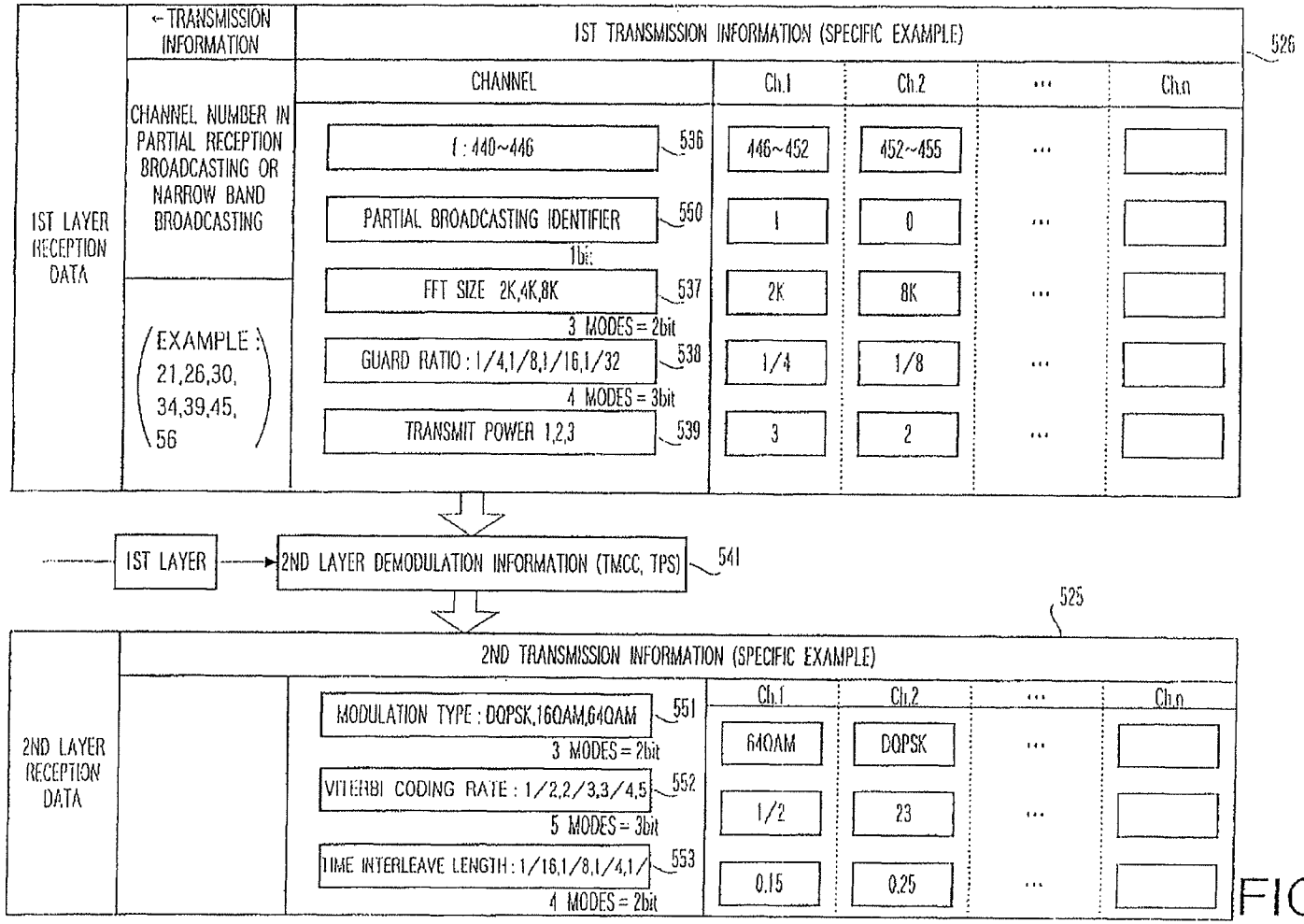
FIG. 19 illustrates transmission information and a content of transmission information.
Figure 20:
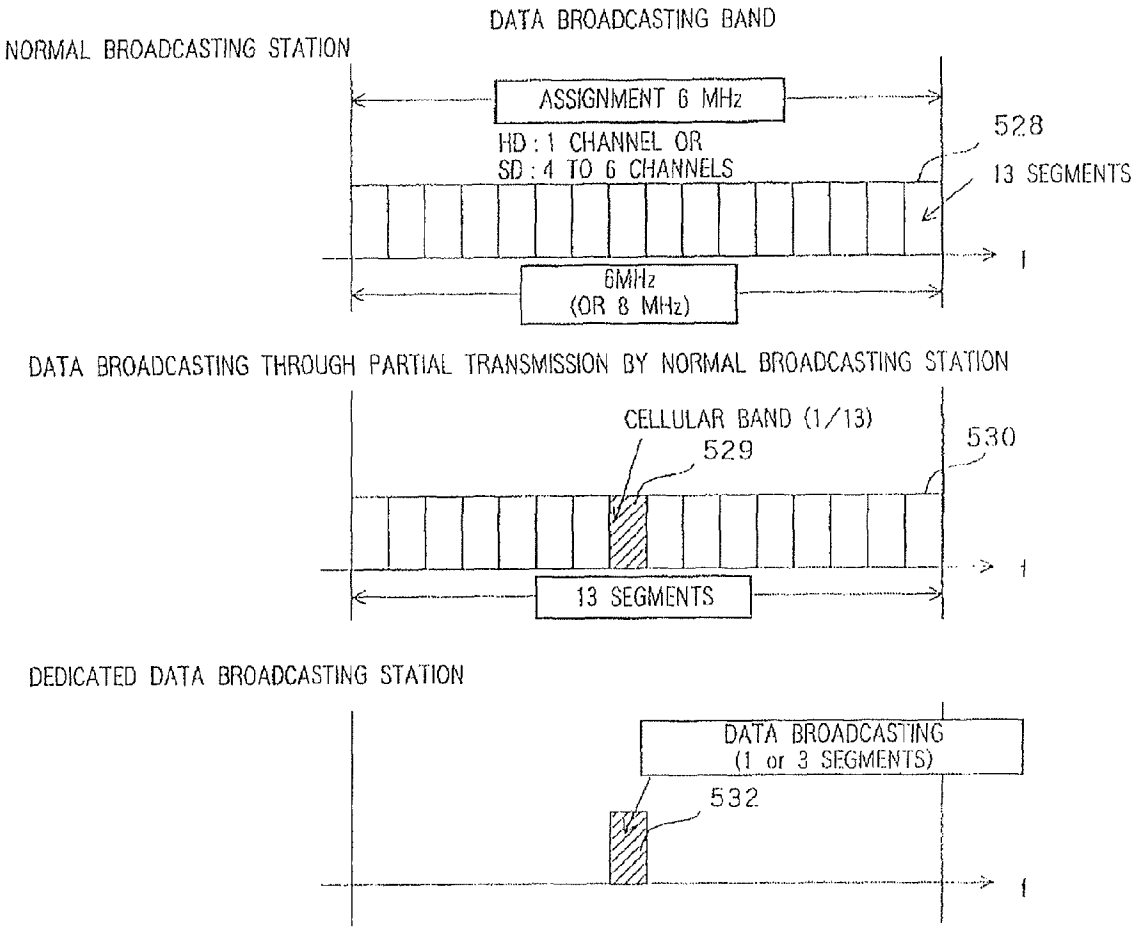
FIG. 20(*a*) illustrates bands of a normal broadcasting station.
Figure 21:
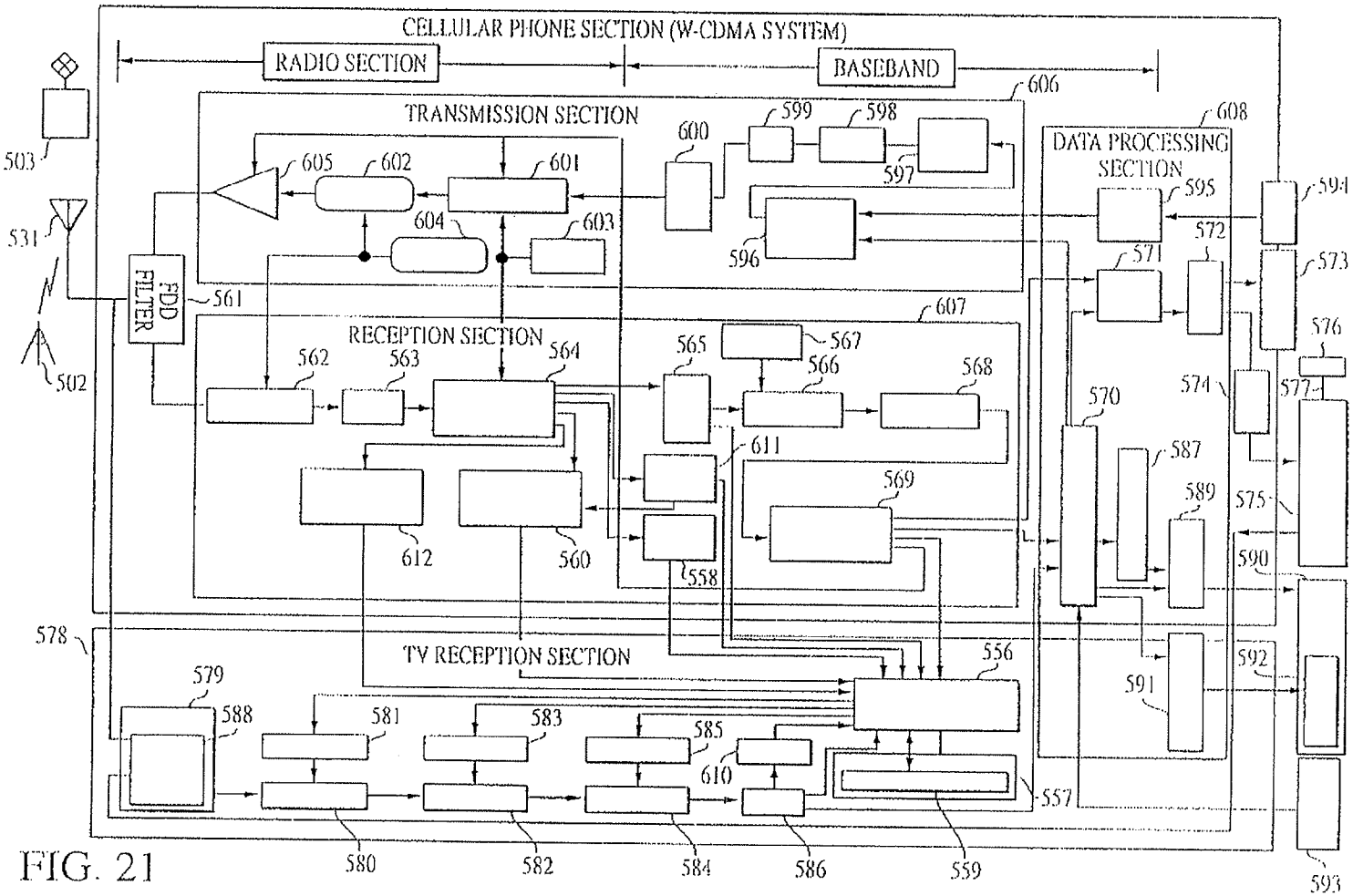
FIG. 21 is a block diagram showing a configuration of a T mode cellular phone.
Figure 23:
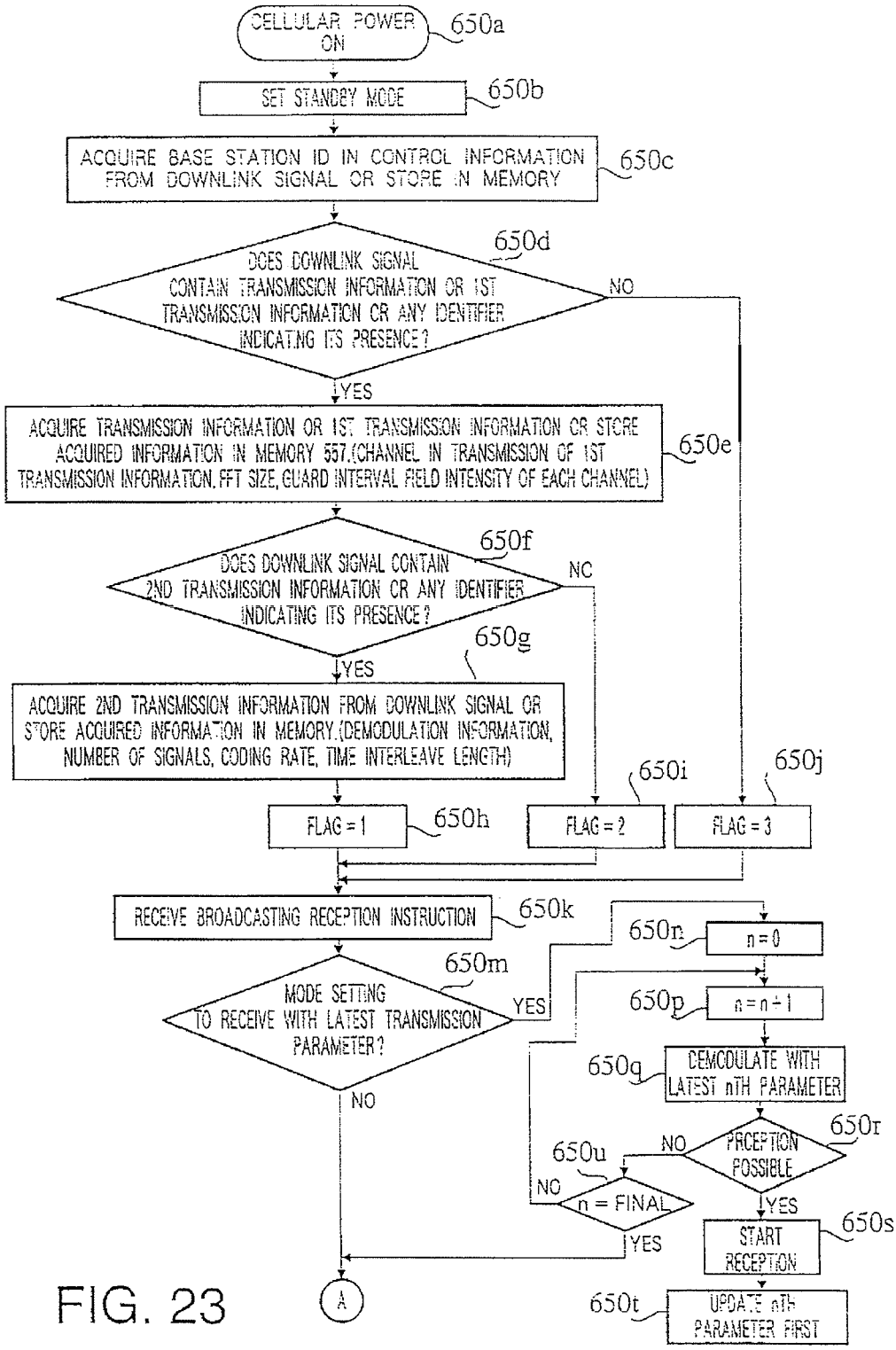
FIG. 23 is a flow chart of a procedure for acquiring transmission information, first and second transmission information.
Figures 1, 24:
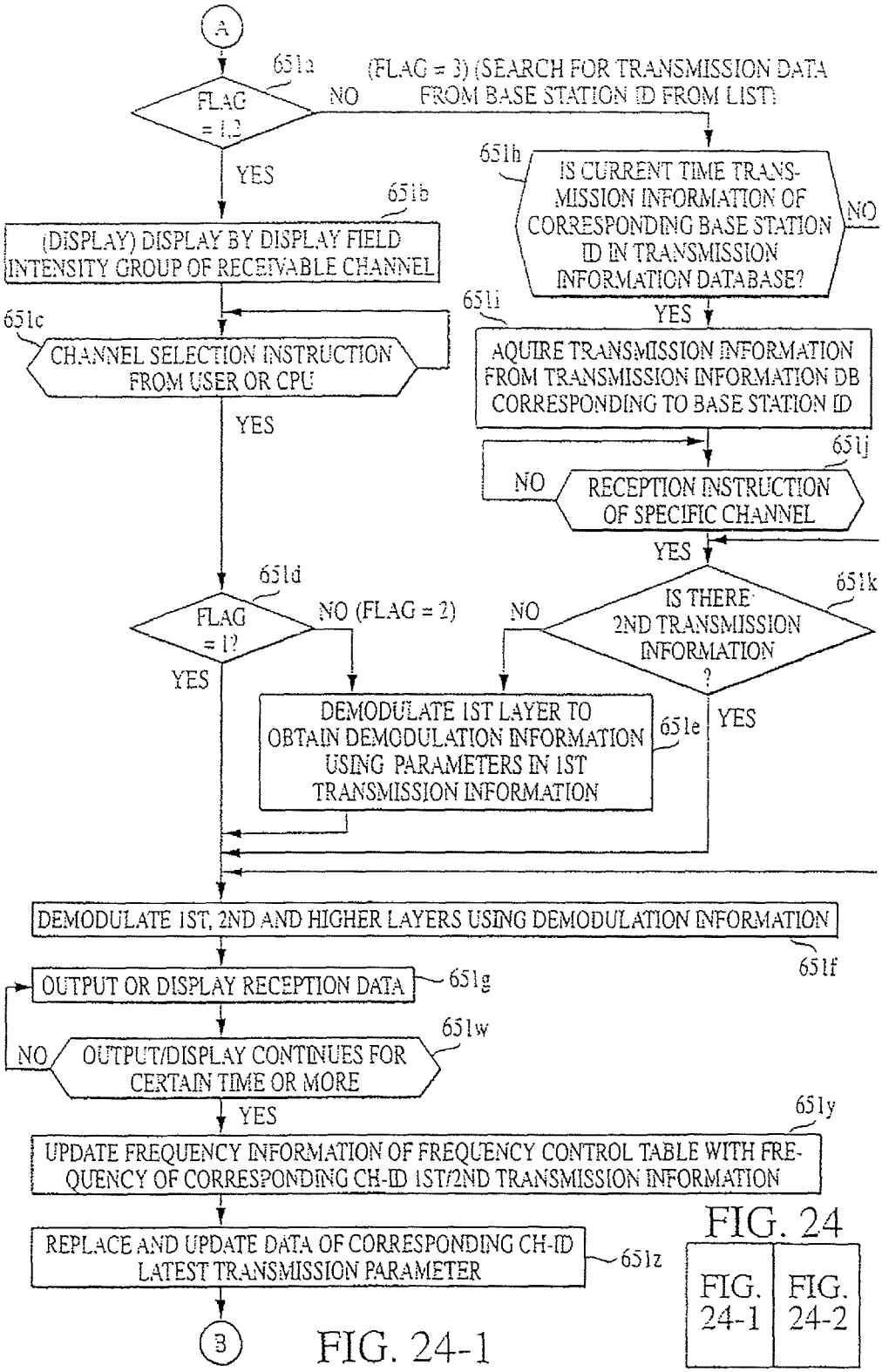
FIG. 24 is a flowchart of a procedure for converting transmission information to pattern information.
Figures 2, 24:
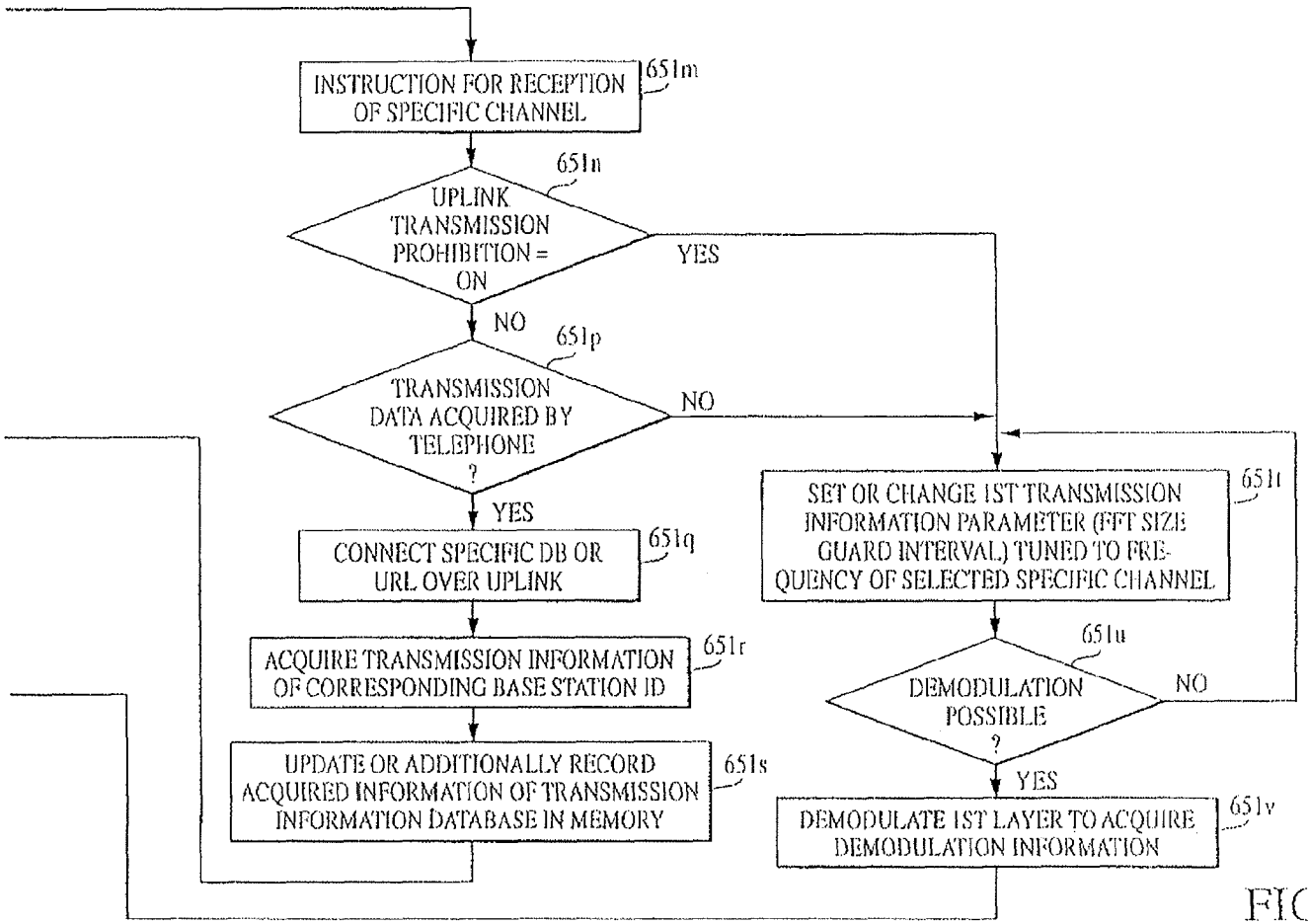
Figures 2, 25:
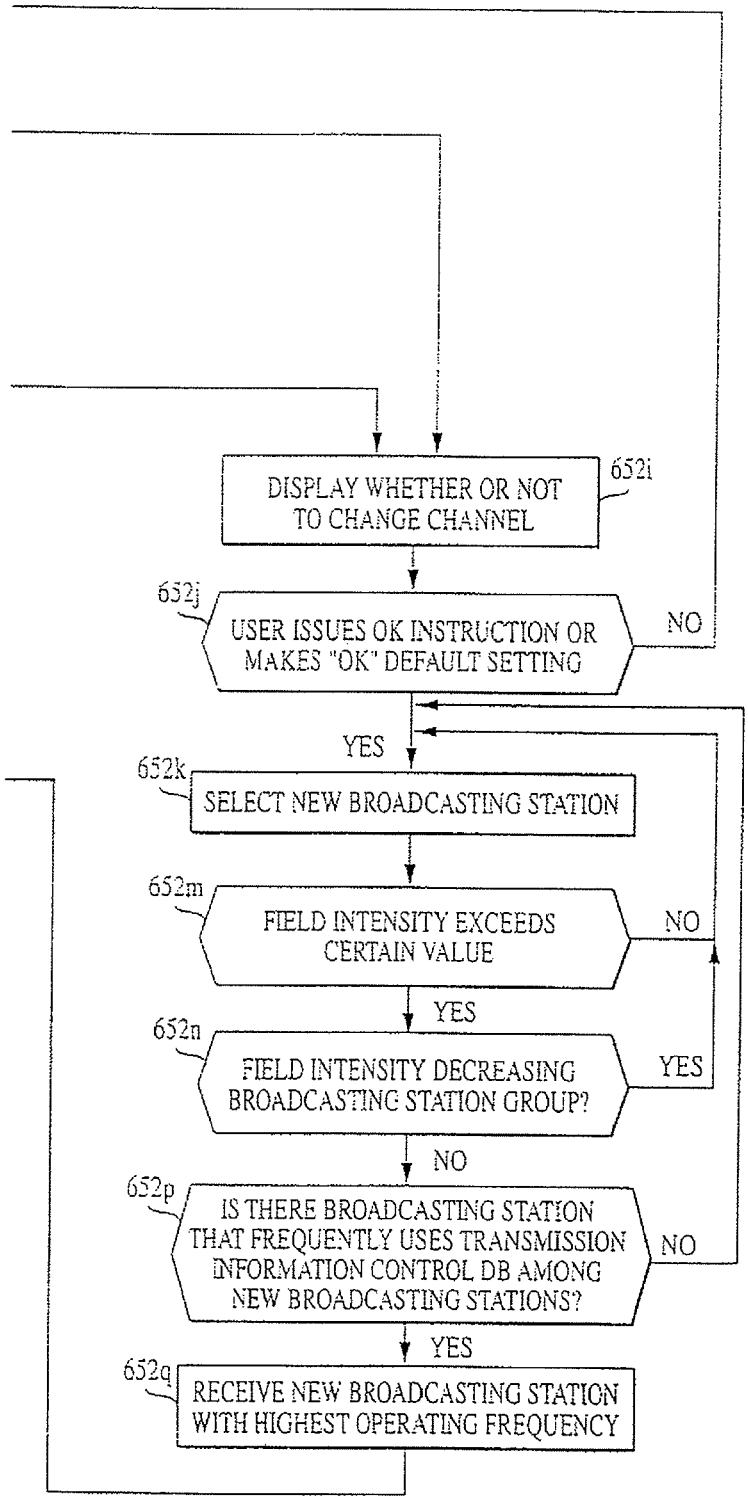
FIG. 25 is a flow chart of a procedure for acquiring transmission information of a field intensity control system.
Figure 26:
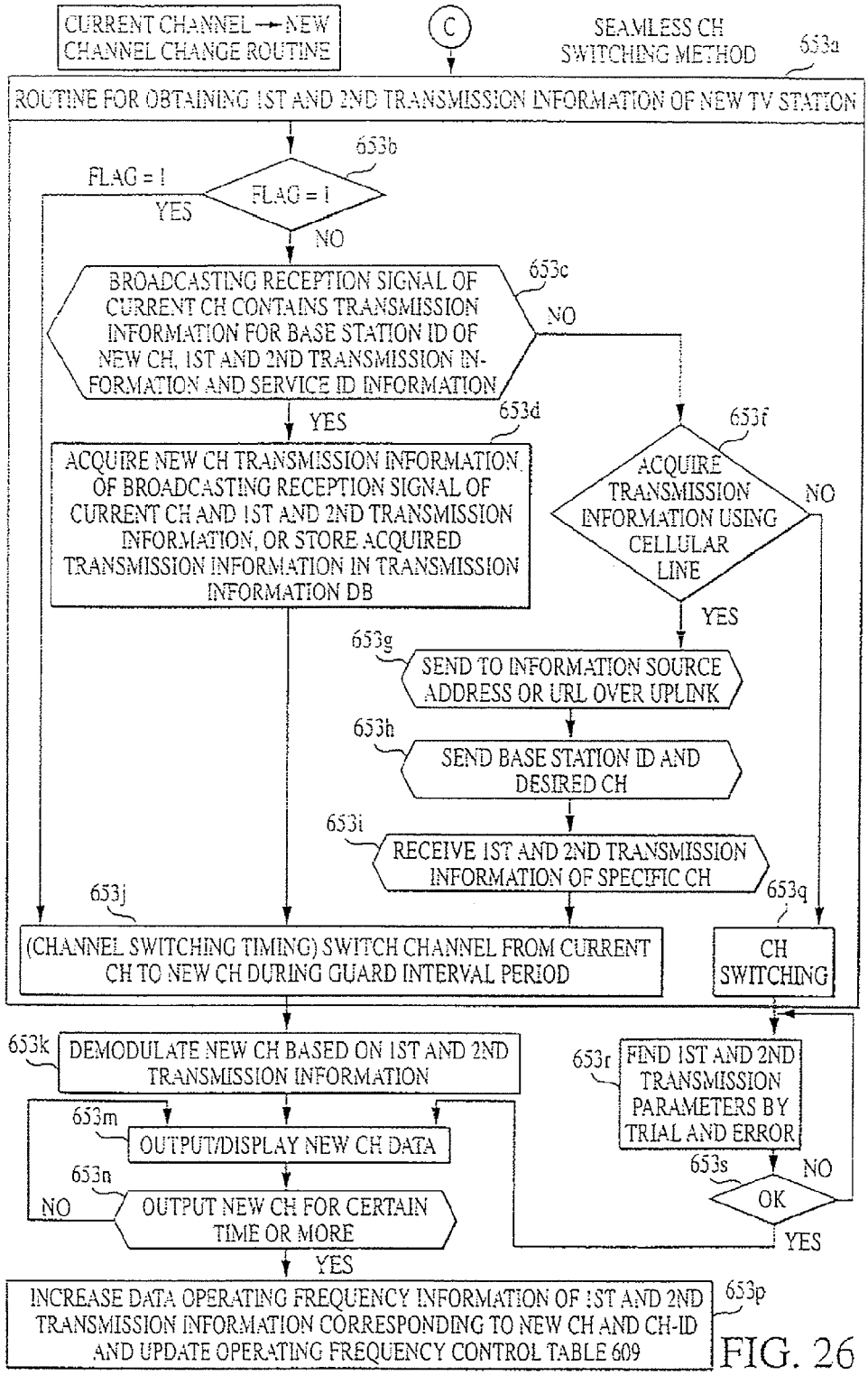
FIG. 26 is a flow chart of a procedure for acquiring transmission information of a frequency control system.
Figure 27:
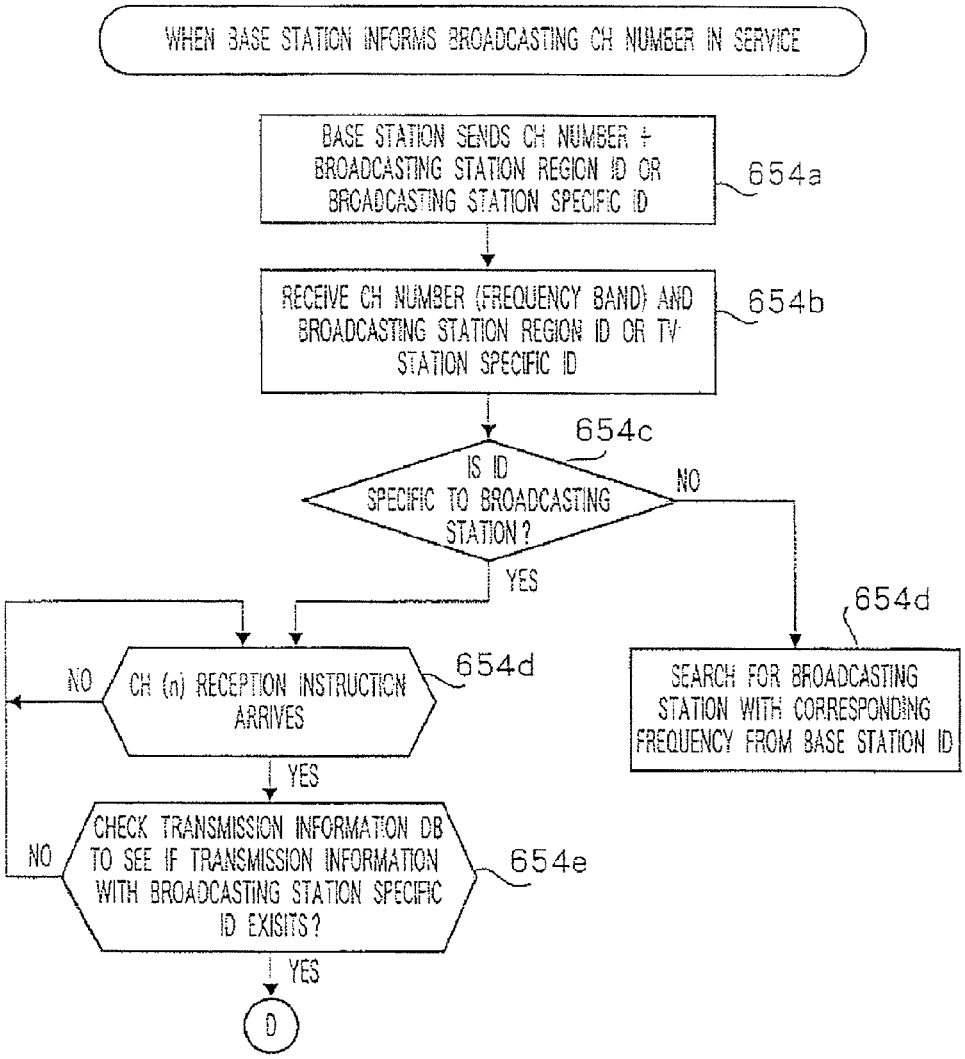
FIG. 27 is a flow chart of a procedure for acquiring transmission information and first and second transmission information.
Figures 1, 28:
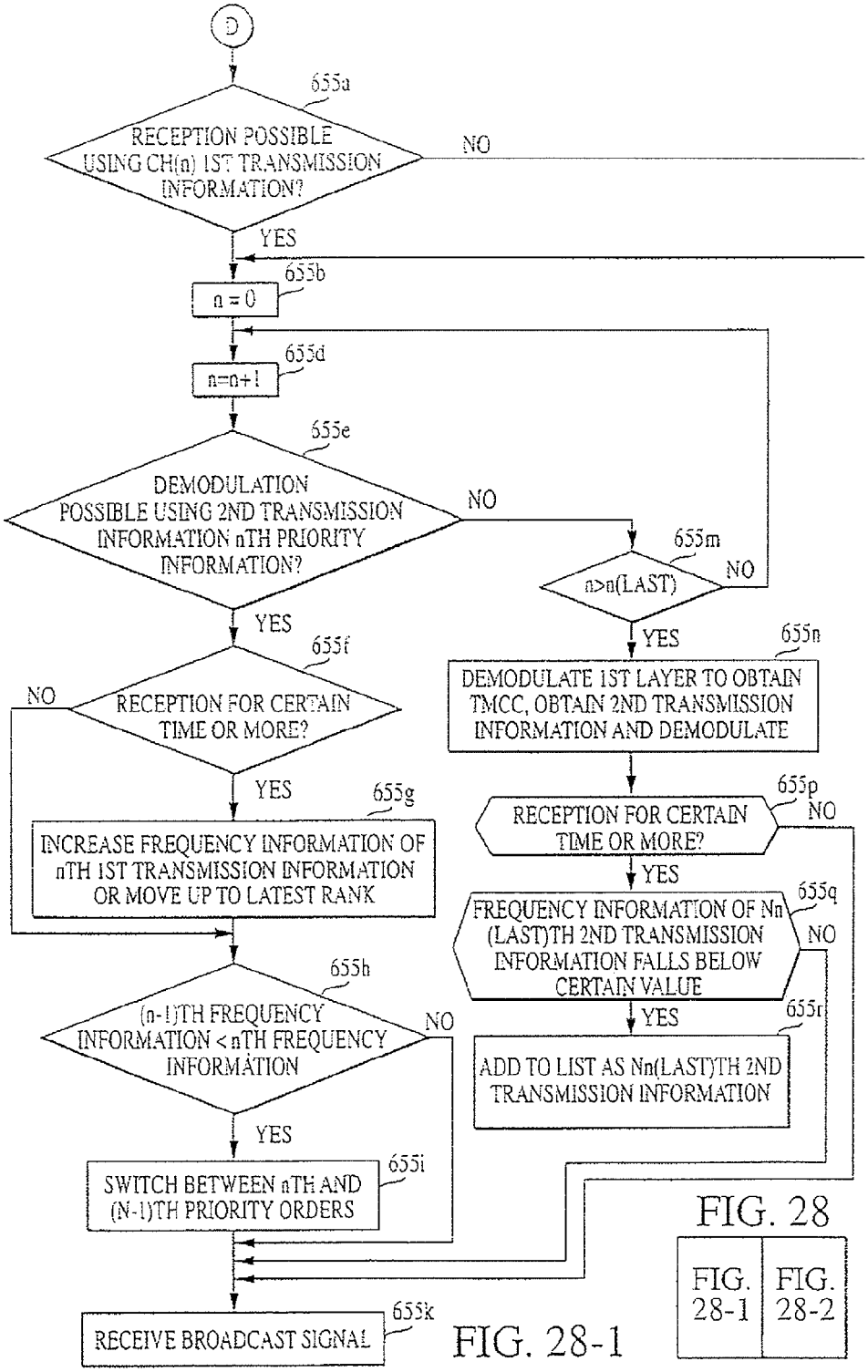
FIG. 28 is a flow chart of a procedure for acquiring transmission information and first and second transmission information.
Figures 2, 28:
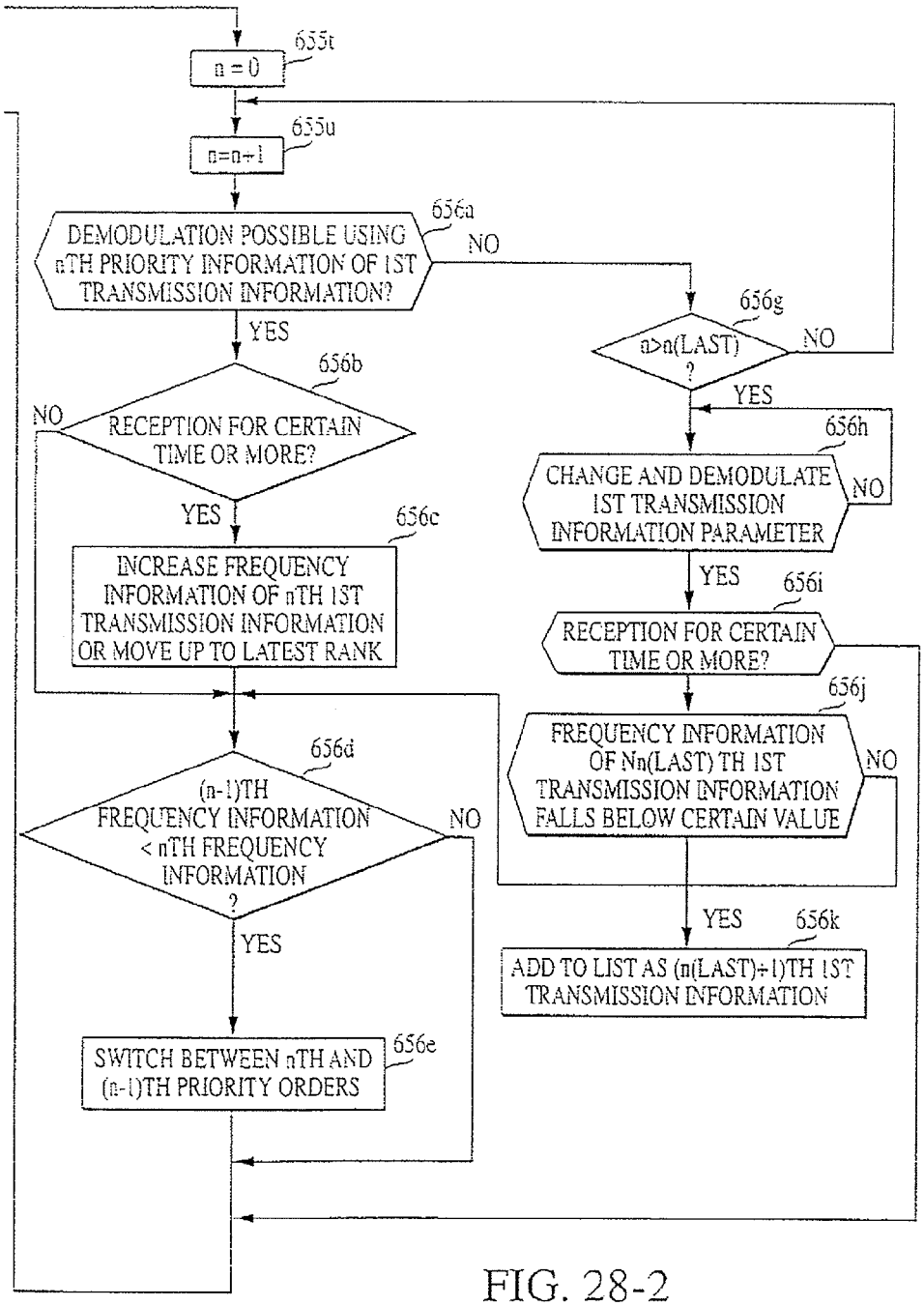
Figure 29:
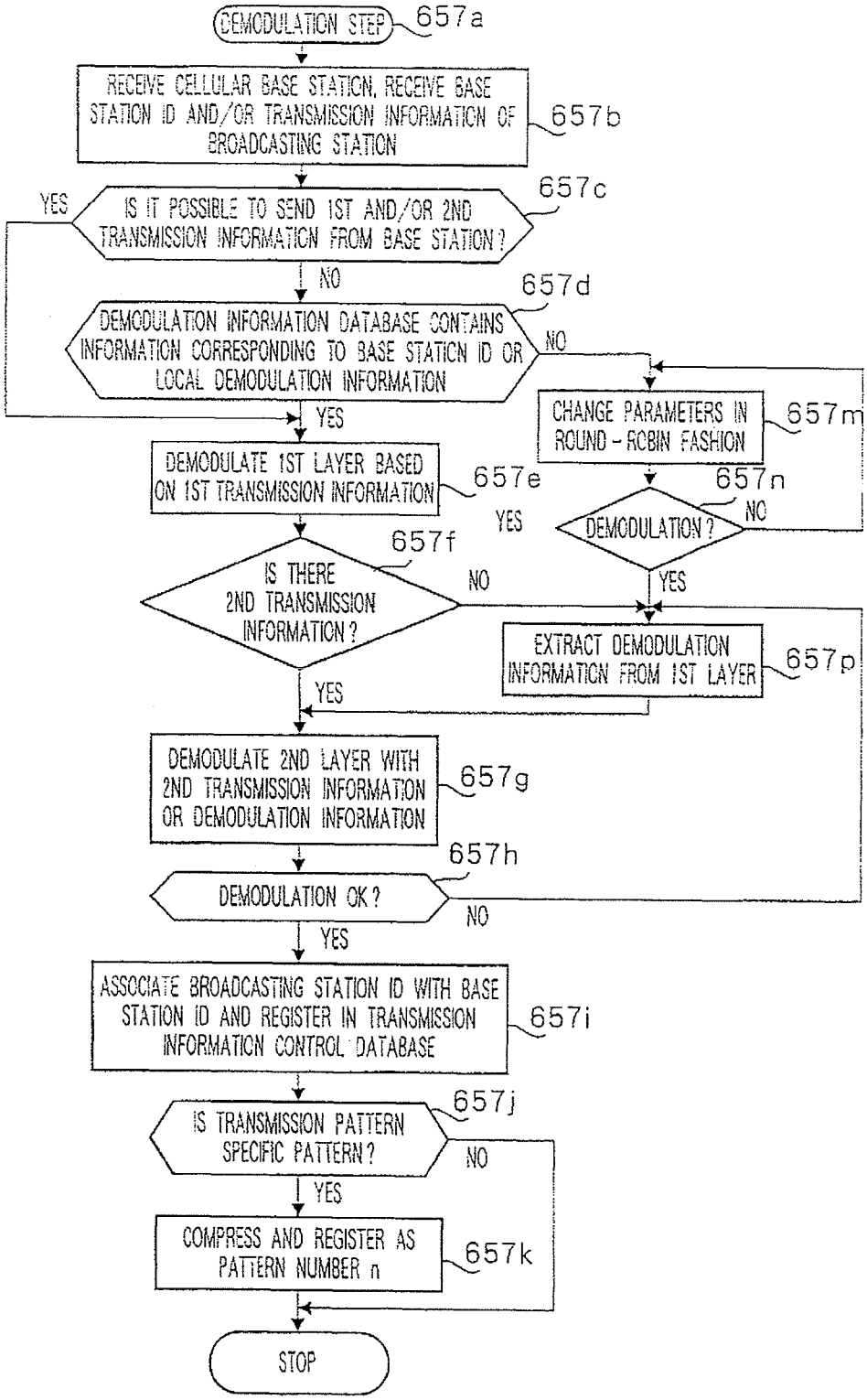
FIG. 29 is a flow chart of a procedure for converting transmission information to pattern information.
Figure 30:
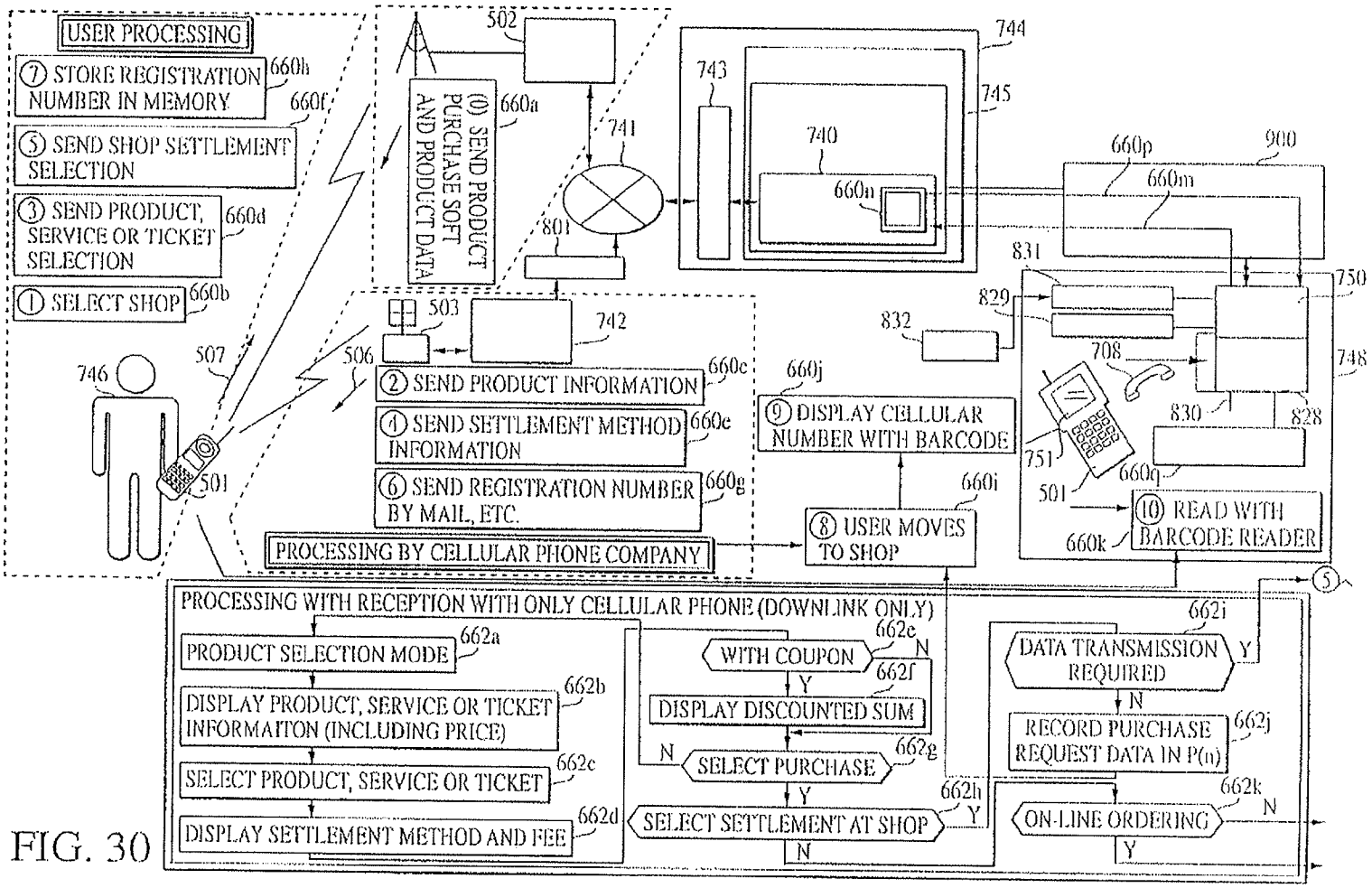
FIG. 30 illustrates a procedure for authenticating a cellular phone, virtual shop and real shop according to a sixth embodiment of the present invention.
Figures 31A, 31B, 31C, 31D, 31E:
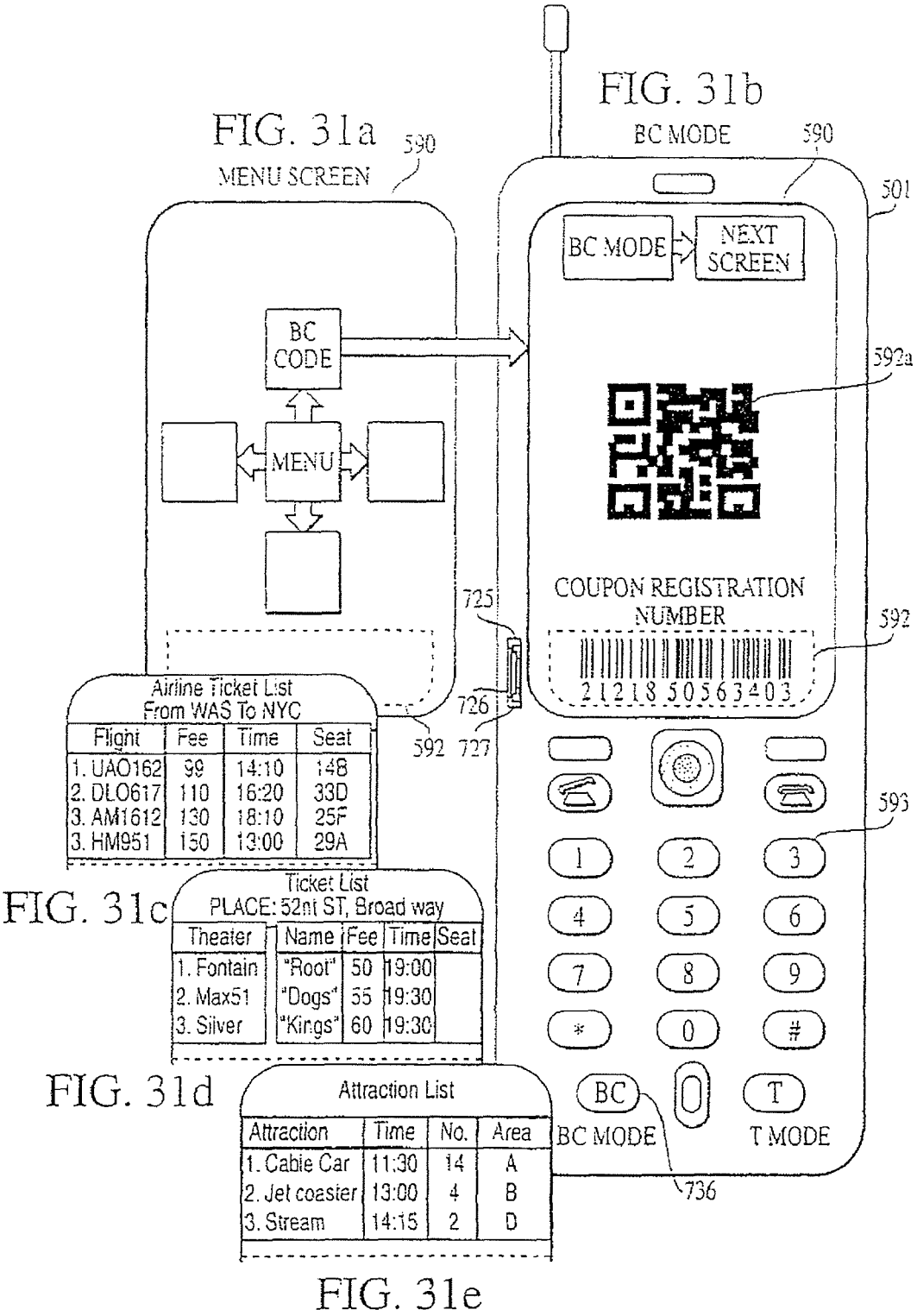
FIG. 31(*a*) illustrates a menu screen of a cellular phone according to the sixth embodiment of the present invention.
Figures 32A, 32B, 32C, 32D:
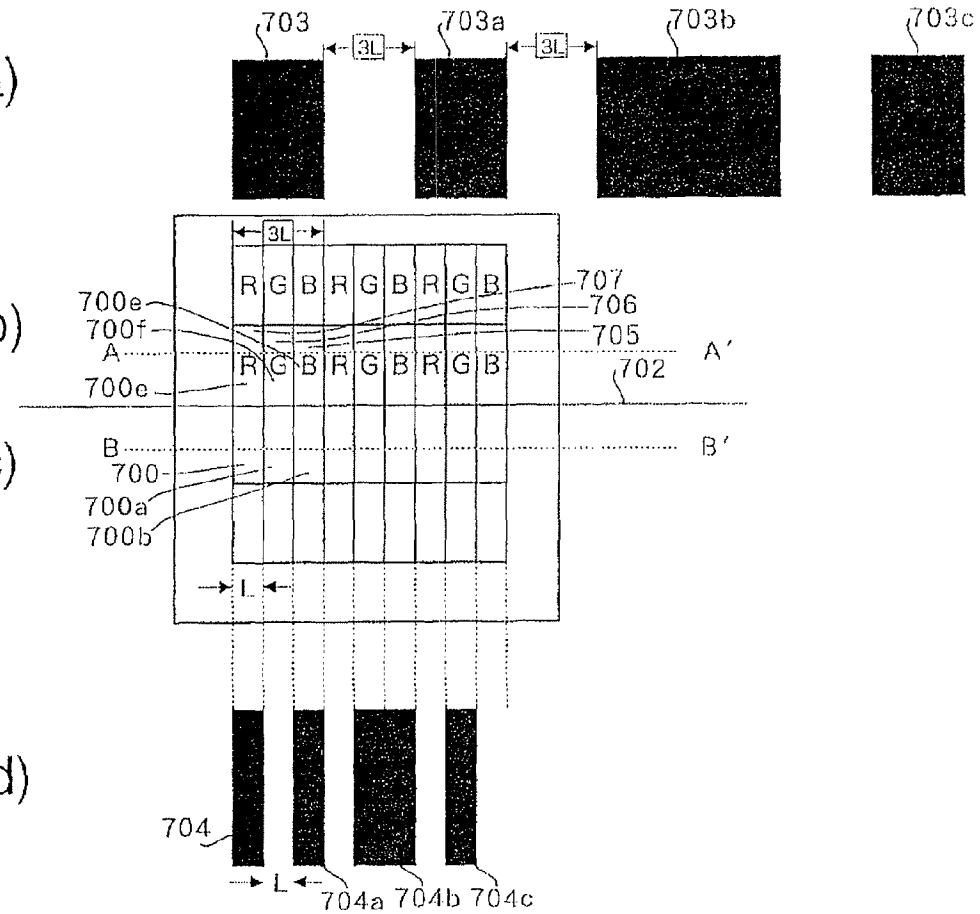
FIG. 32(*a*) illustrates a display pitch of a main display section.
Figure 33A:
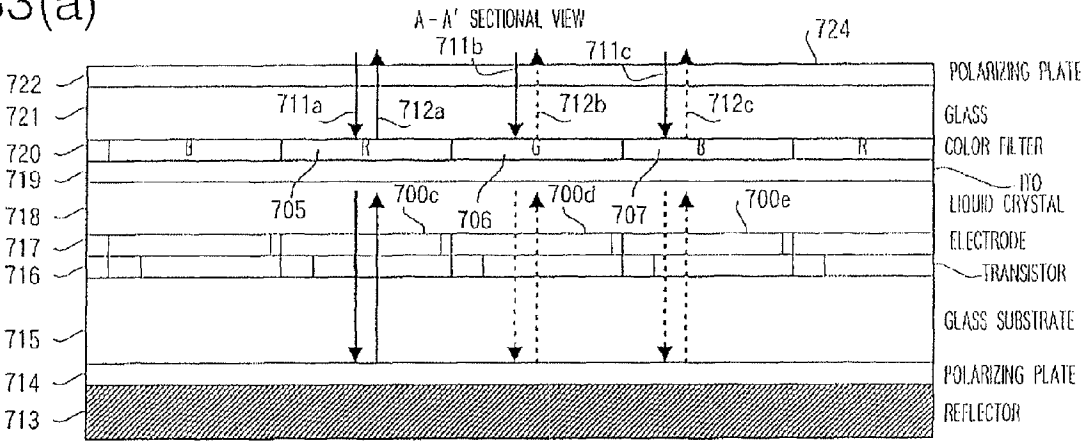
FIG. 33(*a*) illustrates an A-A' sectional view of the display element in FIG. 32.
Figure 33B:
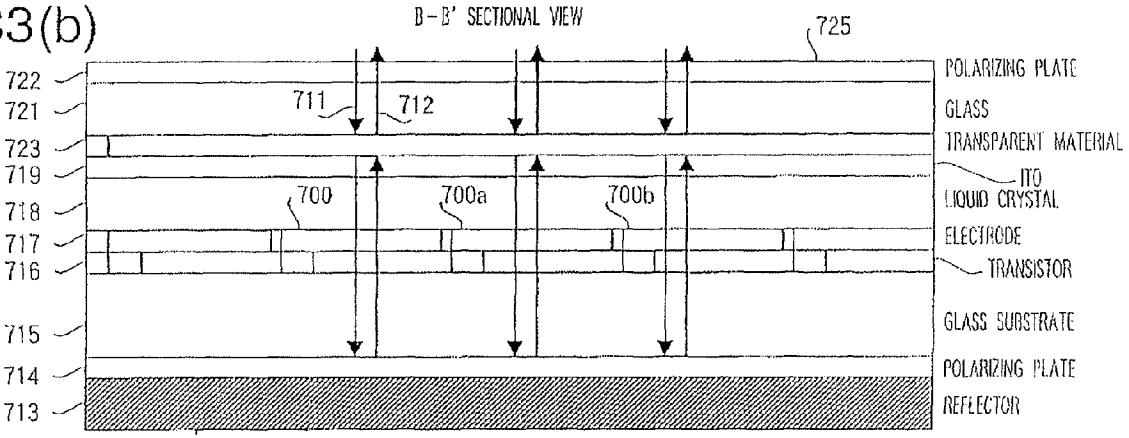
Figure 34:
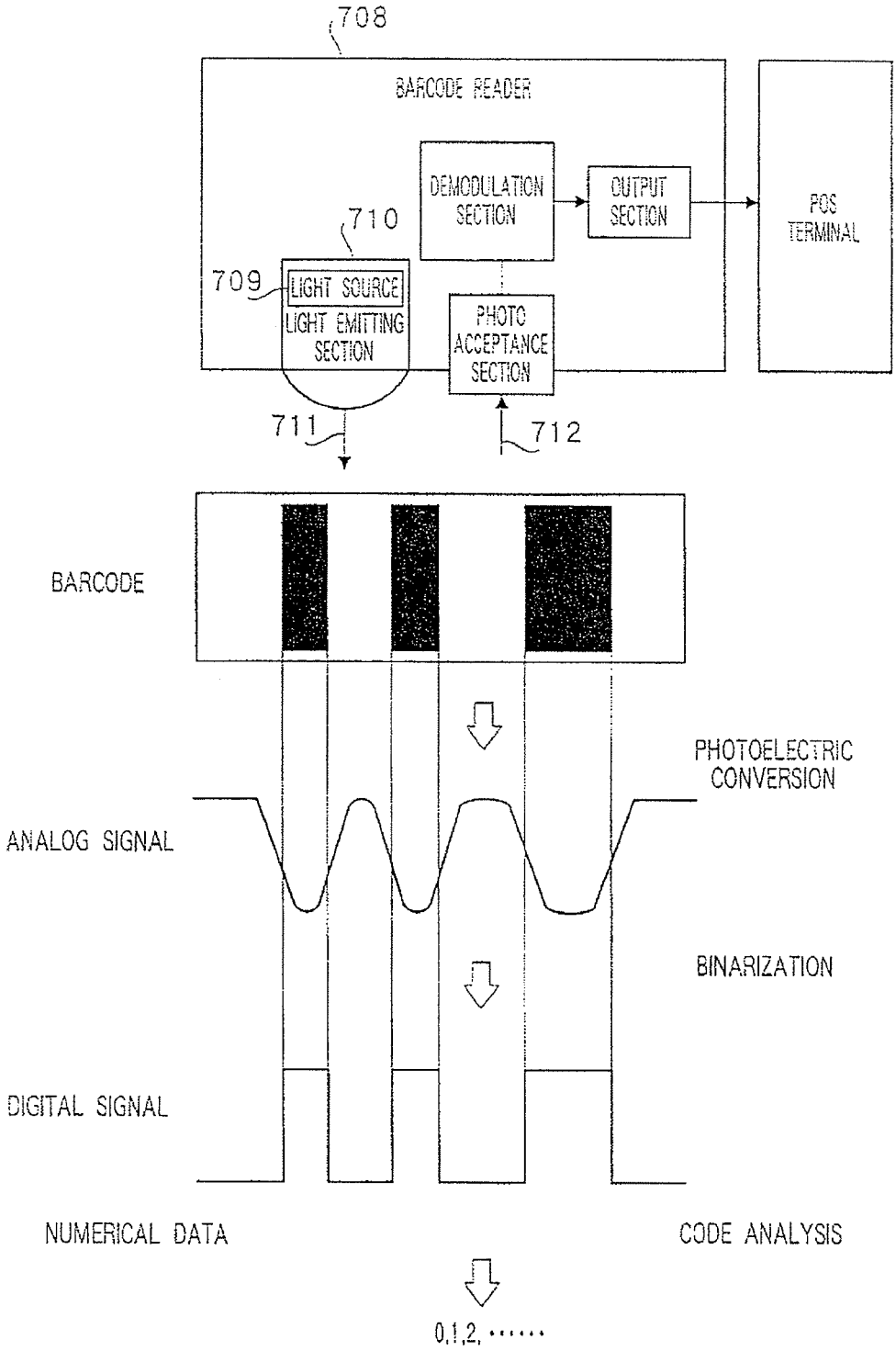
FIG. 34 illustrates a barcode reader.
Figure 35:
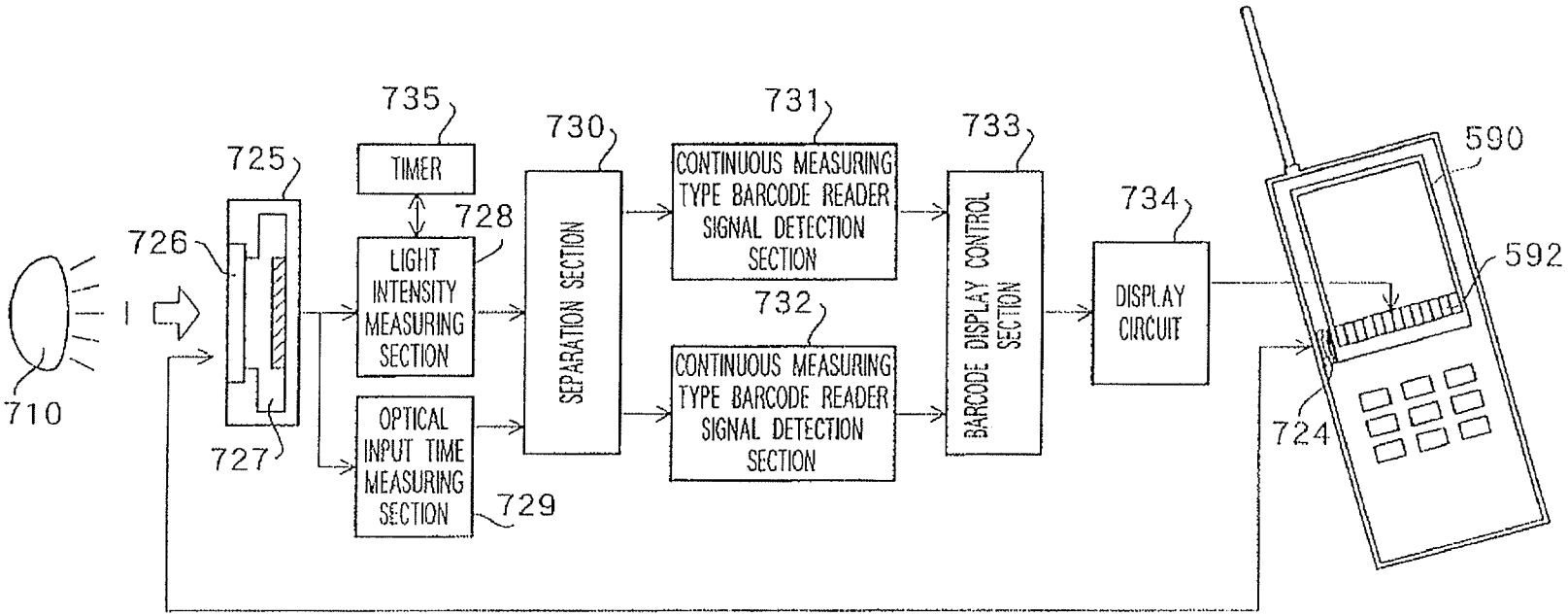
FIG. 35 is a block diagram showing a configuration of an optical detection section and display section.
Figure 36:
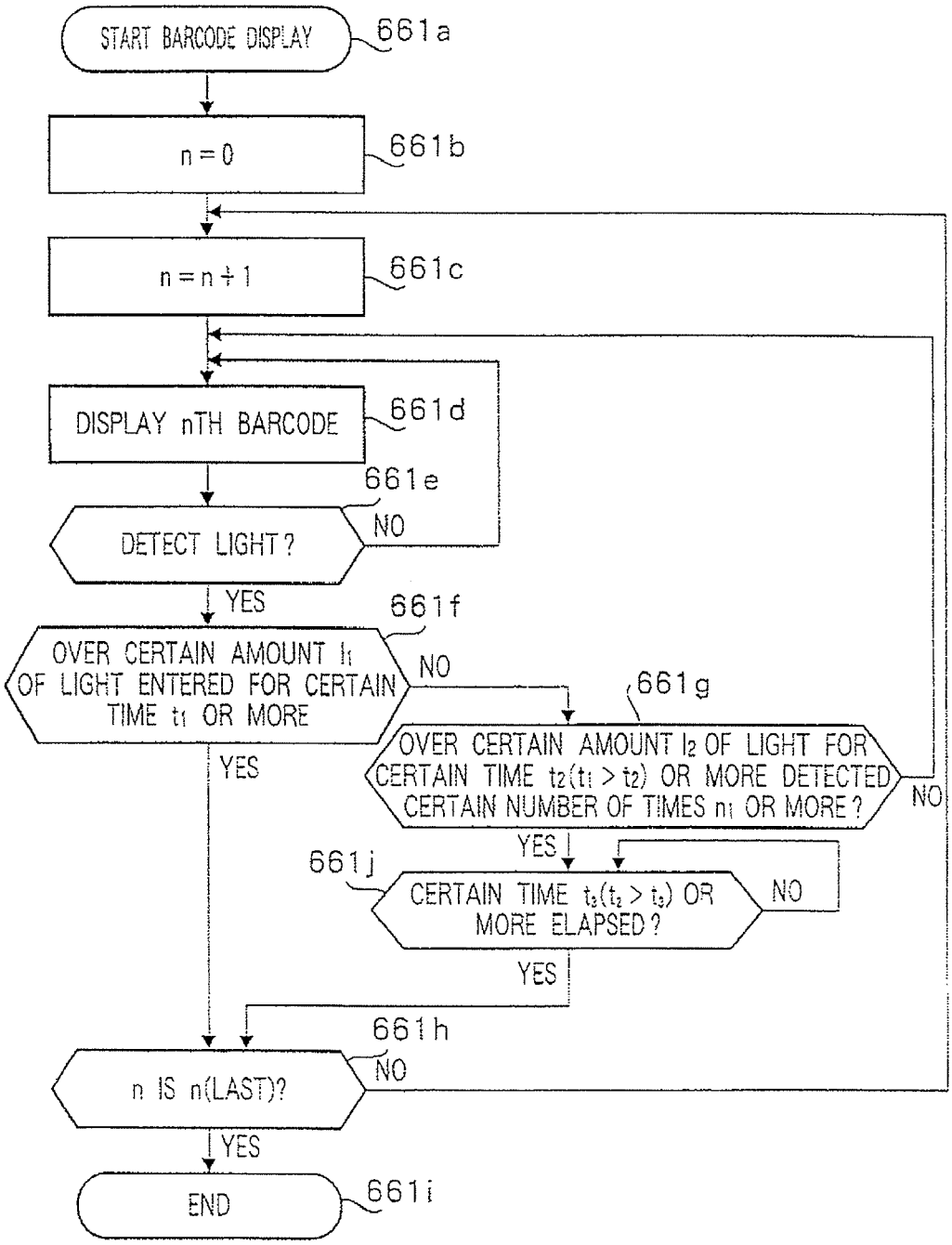
FIG. 36 is a flow chart showing a display procedure of the display section.
Figure 37:
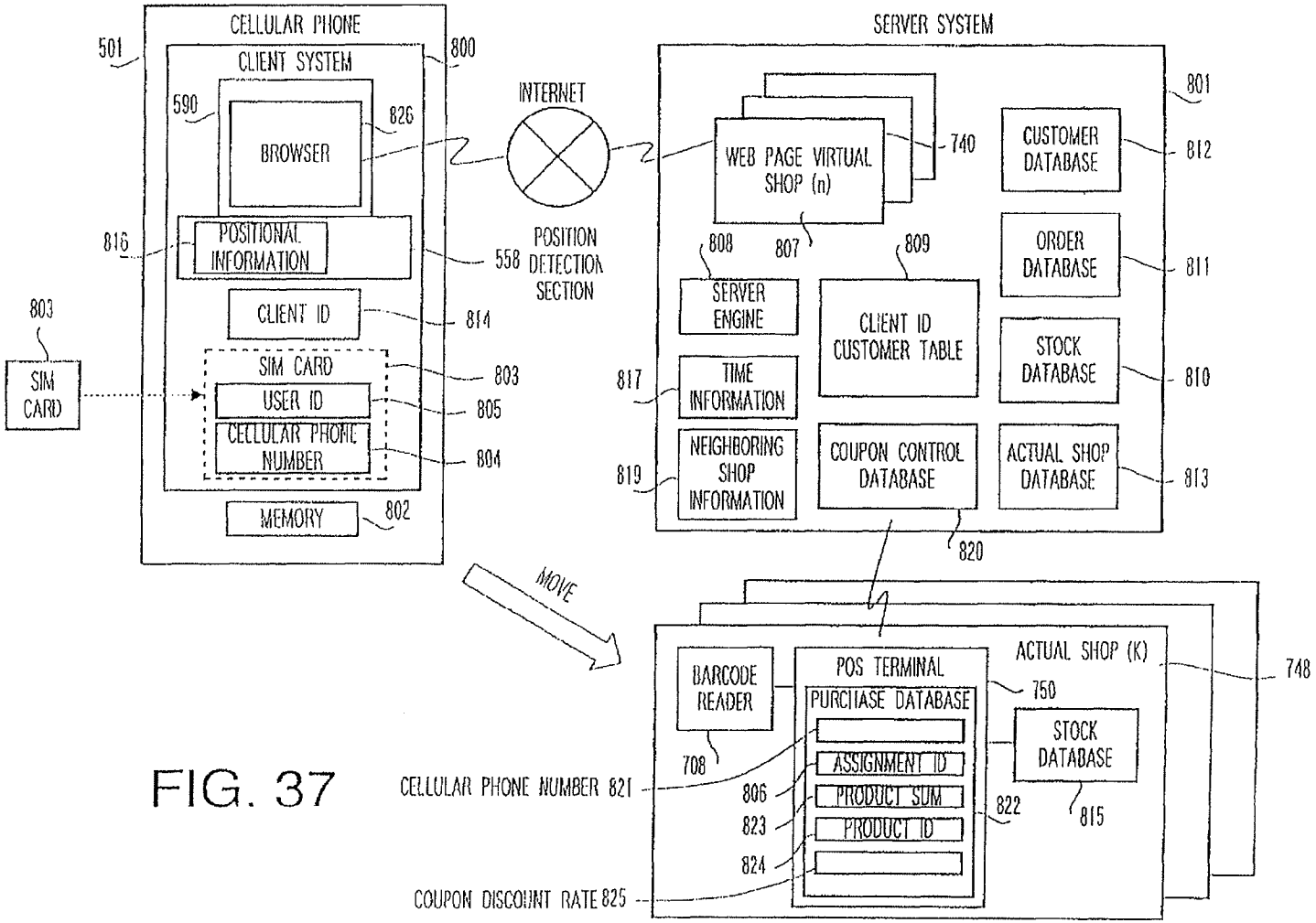
FIG. 37 illustrates configurations of a server, client and actual shop.
Figure 38:
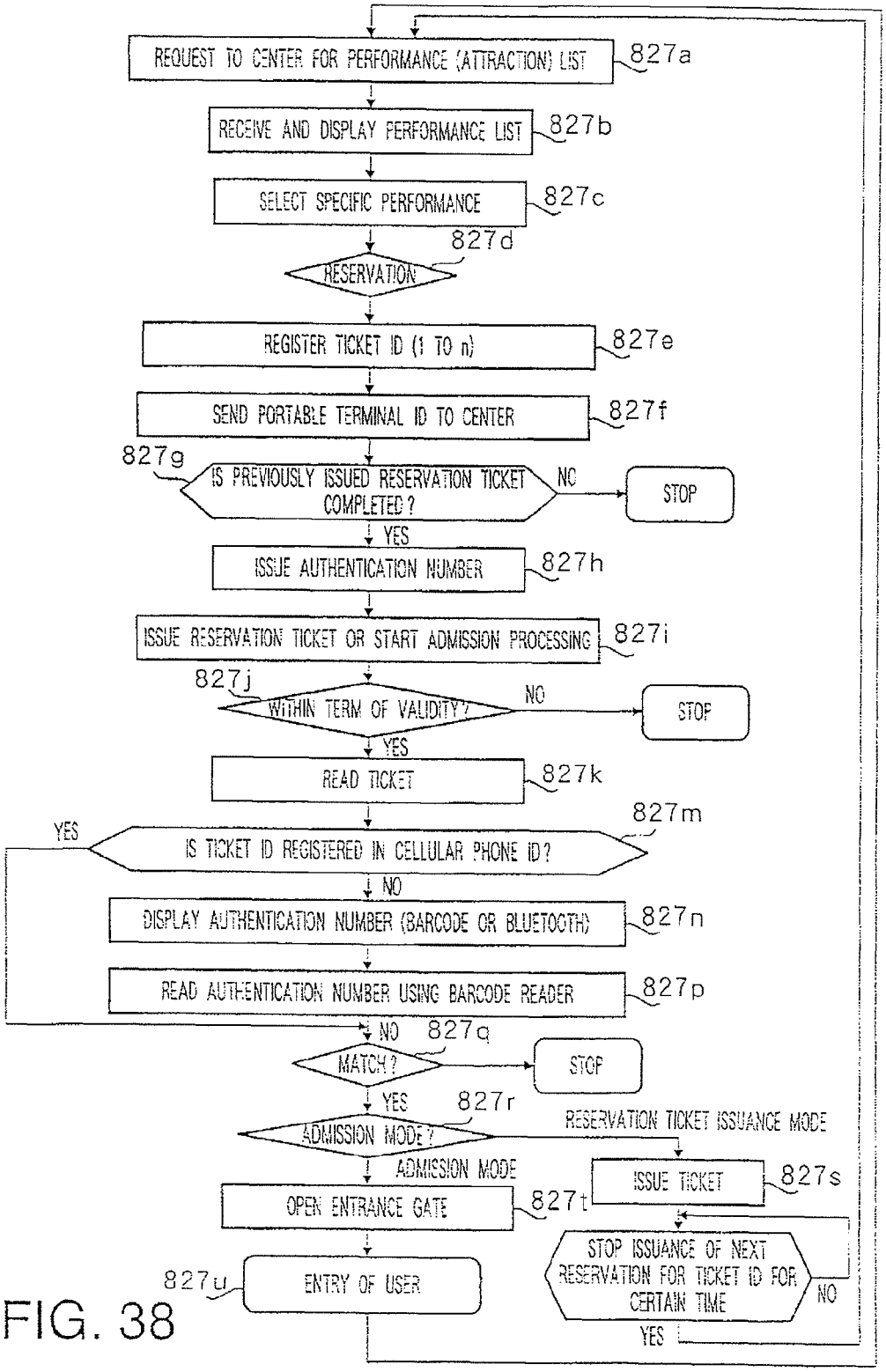
FIG. 38 is a flow chart showing an admission processing procedure.
Figure 39A:
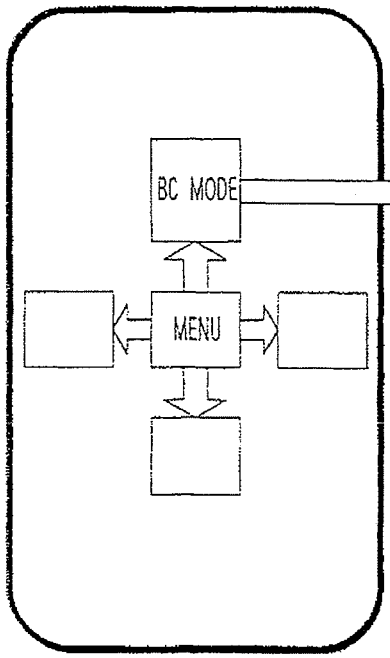
FIG. 39(*a*) illustrates a menu screen of a cellular phone.
Figure 39B:
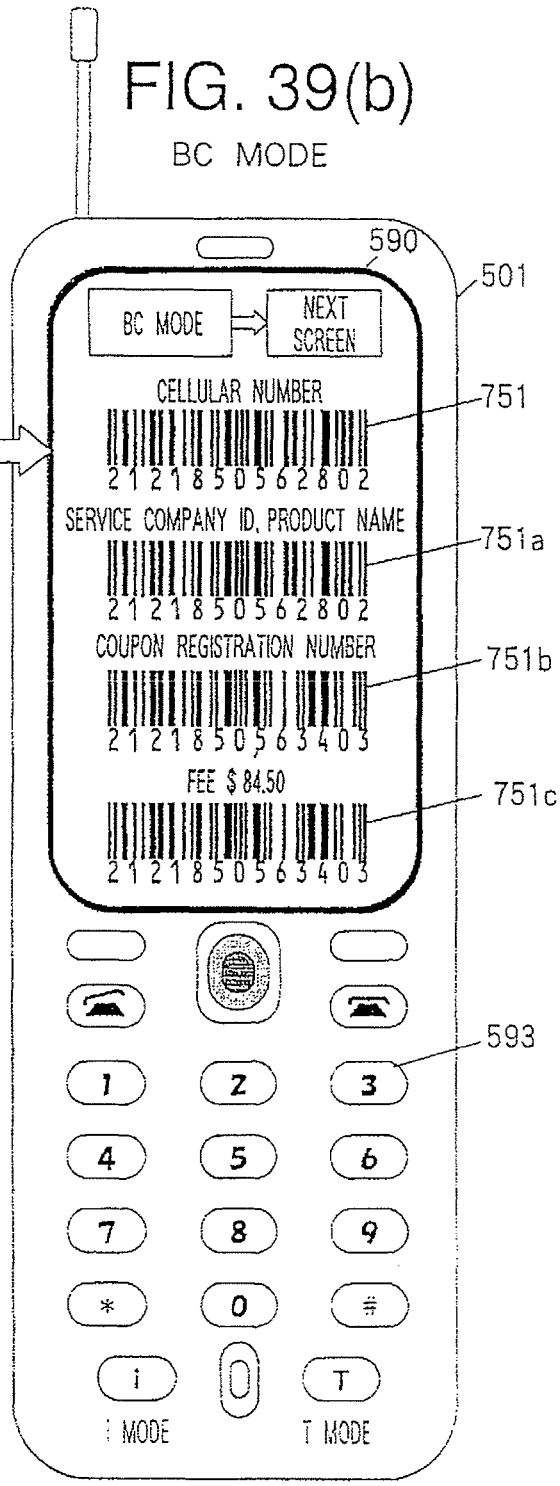
Figure 40:
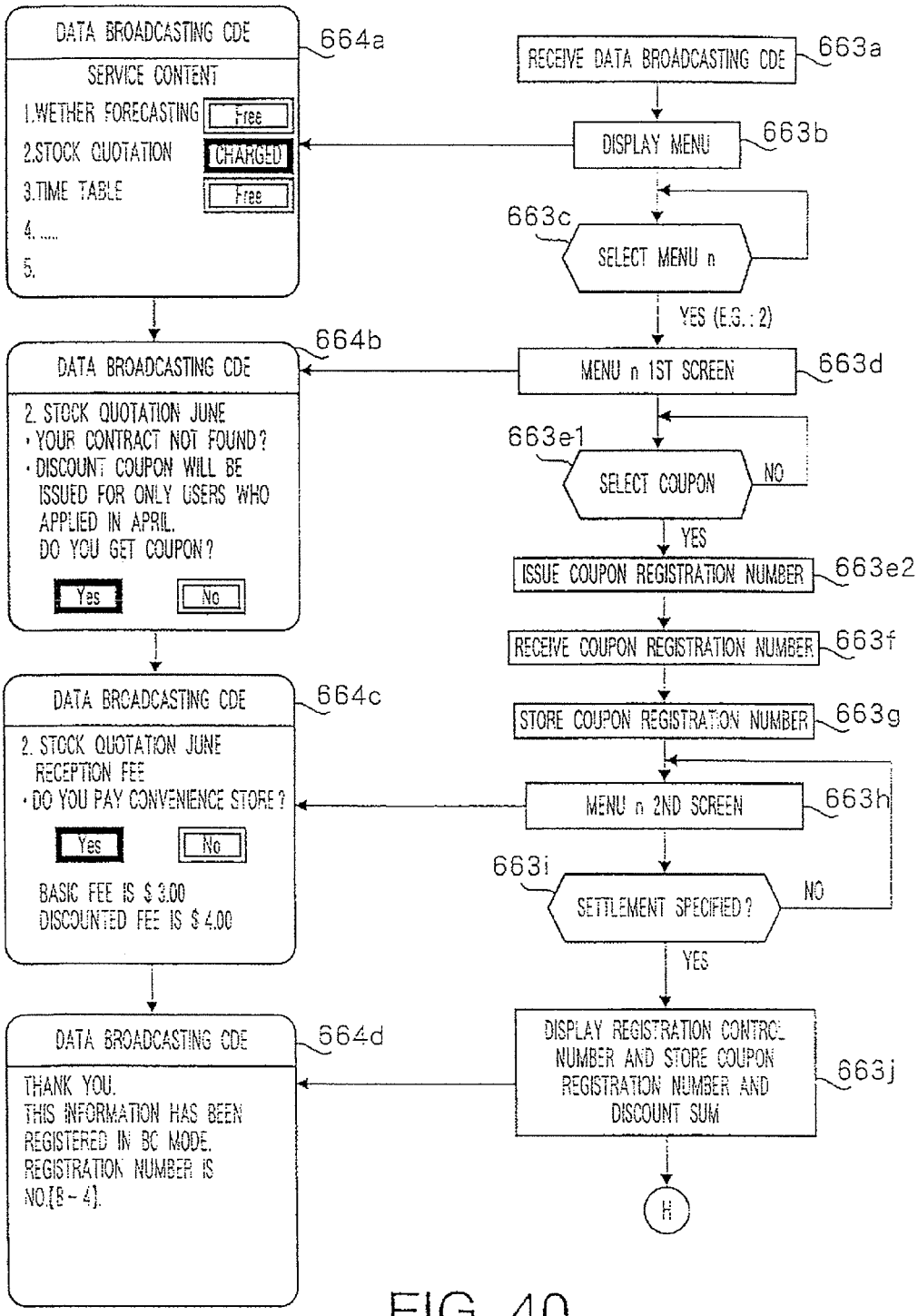
FIG. 40 is a flow chart of a screen display of a cellular phone.
Figures 1, 41:
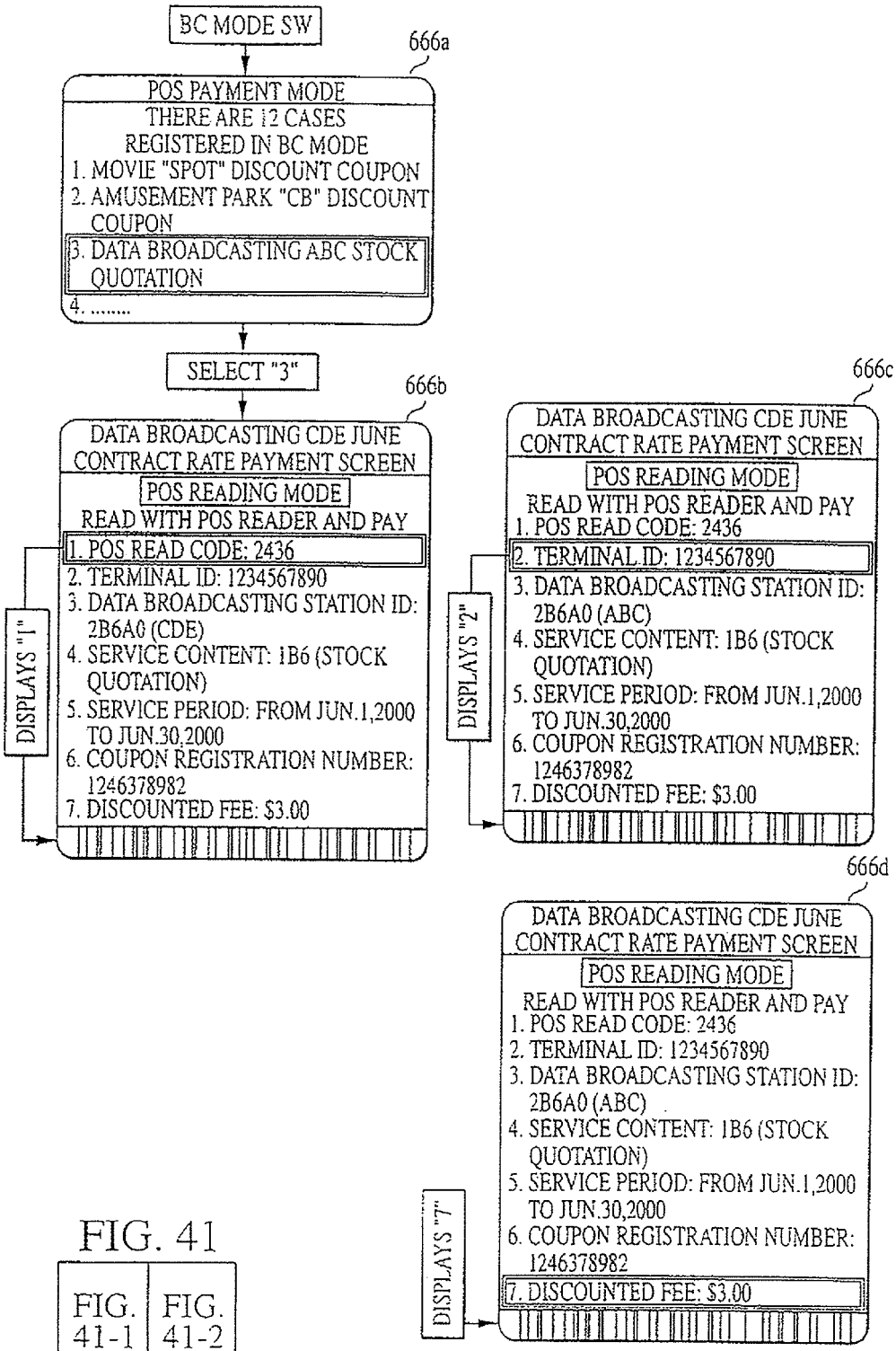
FIG. 41 is a flow chart of a screen display of a cellular phone.
Figures 2, 41:
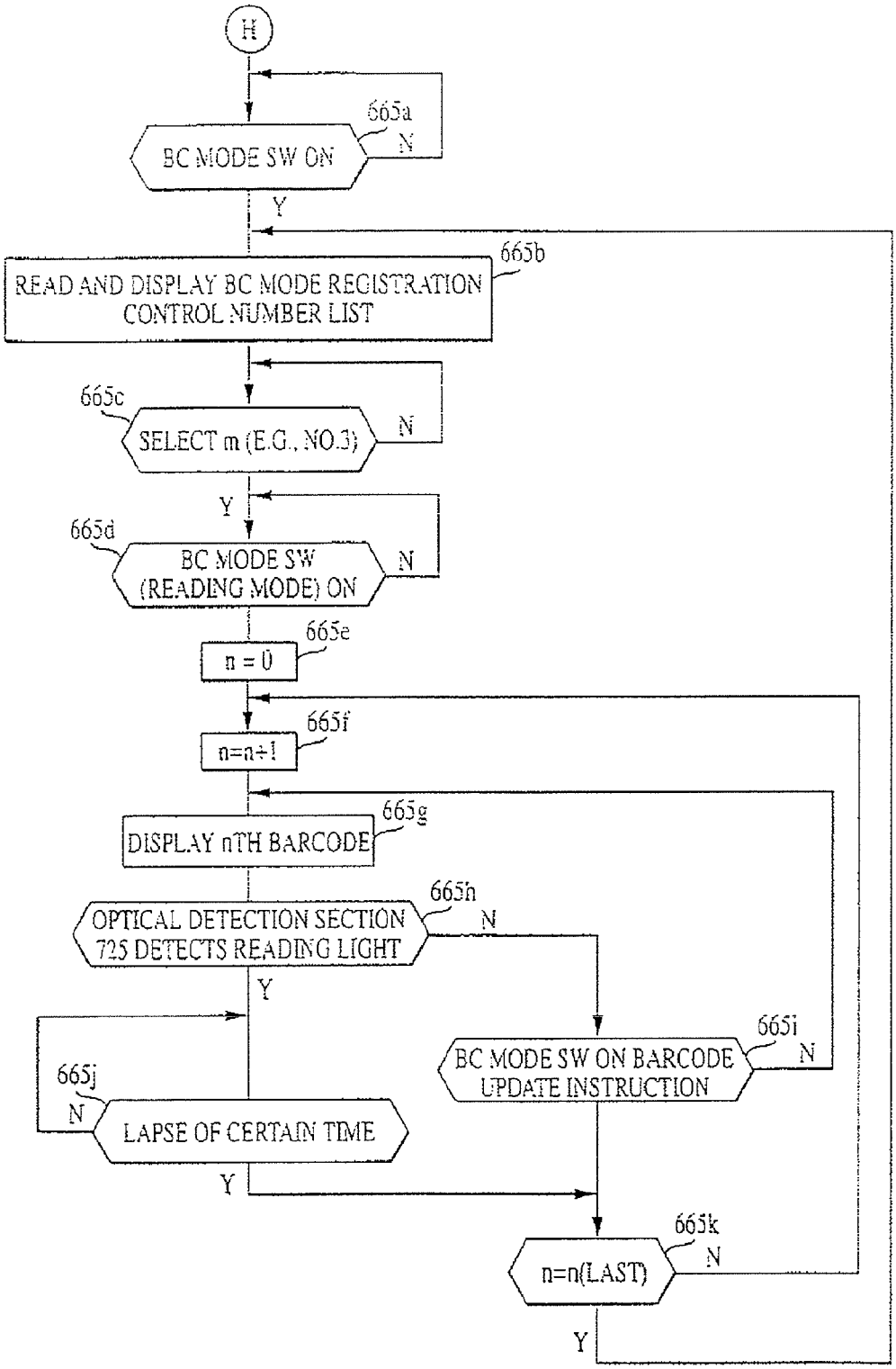
Figure 42A:
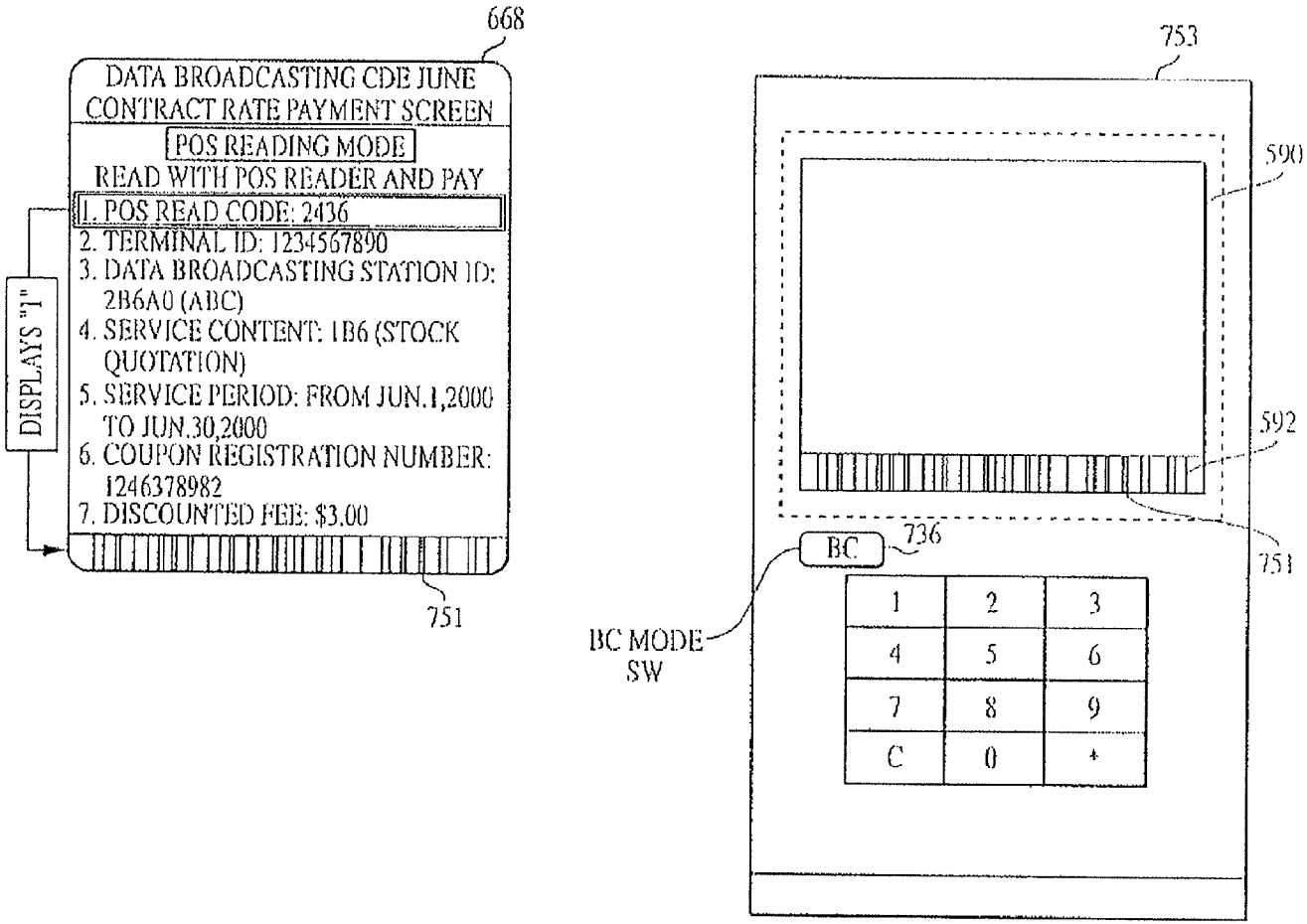
FIG. 42(*a*) is a top view of a portable device.
Figure 42B:
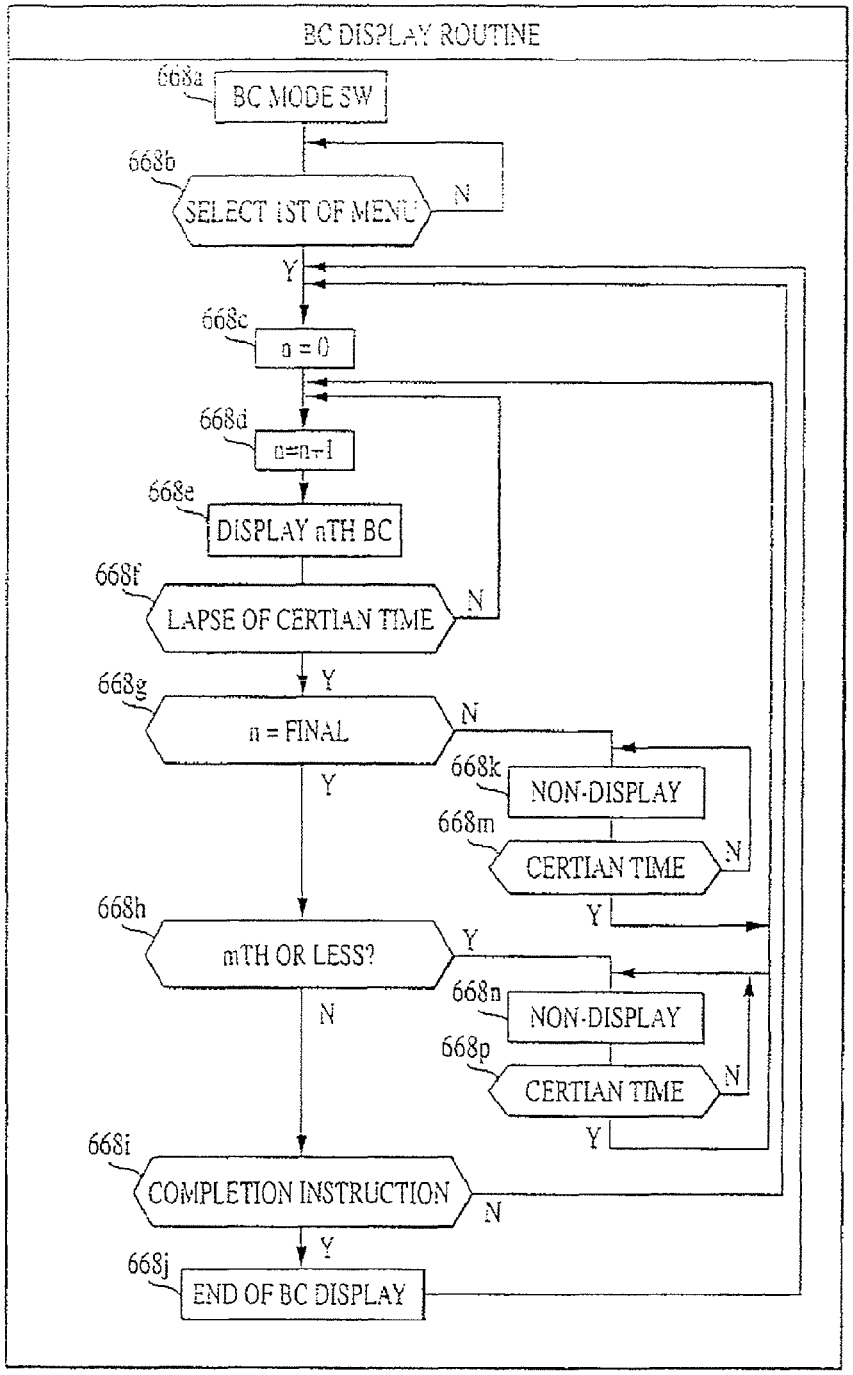
Figures 43A, 43B:
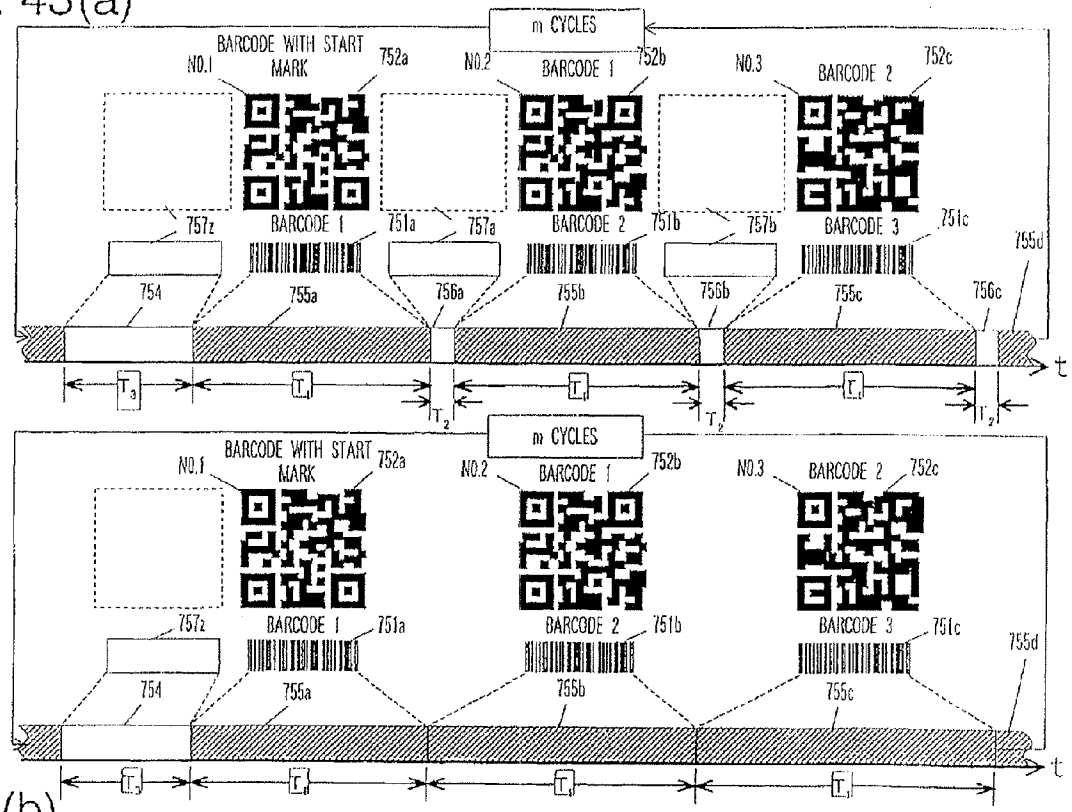
FIG. 43(*a*) is a timing chart of a barcode screen display when each barcode is displayed at predetermined intervals.
Figure 44:
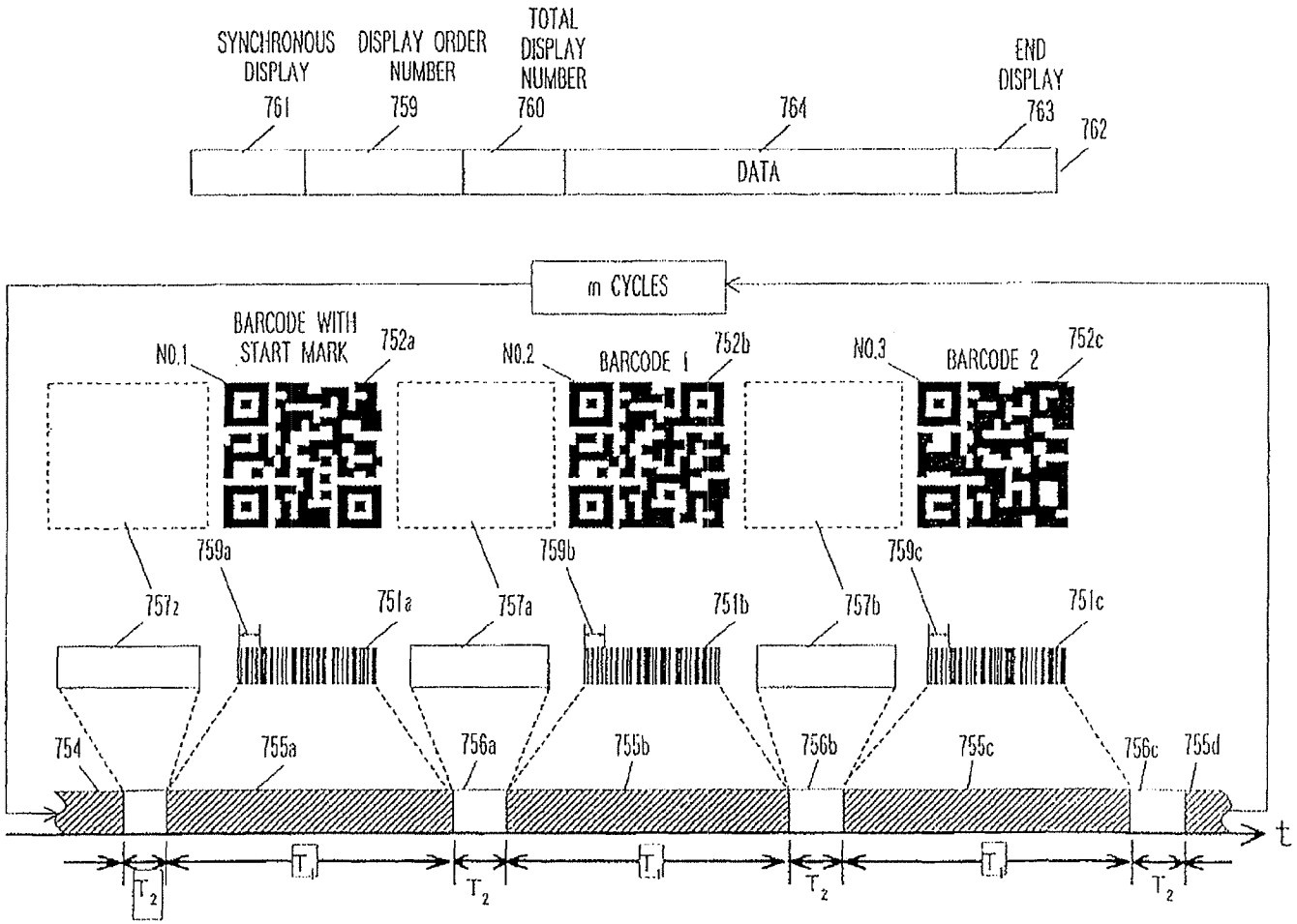
FIG. 44 is a timing chart of a barcode screen display.
Figures 45A, 45B, 45C:
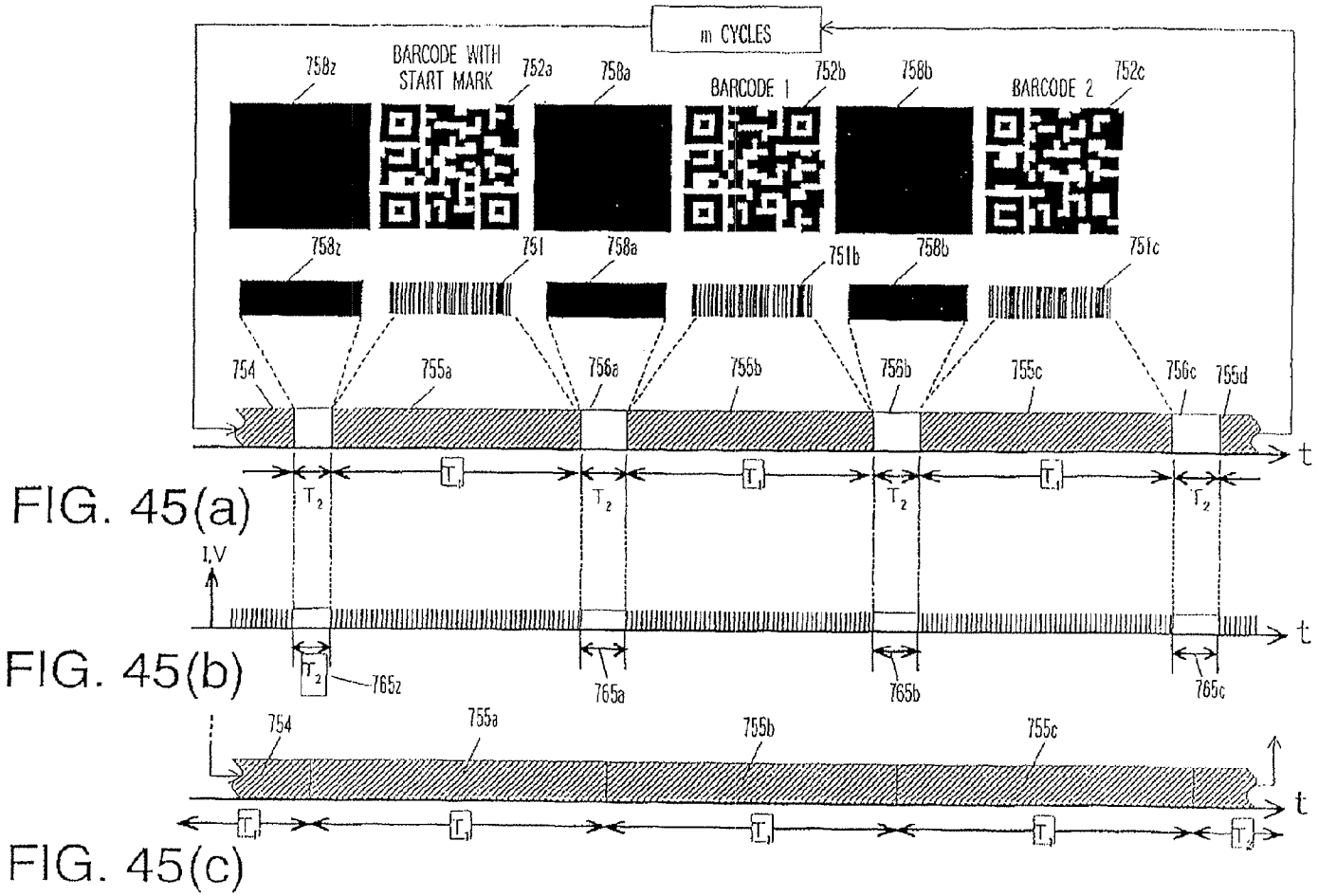
FIG. 45(*a*) is a timing chart of a barcode screen display.
Figure 46A:
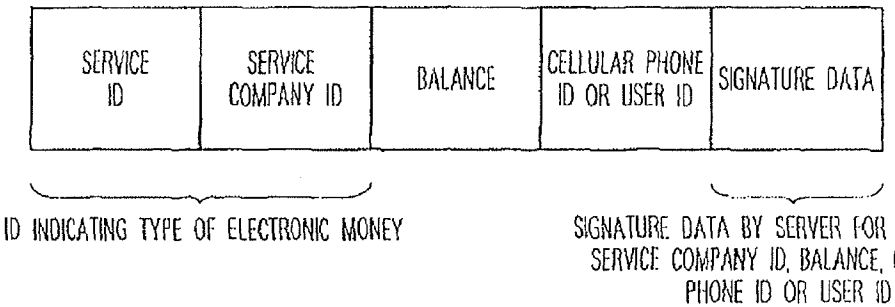
FIG. 46(*a*) illustrates a data structure of electronic money.
Figure 46B:
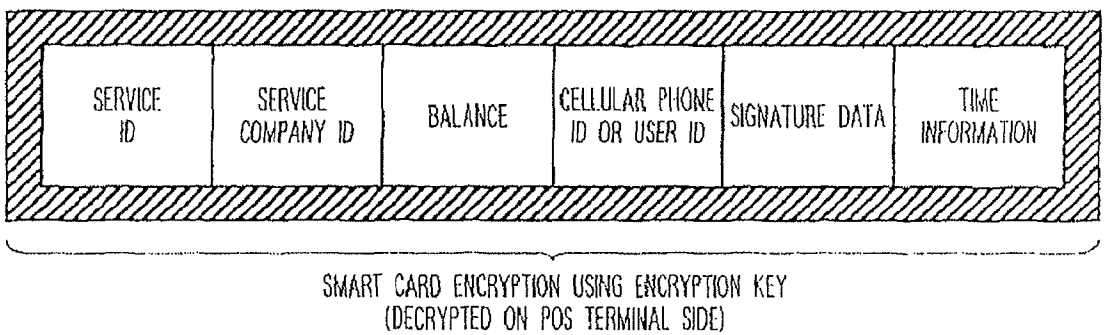
Figure 47:
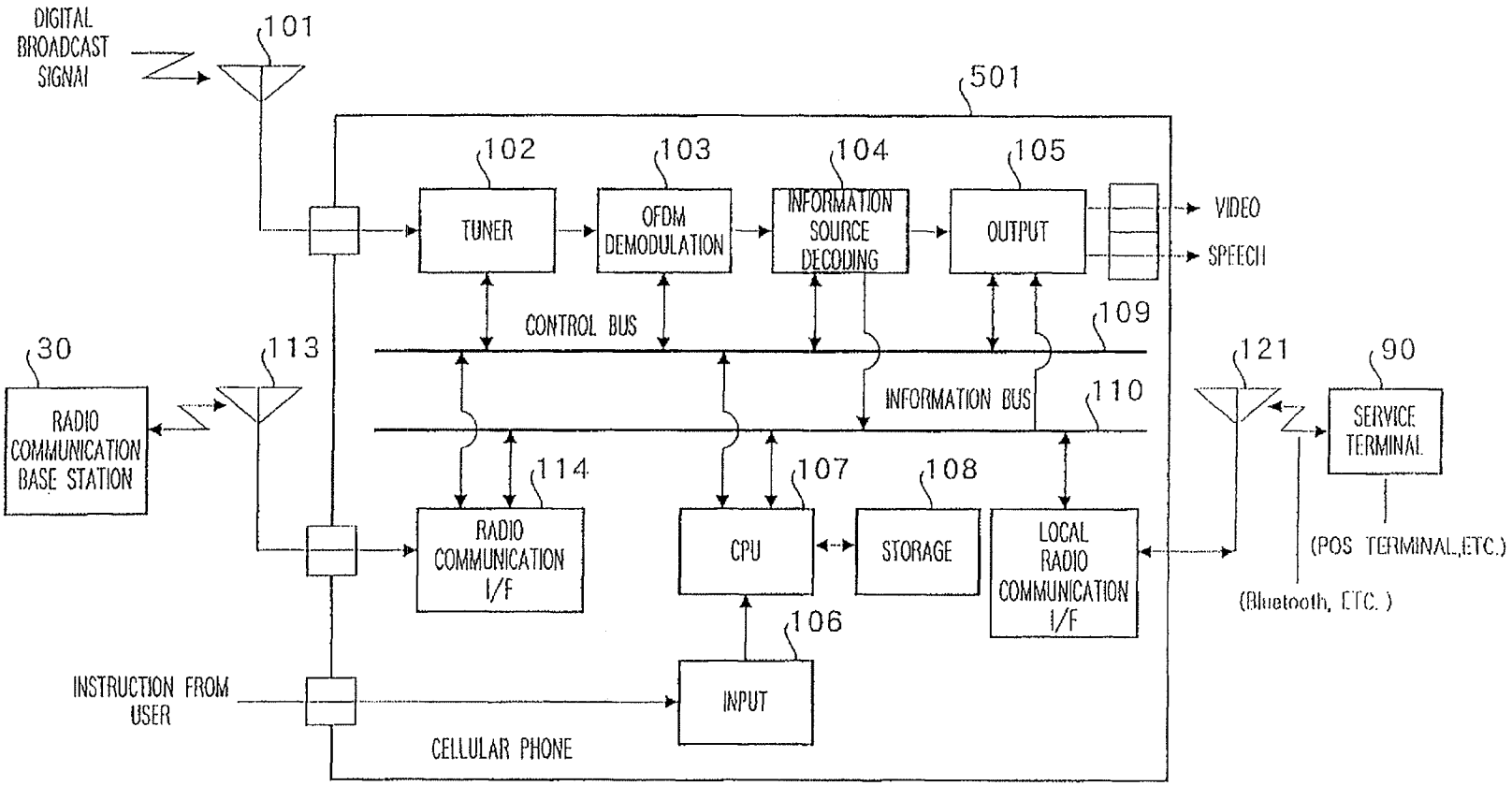
FIG. 47 is a block diagram showing a configuration of a cellular phone when a barcode is automatically displayed through a local communication.
Figure 48B:
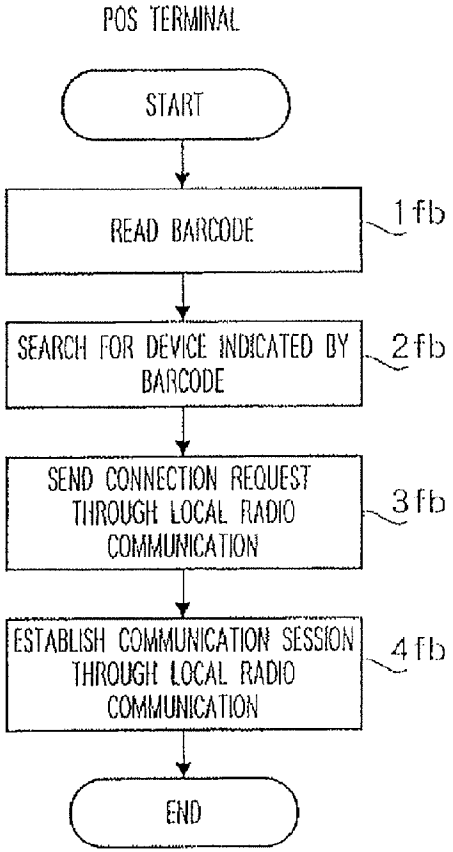
FIG. 48(*a*) is a flow chart showing a processing procedure of a cellular phone that selectively establishes a communication session through a local radio communication with a barcode.
Figure 48A:
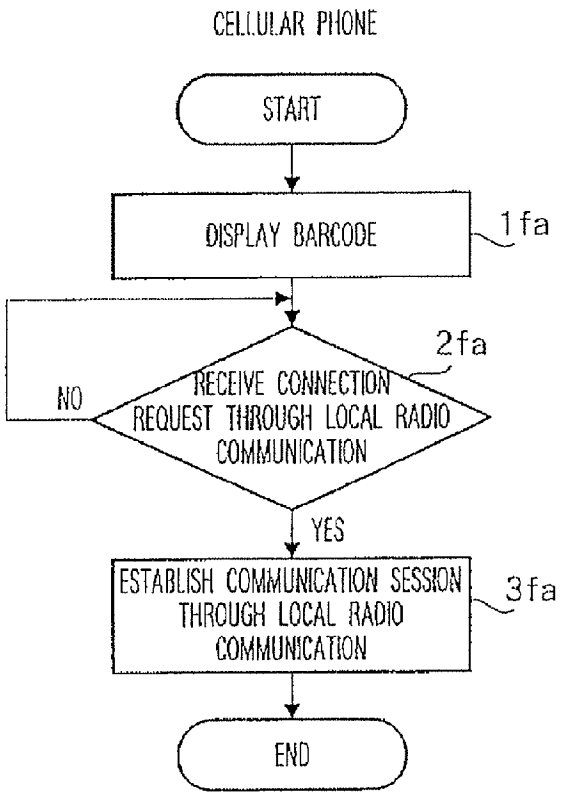
Figure 49B:
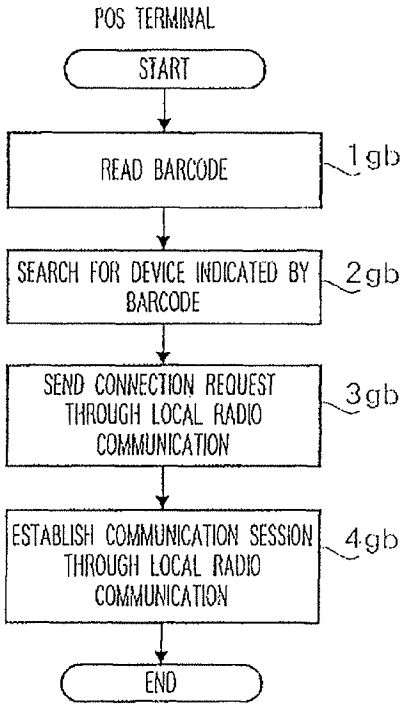
FIG. 49(*a*) is a flow chart showing a processing procedure of a cellular phone that establishes a communication session through a local radio communication by displaying a random number as a session ID with a barcode.
Figure 49A:
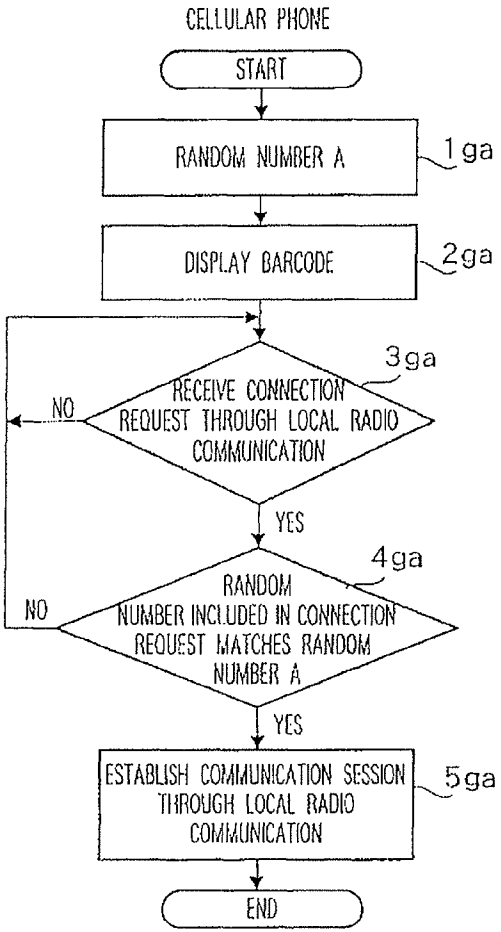
Figure 50:
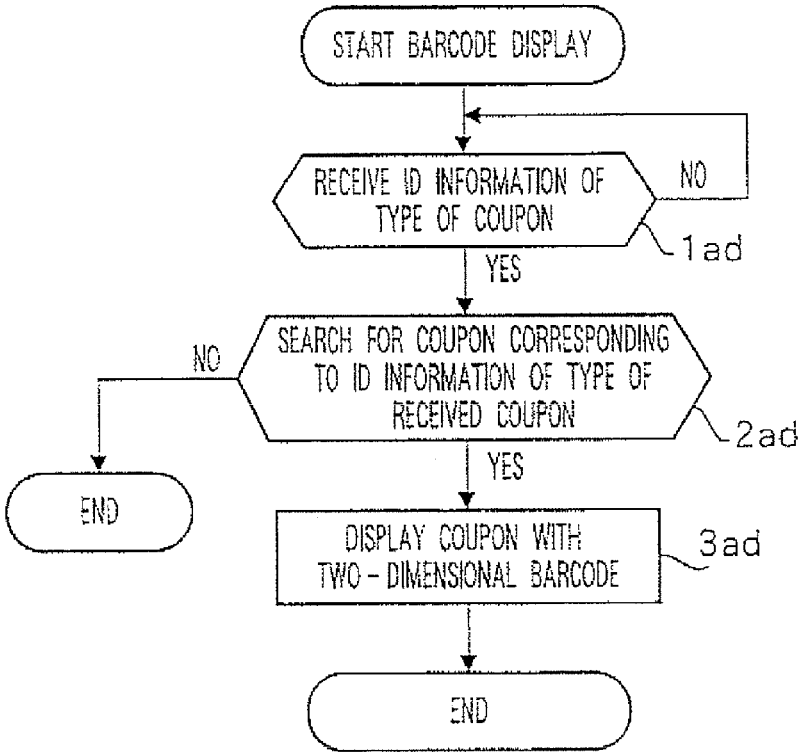
FIG. 50 is a flowchart showing a processing procedure of a cellular phone that automatically displays a barcode through a local communication.
Figure 51:
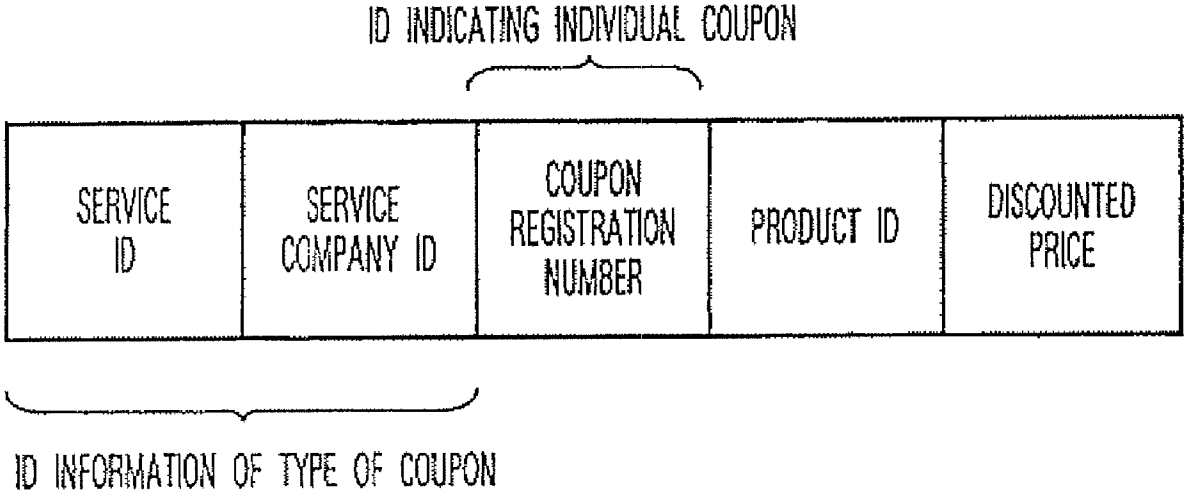
FIG. 51 illustrates a structure of coupon data when a barcode is automatically displayed through a local communication.

With reference now to the attached drawings, embodiments of the present invention will be explained below.

Clocks and control signals, etc. necessary for operation of each block in block diagrams except those necessary to explain operations of the present invention will be omitted as it would complicate drawings otherwise

(1) First Embodiment

FIG. [1] *5* is a block diagram showing a configuration of digital broadcasting reception apparatus 10A according to a first embodiment of the present invention.

This embodiment assumes a use mainly in a fixed reception environment such as household when the transmission mode does not change in a short time such as a program unit though the transmission mode may vary depending on the region or broadcaster, etc.

In FIG. [1] *5*, antenna 101 supplies a digital broadcast signal to an input of tuner 102. This tuner 102 selects a signal of a channel of the user's choice from the digital broadcast signal supplied from antenna 101, converts the frequency of the signal from a radio frequency band to a base frequency band and supplies the output to an input of OFDM demodulation section 103. OFDM demodulation section 103 applies processing such as demodulation and error correcting to the digital broadcast signal of the base frequency band to reproduce the transmission information string and supplies the output to an input of information source decoding section 104.

Here, the transmission information string has a format called "transport stream (hereinafter referred to as "TS") of MPEG2 (Moving Picture Experts Group 2) in which video information and speech information subjected to high efficiency coding (compression) and data, etc. are multiplexed.

Information source decoding section 104 separates the transmission information string into video information, speech information and data, decodes the video information and speech information subjected to high efficiency coding, then supplies the decoded video information and speech information to an input of output section 105 and supplies the data to CPU (Central Processing Unit) 107 via information bus 110. Output section 105 presents the decoded video, speech or a message, etc. from CPU 107 to the user.

Input section 106 receives an instruction from the user and transmits the content of the instruction to CPU 107. CPU 107 controls each block through control bus 109 based on instructions, etc. of the user f-from the input section. CPU 107 further receives the data separated by information source decoding section 104 or outputs a message, etc. to be presented to the user to output section 105 through information bus 110. Storage section 108 stores information required for this digital broadcasting reception apparatus 10A to operate.

Here, input section 106 includes not only buttons, etc. provided for this digital broadcasting reception apparatus 10A itself but also buttons provided for an external remote controller, etc. or an interface between the remote controller and this apparatus.

FIG. [2] *6* is a block diagram showing an internal configuration example of OFDM demodulation section 103 in FIG. [1] *5* and the output of tuner 102 is supplied to an input of quadrature detector 1031 inside OFDM demodulation section 103. quadrature detector 1031 performs quadrature detector on the digital broadcast signal of the base band to transform into a complex number signal made up of an in-phase axis (hereinafter referred to as "I-axis") and a quadrature axis (hereinafter referred to as "Q-axis") signal and supplies the output to guard period elimination section 1032. Guard period elimination section 1032 removes the guard period from the output of quadrature detector 1031 based on the information on the guard period length from control bus interface (I/F) section 1037 and supplies the output to an input of Fast Fourier Transform (hereinafter referred to as "FFT") section 1033.

FFT section 1033 applies FFT to the signal whose guard period has been removed based on the information on the effective symbol period length from control bus I/F section 1037 to separate the carriers sent after being multiplexed and supplies the output to a first input of detection section 1034 and an input of demodulation information decoding section 1036.

Detection section 1034 applies detection processing to each carrier supplied from the first input based on the demodulation information (each carrier modulation system) supplied from the second input and supplies the output to a first input of error correcting section 1035. Error correcting section 1035 applies error correcting processing to the detection result supplied from the first input based on the demodulation information (depth of time interleave and error correcting coding rate, etc.) supplied from the second input and supplies the output to information source decoding section 104 as the output of OFDM demodulation section 103.

Demodulation information decoding section 1036 extracts the carrier that transmits demodulation in formation from the output of FFT section 1033, applies detection/error correcting processing to the carrier to decode the demodulation information and supplies the output to detection section 1034 and a second input of error correcting section 1035.

Control bus I/F section 1037 interprets control information from CPU 107 transmitted through control bus 109 and supplies transmission mode information on the guard period length and effective symbol period length to guard period elimination section 1032 and FFT section 1033.

A block such as detection section 1034 may also actually use transmission mode information to generate a control signal necessary for operation, but FIG. [2] *6* omits such a case to prevent the drawing from being complicated. Furthermore, in order for OFDM demodulation section 103 to operate, it is necessary to carry out synchronization processing such as carrier frequency synchronization, sampling frequency synchronization, symbol synchronization and frame synchronization, but that synchronization processing is omitted for the same reason here.

Here, the digital terrestrial broadcasting system in Japan transmits demodulation information using a signal called "TMCC (Transmission and Modulation Configuration Control)" and FIG. [3] *7* shows the content.

Next, an operation of the digital broadcasting reception apparatus of this embodiment will be explained using the attached drawings. The digital broadcasting reception apparatus of this embodiment has at least preset mode and audio-visual mode as its operating modes.

FIG. [4] *8* is a flow chart showing an operation of CPU 107 and (a) shows an operation of the CPU in preset mode and (b) shows an operation of the CPU in audio-visual mode.

In preset mode, information to identify the current location is acquired from input section 106 (step S1). Then, start address A of the channel selection information corresponding to the identified current location and information count n is acquired (step S2) and address A to address A+(n−1) of the channel selection information are assigned to button 0 to (n−1) of input section 106 one by one (steps S3, S4, S5 and S6).

Here, an address, postal code, telephone number, etc. are used as the information to identify the current location and storage section 108 stores information associating such information with the start address of the channel selection information corresponding to each region and information count beforehand and CPU 107 references the information and can thereby acquire the start address of the channel selection information corresponding to the current location and information count.

In the audio-visual mode, the input of button j to which the channel selection information address is assigned in the preset mode is acquired from input section 106 first (step S11). Then, address A+j assigned to button j is accessed (step S12) to acquire the channel selection information of address A+j from storage section 108 (step S13). Then, frequency information Fj is transmitted to tuner 102 (step S14) and transmission information Mj is transmitted to OFDM demodulation section 103 (step S15).

FIG. [5] *9* shows an example of the content of storage section 108 and assignment to the buttons of input section 106. As shown in the figure, frequency information and transmission mode information are stored at the addresses as channel selection information.

The above-described configuration of this embodiment eliminates the need for the user to select a desired broadcaster, receive a digital broadcast signal and decide the transmission mode from the received signal, and can thereby provide desired information in response to the user's demand immediately.

By the way, the method of storing channel selection information in storage section 108 has not been explained in particular, but the channel selection information may be stored during manufacturing beforehand or the channel selection information may be updated as required. Using the latter method makes it possible to respond to a relatively long-term change of the transmission mode such that the distance between relay stations is shortened due to an addition of are lay station after the broadcasting service is started and the guard period length is changed.

Furthermore, as the method of acquiring new channel selection information, it is possible to use a method of multiplexing the transmission information string in a digital broadcast signal with the channel selection information, a method of providing separate communication means and acquiring channel selection information via a communication channel or a method of acquiring channel selection information via a recording medium, etc.

(2) Second Embodiment

FIG. [6] *10* is a block diagram showing a configuration of an OFDM signal transmission system according to a second embodiment of the present invention. In FIG. [6] *10*, components assigned the same reference numerals as those in FIG. [1] *5* operate in the same way as in the first embodiment.

This embodiment assumes a use mainly in a mobile reception environment such as an automobile and cellular phone when the transmission mode does not change in a short time such as a program unit though the transmission mode may vary depending on the region or broadcaster, etc.

Furthermore, this embodiment operates in the same way as the first embodiment except that it identifies the current location using a Global Positioning System (hereinafter referred to as "GPS").

In FIG. [6] *10*, GPS antenna 111 of digital broadcasting reception apparatus 10B supplies signals from GPS satellites 20A, 20B and 20C to an input of GPS processing section 112. GPS processing section 112 measures the time required for a signal to arrive from each satellite using pseudo-random codes included in signals from GPS satellites 20A, 20B and 20C, thereby calculates the distance from each satellite and identifies the current location based on the principle of triangulation. CPU section 107 uses the current location identified by GPS processing section 112 in the preset mode explained in the first embodiment.

The above-described configuration of this embodiment eliminates the need for the user to select a desired broadcaster, receive a digital broadcast signal and decide the transmission mode from the received signal, and can thereby provide desired information in response to the user's demand immediately and furthermore always identify the current location using GPS even in a mobile reception environment in which the current location is changing from moment to moment, which eliminates the need to frequently enter information to identify the current location according to the movement.

(3) Third Embodiment

FIG. [7] *11* is a block diagram showing a configuration of an OFDM signal transmission system according to a third embodiment of the present invention. In FIG. [7] *11*, components assigned the same reference numerals as those in FIG. [1] *5* operate in the same way as in the first embodiment.

This embodiment assumes a use mainly in a mobile reception environment such as an automobile and cellular phone as in the case of the second embodiment when the transmission mode does not change in a short time such as a program unit though the transmission mode may vary depending on the region or broadcaster, etc.

Furthermore, this embodiment operates in the same way as the first embodiment except that it identifies the current location using a position registration function in a cell-based mobile communication system.

The cell-based mobile communication system is a system whereby a service area is divided into multiple small areas called "cells", a base station is placed in each cell and the base station tracks and accesses the user according to the movement of the user. Since the user moves across a plurality of cells in this system, it is necessary to always localize the mobile unit to know the cell in which the mobile unit is. This system is also provided with a position registration function as the control technology indispensable to smoothly continue communication when the mobile unit changes from one cell to another.

Using the position registration function, the mobile unit acquires position information from the base station, registers the information in the own unit and also notifies it to a network. Then, upon detection of any position change, the mobile unit updates the position registration in the own unit and also notifies it to the network. Furthermore, when power of the mobile unit is turned off and turned on again, the mobile unit compares the position information from the base station at that time with the position information in the own unit and if both position information pieces do not match, the mobile unit updates the position registration in the own unit and notifies the new position information to the network.

In FIG. [7] *11*, radio communication antenna 113 of digital broadcasting reception apparatus 10C supplies a signal from radio communication base station 30 to radio communication interface (I/F) section 114 and also emits a signal supplied from radio communication I/F section 114 to radio communication base station 30. Radio communication I/F section 114 extracts the position information included in the signal from radio communication base station 30 supplied from radio communication antenna 113, identifies the current location and transmits the information to CPU 107. CPU 107 uses the current location information transmitted from radio communication I/F section 114 in the preset mode explained in the first embodiment.

The above-described configuration of this embodiment eliminates the need for the user to select a desired broadcaster, receive a digital broadcast signal and decide the transmission mode from the received signal, and can thereby provide desired information in response to the user's demand immediately and at the same time can always identify the current location using the position registration function in a cell-based mobile radio communication even in a mobile reception environment in which the current location changes from moment to moment, which eliminates the need to frequently enter information to identify the current location according to the movement of the mobile unit.

(4) Fourth Embodiment

FIG. [8] *12* is a block diagram showing a configuration of an OFDM signal transmission system according to a fourth embodiment of the present invention. In FIG. [8] *12*, components assigned the same reference numerals as those in FIG. [1] *5* and FIG. [7] *11*, operate in the same way as in the first embodiment and the third embodiment.

This embodiment assumes a use mainly in a mobile reception environment such as an automobile and cellular phone when the transmission mode varies depending on the region or broadcaster, etc. and the transmission mode changes in a short time such as a program unit.

Furthermore, this embodiment transmits program information including transmission mode information using a channel different from the channel for broadcasting and uses the information when a channel is selected.

In FIG. [8] *12*, program information distribution center 50 acquires/stores program information from broadcasting station 60 through communication channel 40 and distributes the program information according to a request from digital broadcasting reception apparatus 10D.

On the other hand, unlike the first to third embodiments, digital broadcasting reception apparatus 10D can provide the user's desired information without the preset mode as the operating state.

FIG. [9] *13* is a flow chart showing an operation of CPU 107 in digital broadcasting, reception apparatus 10D.

First, a menu is presented to the user through output section 105 (step S20). When the user desires digital broadcasting (steps S21, S23), digital broadcasting reception apparatus 10D sends a request for program information distribution to program information distribution center 50 using radio communication I/F section 114 and radio communication antenna 113 (step S23). At this time, not only the request but also the current location are notified using the position registration function explained in Embodiment 3.

Upon reception of the distribution request and current location from digital broadcasting reception apparatus 10D through radio communication base station 30 and communication channel 40, program information distribution center 50 distributes information on the program supplied by the broadcasting station that can be received at the current location to digital broadcasting reception apparatus 10D through communication channel 40 and radio communication base station 30 (step S23).

CPU 107 in digital broadcasting reception apparatus 10D acquires the program information from program information distribution center 50 through radio communication antenna 113 and radio communication I/F section 114 and stores the information in storage section 108 (step S24) and presents a list of programs that can be received at the current location through output section 105 (step S25).

Then, when the user selects a desired program from the above-described list (step S26), CPU 107 acquires the channel selection information corresponding to the above program from storage section 108 (step S27), transmits the frequency information to tuner 102 (step S28) and transmits the transmission mode information to OFDM demodulation section 103 (step S29).

FIG. [10] *14* shows an example of the content of the program information. In this example, the program information includes titles and genres as content information, frequency information and transmission mode information as channel selection information and start time and end time as time information for each program.

The above-described configuration of this embodiment makes it possible not only to provide a program of the user's choice without a preset operation but also to always identify the current location using the position registration function in a cell-based mobile radio communication even in a mobile reception environment in which the current location changes from moment to moment, eliminating the need to frequently enter information to identify the current location according to the movement of the mobile unit.

By the way, if the system is set so that the program information also including schedules a certain time ahead, for example, within 24 hours or within one week is distributed and digital broadcasting reception apparatus 10D stores the content in storage section 108, such an operation that the user reserves a desired program and the program is automatically presented at the time of starting the program will also be available.

Furthermore, this embodiment has described that channel selection information is associated with the program as the program information, but in the case where the transmission mode does not change in a short time such as a program unit though the transmission mode may vary depending on the region or broadcaster, etc., program information distribution center 50 can also distribute the channel selection information associated with the broadcaster and digital broadcasting reception apparatus 10D can also assign the information to the buttons, etc. of input section 106 as in the case of the first to third embodiments.

Furthermore, if the transmission mode changes after such assignment or if the current location changes due to movement, digital broadcasting reception apparatus 10D notifies the user via output section 105 that it is impossible to receive and requests program information distribution center 50 for the redistribution of the information, presents a new list and updates the assignment information, and can thereby improve convenience for the user.

(5) Fifth Embodiment

The fifth embodiment will describe transmission information management carried out by a transmission information control section made up of a CPU. Frequency control of transmission information, time control such as elapsed time after use, field intensity control, control and prediction of channel region identification service content, etc., information compression using patterned information, etc. will be explained in detail. Transmission information is included in either or both of transmission data of a cellular phone from a base station or transmission data from a TV broadcasting station, but this embodiment will describe an example of information sent from a cellular phone base station.

(5-1) Overall Configuration

FIG. [11] *15* is an overall view showing a relationship between TV reception type cellular phone 501, terrestrial TV station 502 and cellular phone base station 503. Terrestrial TV station 502 sends broadcast signal 504 in downward unidirection to cellular phone 501, which receives part of data of a specific channel of this broadcast signal 504. Broadcast signal 504 is also sent to a fixed receiver having fixed antenna 514, that is, digital TV receiver 505.

(Cellular reception) On the other hand, TV reception type cellular phone 501 receives downlink signal 506, 506a or 506b which are signals from one or a plurality of cellular phone base stations 503, 503a or 503b near cellular phone 501, and sends uplink signal 507, 507a or 507b to any one or a plurality of stations cellular phone base stations 503, 503a or 503b. Cellular phone base station 503 is connected to public network 511 via cellular phone control section 510. In the case of a specific cellular phone service company, cellular phone control section 510 is connected to Internet 513 through server 512.

(Fixed reception) As described above, in the case where transmission data is also received by TV receiver 505 of digital TV with a fixed antenna 514 with high sensitivity such as a household TV, instead of the aforementioned partial broadcast data, all data in a specific channel is received. Some of TV receivers 505 are connected to local fixed telephone station 515 via a telephone line and can access Internet 513 via public network 511.

There are great differences in reception conditions when the aforementioned digital TV broadcast data is received by cellular phone 501 and when the digital TV broadcast data is received by fixed TV receiver 505. When the digital TV broadcast data is received by TV reception type cellular phone 501, the receiver moves. When the aforementioned SFN (Single Frequency Network) channel broadcast data is received, the receiver moves from one place to another as shown in FIG. [12] *16* and even if the receiver moves into the service area of the next broadcasting station, it receives a TV signal with the same frequency having completely the same information, and therefore the receiver has no trouble with TV reception and continues to receive the broadcast data seamlessly and its movement causes no problem.

However, in the case of receiving broadcast data of a non-SFN channel, in the process in which the receiver moves from position 1 (FIG. [12] *16*) to position 5, the receiver using the conventional method cannot receive signals from first TV station 502 in certain points between position 2 and position 3 due to a reduction of field intensity.

Therefore, the user of the TV reception type cellular phone switches between frequencies using a tuner in an attempt to search for the channel corresponding to the broadcast data. Then, the user finally conies to know the presence of second TV station 502a and tries to receive the broadcast data. However, in the case of digital TV broadcasting, unlike analog broadcasting, the receiver cannot manage to receive signals by simply tuning the frequency. It is impossible to receive physical layers without matching transmission information parameters such as a guard time and error coding gain. For this reason, the conventional TV reception type cellular phone changes parameters in various ways in a round-robin system in an attempt to find which parameter is best suited.

There are several tens to several thousands of types of combinations of parameters. For this reason, it takes time to match parameters. After obtaining the demodulation information of the first layer of the received signal, it is possible to demodulate the second and higher layers, and therefore it is possible to obtain information. Since it takes time to determine parameters in this way, if frequencies are included, there is a period of time, for example, several seconds to a maximum of several tens of seconds during which no TV reception signal can be output In the case where the channel through which the receiver managed to receive signals is not broadcasting the service desired by the user, the user switches over to another channel to continue to search for the service of the user's choice. In this case, too, it takes time to determine parameters and therefore it takes further extra time.

The present invention receives at least a base station ID from downlink signal 506 of cellular phone base station 503, obtains positional information from the base station ID, obtains transmission information including parameters to demodulate the modulated signal of TV broadcasting from the positional information and demodulates the signal or the present invention can skip the channel demodulation procedure by reading the transmission information of the regional TV broadcasting station corresponding to the base station ID obtained using a transmission information control database which is a correspondence list pre-recorded in the cellular phone. Therefore, it is possible to shorten a channel reception time or channel switching time.

Here, FIG. [13] *17* shows a configuration of cellular phone base station 503. Base station 503 comprises cellular phone base station antenna 516, base station transmission/reception circuit 517, communication control section 518 called "RNC (Radio Network Controller)" connected therewith through a channel in ATM (Asynchronous Transmission Mode), etc. and PDSL (Panasonic digital soft laboratory) 520 connected to backbone 519. These are the blocks required for communications by cellular phones.

Cellular base station 503 transmits data as shown in FIG. [14] *18*. That is, cellular phone data 522 which is basic information of transmission data in standby mode in FIG. [14] *18*(a) and cellular phone data 523 which is basic information in communication mode in FIG. [14] *18*(b) include base station ID 521 or base station number 521. Therefore, the base station ID can be received in all cellular phone service areas and this base station ID can be used as auxiliary information for TV reception.

Furthermore, base station 503 according to the present invention sends part or the whole of TV reception transmission information data 524 necessary for TV reception. In the case of this transmission information, transmission information of another broadcasting station can also be sent included in the TV broadcast signal. In this case, once TV reception is successful, it is possible to acquire transmission information of other stations, and therefore effects similar to those in the case of base station transmission can be obtained. However, once TV reception is suspended, information on the base station is required.

(5-2) Explanations of First and Second Transmission Information

TV reception data 524 in FIG. [14] *18* will be explained. FIG. [15] *19* is a flow chart showing a specific content of this TV reception data in compliance with the ISDB-T standard which is the OFDM-based digital TV broadcasting standard in Japan. An OFDM-based TV broadcasting standard such as DVB standard also has similar parameters.

FIG. [14] *18*(a) illustrates transmission data in standby mode of a cellular phone, and the cellular phone uses a first highly resistant channel and sends cellular phone data 522, that is, base station ID 521 to identify the base station and data of a free cellular phone communication channel. As described above, the cellular phone base station according to the present invention sends TV reception data 524 necessary for tuning/demodulation of digital TV broadcasting in addition to this.

TV reception data 524 includes transmission information 528 that indicates the channel of the TV broadcasting station currently in transmission. Transmission information 528 includes channel IDs of all channels currently in transmission. Channels in transmission 527 are received and used not only by fixed reception stations but also by trains and automobiles. when partial broadcasting is dedicated to a T mode cellular phone, limiting partial broadcasting to the channel ID of the broadcasting station currently providing services has an effect of reducing the amount of information.

A case of the ISDB-T standard is shown as an example. As shown in FIG. [16] *20*(a), since broadcasting data 528 of one channel of HD broadcasting which is TV broadcasting with the same transmission resistance and high resolution or 4 to 5 channels of SD broadcasting which is TV broadcasting with normal resolution is sent using one broadcasting with one broadcasting band of 6 MHz or 8 MHz, channel in transmission 527 can be used.

However, in this embodiment as shown in FIG. [16] *20*(b), one or two specific partial segments 529 of the 13 segments has stronger resistance than other general segments 530. For example, resistance is increased by changing parameters and lowering the information transmission efficiency, for example, using QPSK for specific partial segments as opposed to using 64 QAM for general segments as the modulation system, or using 2K for the first as opposed to using 8K for the latter as the FFT size.

This embodiment calls this layered type broadcasting "partial transmission" or "partial broadcasting". Since partial segment 529 is broadcast with resistant parameters, partial segment 529 can be received even by a small antenna such as antenna 531 (FIG. [17] *21*) of a cellular phone. On the other hand, in the case of partial broadcasting, since the frequency band used is narrow and the transmission efficiency is lower, the transmission data capacity decreases drastically from hundred Mbps to a little over 1 Mbps.

However, in the case of a mobile device such as a cellular phone, the display screen is as small as 1 inch to several inches and using MPEG4 which provides a low transmission rate of several tens of Kbps to several hundreds of Kbps with a high compression rate or a wavelet system makes it possible to provide a screen of quality without any audio-visual trouble.

Furthermore, data broadcasting using a single segment 532 or three segments as shown in FIG. [16] *20*(c) is defined by ISDB-T and this is also suitable for cellular reception as in the case of "partial transmission". This specification also includes this data transmission in "partial transmission".

According to FIG. [14] *18* again, transmission information 528 includes the data of above-described channel 533 in partial transmission for cellular phones that perform such mobile unit reception. A channel number (hereinafter abbreviated as "ch") being broadcast only indicates a frequency band assigned in each country. For example, in an area away from another area broadcasting 15ch with a distance enough to prevent mutual interference, a different broadcasting station provides a completely different broadcasting service using the same channel, that is, the same frequency.

TV reception using a cellular phone requires both stations to be identified because the mobile unit is moving. Thus, identification information 534 is added to identify the broadcasting stations with the same channel. It is not until identification information 534 is added that it is possible to identify each broadcasting station. For example, even the same 15ch is defined as 15-1ch for the first in area A and 15-2ch for the latter in area B.

Thus, defining channels of each broadcasting station by adding an identifier capable of identifying different broadcasting stations with the same frequency for different areas makes it possible to identify broadcasting stations with different areas using the same frequency band, that is, the same channel. This makes it possible to prevent misoperation caused by settings of wrong transmission parameters due to wrong recognition of a broadcasting station with the same channel.

Furthermore, the base station according to the present invention transmits field intensity information 535 for each channel. It is possible for the receiver to control this information to select a reception channel with higher priority from a channel group with strong field intensity, providing more stable reception.

Then, transmission information necessary for demodulation will be explained in detail using FIG. [14] *18* and FIG. [15] *19*. First transmission information 526 includes transmission frequency 536 that indicates a channel to be transmitted, partial broadcasting identifier 550, FFT size 537, guard ratio 538 that indicates the ratio of a symbol time to a guard interval and transmit power 539 of a broadcast antenna as shown in FIG. [15] *19* or FIG. [14] *18*.

As shown in FIG. [15] *19*, through first transmission information 526, it is possible to know various parameters before the broadcast signal or demodulation. For this reason, with the setting of the first parameters, data in the first layer of layer transmission by OFDM or PSK is demodulated. At the same time, demodulation information 541 to demodulate the second layer, for example, TMCC data of the ISDB-T standard or TPS data of the DVB standard, etc. can be acquired from the data demodulated from the first layer. This demodulation information allows all data to be demodulated.

In the case of mobile unit reception for applications such as cellular phones and automobiles, parameters of first transmission information 526 change frequently because these mobile units move across a plurality of service areas of broadcasting stations when parameters of the first transmission information are unknown, there is no way other than attempting to set all parameters according to a round-robin system and try demodulation. Since there are a total of 12 combinations of the first transmission information in the case of the ISDB-T standard, it is necessary to perform setting operations a maximum of 12 times to determine parameters in the first layer. For this reason, it takes time to output reception data, while the present invention has an effect of reproducing data in the first layer instantaneously.

Since this data in the first layer includes demodulation information 541 containing parameters, etc. necessary to demodulate layer signals from the second layer onward or to correct errors, when a first step to demodulate the first layer is followed by a second step to demodulate demodulation information 541 and a third step to extract parameters from the demodulation information, it is possible to demodulate the second layer using demodulation information 541.

However, as described above, in mobile applications, parameters of transmission information frequently change. If demodulation information 541 of this second layer can be known beforehand, all transmission parameters can be acquired, and therefore data can be demodulated even faster. This high-speed demodulation system will be explained using FIG. [14] *18* and FIG. [15] *19*. FIG. [14] *18*(a) is a system for sending both first transmission information 526 and second transmission information 525 from a cellular base station in standby mode.

First, the effects will be explained. In standby mode, the base station sends transmission information. Thus, a portable terminal such as PDS and portable TV which have no uplink, that is, transmission function, can receive this information, and therefore this system has an effect of drastically shortening a reception time when data is received for the first time or when the channel is changed. In countries including Japan, transmission from a device with a transmission function such as a cellular phone is prohibited in trains or hospitals, but even in such a case, if the mode is changed to "T mode" using a switch, it is possible to receive and acquire transmitted information without transmitting a signal from the cellular phone, which widens the application range of broadcasting reception of cellular phones.

Furthermore, when the T mode switch is turned on before entering an area where the use of the cellular phone is prohibited, the user sends the own area, operating time zone, portable terminal ID and broadcasting station ID of the broadcasting station that receives the call data to the broadcasting station via the base station. Then, when a call arrives at the cellular phone, a broadcast signal including the own portable terminal ID is sent via the broadcasting station, and therefore the arrival of a call at the own terminal is detected, notified to the user through a vibration motor, etc. thus providing a paging effect, that is, performing notification of reception.

In the T mode including the call system of the present invention, strong transmission radio wave is not transmitted, which has an effect of reducing the total amount of radio wave emitted from the cellular phone and reducing the influence of transmission radio wave on the human body.

A method of controlling transmission information parameters by patterning them and compressing the information will be explained. According to the second transmission information in FIG. [14] *18*(a), second transmission information 525 includes parameters such as modulation system 551, coding rate 552, time interleave length 553 and these parameters vary from one channel to another. More specifically, as shown in the lower part of FIG. [15] *19*, in the case of the ISDB-T standard, there are three modes of modulation system 551; DQPSK, 16QAM, 64QAM and five modes of coding rate 552 such as error correcting Viterbi, and four modes of time interleave length 553, giving a total of 60 combinations of parameters of the second transmission information.

There are 12 types of parameters of the first transmission information and if partial broadcasting identifier 550 is included, there are a total of 24 combinations, giving 60×24=1440 combinations in total. These are shown as parameter setting examples of the respective channels at the bottom right of FIG. [15] *19*. However, operations of the broadcasting station in real digital TV broadcasting are complicated, and each broadcasting station can be estimated to select specific parameters from these parameters, and therefore the parameters can be patterned.

Thus, as shown in the block diagram in FIG. [17] *21* and database list in FIG. [18] *22* transmission information control section 556 selects, for example, 16 parameters in descending order of frequency of first transmission information 526, selects first pattern number 554 and records those parameters in transmission information database memory 557. Likewise, second transmission information 525 also selects 16 parameters, that is, 4-bit parameters and records those parameters in memory 557 including database 559.

Thus, each broadcasting station can express all parameters of transmission information with 16×16 modes=8 bits, that is, one-byte data, and therefore if patterns fit within this range, recording of transmission information even corresponding to 1000 stations in a specific country requires only a memory capacity of 1 KB. This has the effect of reducing consumption of memory in cellular phones which have small memory capacities.

Transmission information control section 556 performs frequency calculations and frequency control and position detection section 558 decides the position of the broadcasting station and controls each station, which increases the parameter bit ratio. The operating steps of this transmission information control system will be explained later in further detail.

A W-CDMA (Wideband Code Division Multiple Access) system, which is the mainstream of next-generation cellular phones will allow conversations using cellular phones of the same kind in Asia including Japan and Western countries. As shown in FIG. [17] *21*, T mode cellular phone 501 of the present invention has country detection section 560. For example, when a Japanese user moves to Europe or U.S.A., it is possible to detect from the country information in the base station ID that the country has changed. This detection signal is notified to transmission information control section 556, and therefore it is also possible to receive overseas broadcast signals according to overseas broadcasting standards by changing the modulation system such as QPSK and QAM, FFT size and guard period coding rate, etc.

(5-3) Explanation of Cellular Phone

Demodulation of a downlink signal including transmission using cellular phones will be explained using the block diagram of T mode cellular phone 501 in FIG. [17] *21*. A signal received from antenna 531 is separated by duplexer 561, filtered through front end 562 and filter 563 and demodulated by demodulator 564. Then, the signal is converted to a digital signal by A/D converter 565 and despreading section 566 that despreads the CDMA signal reconstructs the spread data based on a sync signal of synchronization section 567. This signal is detected by detection section 568, subjected to Viterbi decoding by data decoder 569, passed through output control section 570 and converted to a speech signal by speech decoder 571.

Then, switching section 572 outputs the speech signal to speaker 573 or to earphone terminal 575 through LPF 574 that allows low band signals to pass. By connecting earphone 576 to this earphone terminal, the user can listen to the speech signal received. The present invention uses cord 577 of earphone 576 also as an antenna to receive TV broadcasting, etc. thus increasing sensitivity.

The received broadcast signal is switched by switch section 579 of TV reception section 578 between the signal received by portable antenna 531 and signal received using the earphone cord. In this case, the received signal with higher power or signal with a high C/N value or with a low error rate is selected and output as a result of comparison by signal level comparison section 588, and therefore an optimal received signal is obtained as in the case of a diversity antenna. Tuner 580 tunes a signal with the frequency of a specific channel, demodulation section 582 receives the parameters of the first and second transmission information (FIG. [15] *19*) necessary for demodulation from demodulation control section 583 and demodulates the signal. This OFDM demodulation method has already been described in detail, and so explanation thereof is omitted here.

From the demodulated signal, the original signal is reconstructed by error correcting section 584 using error correcting parameters such as Viterbi as shown in FIG. [15] *19*. Video decoder 587 decodes an MPEG4 or Wavelet signal, etc. received from output section 586 via output control section 570 into a video signal and display section 590 displays the video via display circuit 589. Furthermore, the data signal included in the broadcast signal is processed and displayed by sub-display circuit 591 on sub-display section 592 from output control section 570. This flow will be explained in the following embodiment.

An operation of the cellular phone in FIG. [17] *21* during transmission will be explained. Speech of the user is converted to an electric signal by microphone 594, compressed by speech decoder 595 and input to channel CODEC 596. On the other hand, the data entered by the user using keyboard 593 is processed by output control section 570 and of the processed result, the data to be sent to the base station is input to channel CODEC 596.

This doded/decoded output signal is modulated to QPSK, etc. by primary modulator 597, spread by spreading section 598 over a frequency band, converted to an analog signal by D/A converter 600 through ROF 599 and further modulated by modulator 601 having oscillator 603. This modulated signal is mixed with the signal of oscillator 604 by mixer 602, amplified by power amplifier 605, passed through duplexer to 561 and sent from antenna 531. This is the operation of transmission section 606 of T mode cellular phone 501.

Thus, base station ID sent from cellular phone base station 503 and reception information and demodulation information necessary to receive broadcast signals are received by reception section 607 of T mode cellular phone 501 and this data is sent to transmission information control section 556 of TV reception section 578. Then, using the data of memory 557 such as transmission information database 559, reception data is processed or used as is to tune the channel frequency using the data of frequency control section 581. Then, using the demodulation control signal from demodulation control section 583, through instantaneous demodulation with optimal parameter settings and optimal coding rate settings of error correction by decoding control section 585, the signal is demodulated in the shortest possible time, this produces an outstanding effect of displaying the TV broadcast or music broadcast or data broadcast contents instantaneously.

If this is the only effect that is required, transmission section 606 in FIG. [17] *21* is not necessary. For this reason, in the case of a general portable type television, a similar effect may be obtained by only adding reception section 607 or using the configuration of TV reception section 578 including transmission information control section 556 of the present invention.

As shown in FIG. [14] *18*(a) and (b), an example of sending first transmission information 526 and second transmission information 525 using transmission radio wave of the cellular base station has been shown, but it is also possible to send transmission information 528 of channel numbers, etc. of another broadcasting station, first transmission information 526 and second transmission information 525 to the respective data areas of TV broadcasting or partial broadcasting.

In this case, when TV reception section 578 on the portable receiver 501 side of the lower block diagram in FIG. [17] *21* receives a specific channel, transmission information of the other station is output from output section 586. The data of the channel includes transmission information 528 (FIG. [14] *18*) of the channel of the other station receivable in the area and the first transmission information 526 and second transmission information 525 on those channels. When this transmission information is extracted from out put section 586 in FIG. [17] *21*, the transmission information of the channel is added and input to transmission information control section 556, the information is recorded in transmission information database 559.

When the channel is switched over to another channel during reception of a program of a broadcasting station of a specific channel, this reception information of the channel of the other station is extracted from transmission information database 559, transmission information control section 556 sets parameters of the respective sections, performs tuning, demodulation and error correction, and therefore it is possible to output a channel of the other station from output section 586 with the first parameter setting.

This produces an effect of drastically shortening the time for switching over to another channel compared to a case where parameters are unknown. In this case, sending not only transmission information of a broadcasting station within the current broadcasting service area but also transmission information of a broadcasting station within the adjacent broadcasting service area makes mobile reception more reliable.

In this case, the transmission information is sent with the ID of the base station having the base station service area corresponding to the broadcasting service area of a broadcasting station with a specific broadcasting station ID. The receiver records this data in transmission information database (DB) 559. Then, even if reception is suspended and the mobile unit moves, it is possible to identify and demodulate the transmission information as far as the base station ID is known.

However, at the time of the first reception after the mobile unit has moved for a great distance, reception parameters of that area are completely unknown. In this way when reception of TV broadcasting is suspended and the mobile unit moves, transmission information of the base station of the cellular phone is necessary.

Here, three methods of demodulation will be explained. A first method will be described first. The first method is a method of changing parameters according to a round-robin system assuming that there is only TV reception section 578 in FIG. [17] *21* with the simplest configuration. This first method is suitable for a low-priced portable TV or PDC.

The second method is a method of adding reception section 507 of the present invention in FIG. [17] *21*. This makes it possible to receive the ID of the cellular base station. Since the present invention has transmission information control section 556, it is possible to identify from the base station ID the broadcasting station that is providing services. Transmission information control section 556 searches for the base station ID and transmission information of the broadcasting time of the broadcasting station corresponding to the current time from transmission information database 559 based on this base station ID and the time from time information section 610, sends parameters of the corresponding date/time transmission information of the relevant channel to tuner 580 and error correcting section 584, and thereby outputs a desired channel instantaneously even after the mobile unit has moved. When the channel is changed, transmission information downloaded or received from a broadcast signal is used.

This second method just described above has nothing to do with the cellular base station, and therefore the second method has an effect of not requiring a communication infrastructure other than broadcasting. Furthermore, the second method uses the cellular base station, but uses only the base station ID, and therefore has the effect of eliminating the need to change the existing cellular base station facilities. Even if the transmission information transmission system of the present invention is adopted, the system will be supported gradually because it is estimated that there are several tens of thousand of cellular base stations in the world. In that process of supporting the system, there are many base stations that do not support the system and it is those regions where the above-described second method is effective and realistic.

In order to switch between the above-described second and third methods of receiving transmission information from the base station, that is, complete support systems, using the configuration in FIG. [17] *21*, base station ID detection section 611 detects that the received cellular signal includes only the base station ID and no transmission information and sends this detection signal to transmission information control section 556. The cellular phone searches for the transmission information of the broadcasting station corresponding to the base station ID from transmission information database 557 using the base station ID and if the transmission information is found, sets parameters and receives the broadcast signal. If no transmission information is found, parameter set values are changed and demodulated on a round-robin basis. It takes time to receive the first broadcast signal after the movement, but once the broadcast signal is received, it is possible to download transmission information of other stations, and therefore it is possible to output the received signal instantly even if the channel is switched.

In this case, it is also possible to have similar effects by connecting a specific Web site, etc. using the cellular phone uplink, requesting for transmission of the local transmission information and downloading the transmission information using the downlink.

(5-4) Explanation of Cellular Base Station

Then, the configuration and operation of cellular base station 503 will be explained using FIG. [13] *17*. First, the overall configuration will be explained. Cellular base station 503 in FIG. [13] *17* has cellular phone antenna 516 and transmission/reception circuit 517 and is connected to communication control section 518 via a dedicated communication circuit in ATM, etc. A plurality of communication control sections 518, 518a and 518b in different areas are connected to PDSL 520 of cellular phone company 564 and controlled in a centralized manner through backbone line 519 with a large transmission capacity.

Then, a configuration with an additional function of sending transmission information necessary for broadcasting reception such as television of the present invention will be described. Broadcasting reception antenna 551 is installed near cellular phone antenna 516 which receives airwaves of the region and received signal amplification section 620 of broadcasting reception section 550 amplifies the signal and tuner 580 tunes the signal. The signal is passed through quadrature detector 1031, guard period elimination section 1032, FFT 1033, detection section 1034 and error correcting section 1035 and output as digital data. An operation of this part has already been explained using FIG. [2] *6* and explanations thereof are omitted.

By constantly performing this demodulation for each channel, it is possible to obtain transmission information on optimal parameters necessary for tuning and demodulation. Broadcasting reception information extraction section 542 in FIG. [13] *17* extracts some or the whole of these parameters, sends them to broadcasting reception information addition section 547. The signal is then amplified by transmission section 621 and mixed with the transmission signal of the cellular phone as shown in FIG. [14] *18*(a) and (b). Next, the signal is sent from base station antenna 516 to T mode cellular phones and used as tuning/demodulation information for broadcasting such as television.

Then, an operation of transmission information extraction section 542 will be explained. First, transmission information extraction section 542, which is an information block for narrow regions, calculates field intensity 535Z from the output of amplification section 620 according to the amplification factor and signal level. Transmission information extraction section 542 calculates this field intensity and distance and obtains transmit power 539Z of the broadcasting station. From tuner section 580, currently transmitting channel 527Z, partially broadcasting channel 550 and transmission frequency 536Z are obtained. From guard period elimination section 1032, guard ratio 538Z is obtained. From FFT section 1033, FFT size 537Z is obtained. From demodulation information decoding section 1036, modulation system 551, coding rate 552 such as Viterbi and time interleave length 553 are obtained. Of these parameters, the parameters of transmission information extraction section 543 are sent to transmission information addition section 548, amplified by transmission amplifier 621 and sent to T-mode cellular phones of the present invention through cellular phone antenna 516. The parameters extracted by transmission information extraction section 544, which is an information block for a wide region made up of first transmission information extraction section 545 and second information extraction section 546 are sent to first transmission information section 526Z and second transmission information section 525Z of transmission information addition section 549 respectively. Then, the parameters are sent to T mode cellular phones through transmission amplifier 621 or sent temporarily to broadcasting transmission information processing section 560 for sending program information of communication control section 518 and then sent to cellular base station 503.

Furthermore, broadcasting station 563 includes program information transmission section 562, sends the program information and transmission information to broadcasting transmission information processing section 560 through a channel, making it possible to send to T mode cellular phones via cellular base station 503 and download the program information and transmission information. With regard to the program information in this case, the same content is sent to all base stations in the service area, while for the transmission information, contents differing from one base station ID to another or differing from one base station ID group to another which corresponds to the broadcasting service area are sent.

As shown above, providing TV broadcasting reception antenna 551 near the cellular antenna for each cellular base station and obtaining transmission information parameters for each channel allows the base station to independently receive transmission information according the present invention. This allows the system to be completed on the local side and has the effect or simplifying the system configuration.

(5-5) Transmission Information Management System

There is a plurality of operating modes of the transmission information management system. Each mode will be explained using drawings.

(5-5-1) Parameter Setting

A first method will be explained using the flow chart in FIG. [19] *23* first. In step 650a, a power switch (SW) of a model device such as a T mode cellular phone or PDA or portable type TV is turned on first. In step 650b, a standby mode is set to receive the downlink of the cellular base station. In step 650c, base station ID 521 (FIG. [14] *18*) in control information in the downlink signal is acquired and/or recorded in memory 557 (FIG. [17] *21*). In step 650d, it is checked whether the downlink signal contains transmission information 528 (FIG. [14] *18*) of broadcasting such as television and/or data of first transmission information 526 or an identifier indicating the presence of the above-described two pieces of information. If the result is "Yes", the process moves on to step 650e and if "No", the process moves on to step 650j, sets three flags and the process moves on to step 650k.

Back instep 650d, if the result is "Yes", the process moves on to step 650e, acquires transmission information 528 and/or first transmission information 526 and/or records in memory 557. Instep 650f, it is checked whether the downlink signal contains second transmission information 525 or an identifier indicating the presence thereof. If the result is "No", flag "2" is set in step 650i and the process moves on to step 650k. If the result is "Yes", in step 650g, the second transmission information is acquired from the downlink data or the acquired information is recorded in memory 557. In step 650h, flag "1" is set. In step 650k, when an instruction "start to receive broadcasting such as television", that is. a T mode instruction is received, it is decided in step 650m whether or not the user receives signals using the transmission information parameters used in the previous reception. When there is no entry from the user, transmission information control section 556 (FIG. [17] *21*) decides it. Based on data in transmission information database 559, if a certain time or more has not elapsed since the previous reception from the broadcasting station using time control or it the base station ID 521 (FIG. [14] *18*) is the same as the one at the previous reception, the process follows "Yes", otherwise "No" and moves on to step 651a. In the case of "Yes", the process moves on to step 650n and sets reception using the same channel with the previous transmission parameters and tries reception. If reception is successful, the process moves on to step 650p with "Yes" to start reception. If reception is not successful, the process moves on to step 651a in FIG. [20] *24*.

When the flag is "1" or "2" in step 651a, it can be decided that at least transmission information and first transmission information have been acquired, and in step 651b, channels capable of receiving transmission information 528 are displayed on a screen by the display field intensity group as a menu screen. If the receiver is a T mode cellular phone, based on partial transmission identifier 550 in first transmission information 526 in FIG. [14] *18*, only signals of channels which are capable of receiving transmission information and are performing partial transmission are shown on display section 590 (FIG. [17] *21*). When the data of program information transmission section 562 in FIG. [13] *17* is received, displaying program information of different channels simultaneously has the effect of making program selection by the user easier. When the user inputs an instruction for receiving a specific channel from the keyboard, etc. in step 651c, the process moves on to step 651d and if flag=1 is "Yes", moves on to step 651f and if "No", this means flag=2 and the second transmission information cannot be acquired, and so the process moves on to step 651e in step 651e, the above-described specific channel is tuned and demodulated using the transmission information and first transmission information, the first layer data is obtained, demodulation information therein is obtained, the second transmission information is obtained and the process moves on to step 651f. In step 651f, all data of the first layer, second layer and higher layers of a specific channel is demodulated using the transmission information and/or first transmission information and/or second transmission information, after processing in steps 651g, 651f, 651w, 651y and 651z, the process moves on to step 652a in FIG. [21] *25*. Back in step 651a in FIG. [20] *24*, in the case of "No", flag="3" and so it can be decided that the base station can obtain only information of the base station ID. In this case, it is checked in step 651h whether the transmission information including transmission information for the current time zone of the relevant base station ID is in transmission information database 559 (FIG. [17] *21*) or not. If "Yes", in step 651i, transmission information corresponding to the base station ID is acquired when an instruction for receiving a specific channel is received in step 651j, the process moves on to step 651k to see if there is second transmission information or not. If "Yes", the process moves on to step 651f and demodulates the first layer, second layer or higher layers using the parameter. If "No", the process moves on to step 651e and reproduces the demodulation information of the first layer. The subsequent steps will be described later, and so explanations thereof are omitted here.

Back in step 651h, if the result is "No", the process moves on to step 651m and when an instruction for receiving a specific channel is received from the user, etc., it is checked in step 651n whether the cellular phone is in uplink transmission prohibition mode or manner mode or "T mode" (dedicated broadcasting reception mode). If "No", the process moves on to step 651p and when an instruction for acquiring reception data is received from the user by telephone or transmission information control section 556 (FIG. [17] *21*), that is, in the case of "Yes", the process moves on to step 651q. Step 651q connects to a specific database (DB) or URL server over the uplink through a cellular line, and in step 651r, broadcasting reception transmission information corresponding to the relevant base station ID and/or program information are acquired or downloaded and in step 651s, the acquired transmission information and/or program information in transmission information database 559 are additionally recorded or updated and the process returns to step 651k.

Back in step 651n, when the result is "No", that is, in the case of uplink transmission prohibition mode, the process moves on to step 651t, tunes the frequency of the specific channel and searches for operating frequency control table 609 (FIG. [18] *22*) in transmission information database 559 as a parameter of first transmission information 526. Then, the channel ID having information with a high operating frequency is selected from the relevant channel IDs, parameters of different sections are set and/or set values are changed and demodulated. It is checked in step 651u whether the demodulation has been successful or not and if "No", in step 651t, the parameter is changed to the parameter with the next highest frequency to try demodulation. In the case where demodulation is possible, that is, "Yes", in step 651v, the first layer is demodulated, demodulation information is obtained and the process moves on to step to 651f for restoration.

In step 651f in FIG. [20] *24*, the received signal is demodulated using the first transmission information and second transmission information, the reception data is output and displayed in step 651g, and when it is confirmed in step 651w that this output and display continue for a certain time, that is, only in the case of "Yes", in step 651y, the frequency information of the first, second transmission information of the channel ID is updated in incremental direction. In step 651z, data of latest parameter 614 of latest operating time control table 613 (FIG. [18] *22*) is updated using the latest transmission parameter value of the corresponding channel ID. The previous latest parameter 614 moves to next latest parameter 615 and the data in the field of the previous next latest parameter 615 moves into the field of the third latest parameter as indicated by an arrow in the figure. If the third latest parameter is the latest, it is moved up to latest parameter 614. Thus, if the most resent operating time, that is, the latest parameter priority mode is set, the latest parameter is used in step 650m in FIG. [19] *23*, and therefore this time control mode is suitable in the case of the season suitable for reception from a broadcasting station that uses only parameters of specific patterns or in the case of changing transmission parameters every year. Setting the time control mode and frequency control mode for each broadcasting station is more effective. Then, the process moves on to step 652a in FIG. [21] *25* as the cellular phone moves.

(5-5-2) Switching of Broadcasting Channel

The method of switching between broadcasting channels according to the movement of the cellular phone will be explained using FIG. [21] *25*.

Since the base station changes as the cellular phone moves, the base station ID is changed in step 652a. Using a field intensity control program shown in step 652b, the present invention allows a broadcasting channel with optimal field intensity to be received. An example of a TV station is used in this explanation, but actually TV broadcasting, music broadcasting and data broadcasting are included and the present invention is applicable to any of these broadcasting cases. In step 652b, a method of calculating a distance between both stations from position information of a transmission antenna of each TV station and the position of the base station is shown. The cellular phone includes position detection section 558 as shown in FIG. [17] *21*. A W-CDMA system in particular can receive from three base stations simultaneously and controls power so that the receiving side can receive signals with optimal power, and therefore power control information 611 shown in FIG. [14] *18* makes it possible to find relative positions of the cellular phone and base station through calculations such as triangulation techniques. Once the positional relationship between the base station and each broadcasting antenna is known, it is possible to know the distance between each broadcasting antenna and cellular phone accurately. In the case where a rough distance is acceptable, the distance between the base station and broadcasting antenna can be used. Field intensity 535 in FIG. [14] *18* includes field intensity of each broadcasting station at the base station. In the case where a rough value is acceptable, this field intensity data can be used.

In item 2 of step 652b, field intensity control section 612 in FIG. [17] *21* compares data of field intensity 535 of each broadcasting station before and after movement through calculation processing as the base station ID changes and thereby divides broadcasting stations into three groups; a group of broadcasting stations with increasing field intensity whose field intensity increases as it moves, a group of broadcasting stations with decreasing field intensity whose field intensity decreases as it moves and a group of broadcasting stations whose field intensity remains unchanged.

In next step 652c, if the field intensity of the currently receiving broadcasting station falls below a first fixed value (in the case of "Yes"), the process moves on to step 652d and in the case of "No", the process moves back to step 652a. When the current broadcasting station does not belong to the field intensity decreasing broadcasting station group ("No") in step 652d, the process moves back to step 652b and in the case of "Yes", it is checked in step 652e whether there is the same service ID that is the identifier indicating the program content of the current broadcasting station, that is, another new broadcasting station with the same content or not, and if "No", the process moves on to step 652i, and if "Yes", when the field intensity of the new broadcasting station is equal to or greater than a second value (Yes) in next step 652f, the process jumps to step 652h. If "No", when the field intensity of the new broadcasting station is stronger than that of the current broadcasting station and does not belong to the field intensity increasing broadcasting station group ("No") in next step 652g, the process jumps to step 652i and if "Yes", in next step 652h, switchover of the channel to the channel of the new broadcasting station with the highest field intensity from among new broadcasting stations with the same service ID is started and the process moves on to step 653a in FIG. [22] *26*.

Step 652i which is the destination of jumps from several steps means that there is no new broadcasting station with the same service ID as the current broadcasting station, that is, with the same program content. Therefore, the channel that the user is receiving needs to be changed to another channel with a different service content. In step 652i, a message "Can channel be changed?" is displayed and when the user enters an instruction "OK" in step 652j, or when a default value "OK" is set, the process moves on to step 652k. In step 652k, selection of the new broadcasting station is started, it is checked in step 652m whether the field intensity is equal to or greater than a certain value or not. If "No", the process goes back to step 652k and if "Yes", it is checked in step 652n whether the broadcasting station belongs to a field intensity decreasing broadcasting station group or not and if "Yes", the process goes back to step 652k and if "No", the process moves on to step 652p.

In step 652p, frequency information on the channel ID of the new broadcasting station in operating frequency control table 609 (FIG. [18] *22*) is searched for to find a new broadcasting station with high frequency of use. In the case of "No", steps 652k to 652p are repeated and if the broadcasting station is found ("Yes"), the process moves on to step 652q to receive the new broadcasting station with the highest use frequency and the process moves on to step 653a in FIG. [22] *26*. Even if the cellular phone moves, the field intensity control program of the present invention selects the channel with the strongest field intensity, and therefore it is possible to always receive broadcasting service in the best reception condition.

(5-5-3) Seamless Channel Switching

FIG. [22] *26* shows a flow chart to show a specific method of acquiring transmission information of the new broadcasting station via a broadcasting reception signal or by switching between two channels from a server or base station via a cellular channel. In step 653a, the first or second transmission information of the new broadcasting station is acquired not only from the base station but also from the broadcast received signal. First, it is checked in step 653b whether flag=1 or not. If "Yes", all transmission information is obtained from the base station and so the process moves on to step 653j. If "No", the process moves on to step 653c and it is checked in step 653c whether the currently receiving broadcast signal contains the base station ID or a new broadcasting channel corresponding to an area code, other channel transmission information 528 (FIG. [14] *18*), first or second transmission information 526 or 525 or not. If "Yes", the process moves on to step 653d to acquire the transmission information and records in transmission information DB if necessary and the process moves on to step 653j to switch from the current channel to the new channel during the guard interval period using the first or second transmission information of the new broadcasting station. In this case, since the transmission information and the first or second transmission information are known before demodulation, the step of demodulating the first layer is omitted and switchover takes place shortly during the guard interval period. This has an outstanding effect of switching the channels without interrupting data reception, or seamlessly. In step 653k, the new channel is demodulated based on the first or second transmission information and in step 653m the new channel data is output and/or displayed and it is checked in step 653n whether the new channel is output for a certain time or more. If "No", the check is continued and if "Yes", in step 653p the use frequency information of the first transmission information and second transmission information for the new channel and channel ID is increased and operating frequency table 609 is updated. At the same time, the latest time information of latest operating time control table 613 (FIG. [18] *22*) is updated.

Back in step 653c (FIG. [22] *26*), if the result is No, in step 653f, the display section inquires of the user about whether to acquire transmission information by means of a cellular channel or not. If "Yes", in step 653g the address or URL of the information source is sent over the uplink. Then, in step 653h the base station ID and the desired channel are sent, in step 653i first and second transmission information and program service ID are received and recorded in the transmission information DB. Then, the process moves on to step 653j and follows the same steps.

On the other hand, if the result in step 653f is "No", the channel is switched in step 653q and if there is no transmission information, a transmission channel is searched for and the channel is switched over to the other channel. If no first transmission information is found in step 653f, either, the first transmission in formation is searched for in step 653r by trial and error, the first layer is demodulated to obtain the demodulation information and the second layer is demodulated, and if step 653s results in "OK", the process moves on to aforementioned step 653m. If "No", step 653r is repeated.

Following the above-described procedure, even if the local base station from which data is being received does not support the present invention and it is only the base station ID that can be received, since a broadcast received signal of each station contains transmission information, first and second transmission information corresponding to the base station IDs of other stations, the present invention has the effect of switching from one broadcasting station to another seamlessly. Moreover, even if the above-described service is not found, it is available from a server through a cellular channel, which makes it possible to acquire transmission information under any circumstances and switch between channels seamlessly.

(5-5-4) In the Case where the Base Station Notifies the Number of a Broadcasting Channel Under Service FIG. [23] *27* describes the procedure and effects resulting from providing regional identification IDs for different broadcasting stations using a channel common to the broadcasting stations. In step 654a, the base station sends the channel number of a broadcasting station and broadcasting station regional identification ID or an ID specific to the broadcasting station. In step 654b, the cellular phone receives this information and checks in step 654c whether the ID is actually the ID specific to the broadcasting station. If "Yes", the process moves on to step 654d and waits for an instruction for receiving the channel (n). When the instruction arrives, it is checked in step 654e with the transmission information DB whether the transmission information of the broadcasting station exists or not and if the broadcasting station exists, the process moves onto step 655a in FIG. [24] *28*. If "No", the process goes back to step 654d and since it is not a substantially specific ID, this channel is tuned or demodulated using the transmission information of a channel ID having transmission information with the highest operating frequency.

(5-5-5) Updating Frequency Control Table

FIG. [24] *28* will describe the method of controlling frequency and updating the frequency information or priority of frequency control data when frequency control table 609 (FIG. [18] *22*) is provided for each channel ID.

Step 655a decides whether the first layer of Ch(n) can be received using the first transmission information or not. If "No", the process moves on to step 655t, sets n=0, sets n=n+1 in next step 655u and decides whether demodulation is possible using the parameter with priority order n of the first transmission information or not (step 656a). If "Yes", the process moves on to step 656b to check whether reception continues for a certain time or more. If "Yes", frequency information 610 of the first transmission information of this nth parameter or the first transmission pattern is increased (step 656c). When the result of step 656b is "No", step 656c is skipped. When the (n−1) th frequency information is smaller than this nth frequency information (Yes) in step 656d, the nth and (n−1) th priority orders are switched round in step 656e. Then, the process moves on to step 655b. Here, back in step 656a, if the result is "No", the process moves on to step 656g to try demodulation by changing the parameter of the first transmission information until n becomes greater than n(LAST), and if "Yes", the process moves on to aforementioned step 656b. However, when n becomes greater than n(LAST), the parameter of the first transmission information is changed in step 656h until it can be demodulated. When the parameter of the first transmission information is demodulated and reception continues for a certain time or more in step 656i, and if the n(LAST)th frequency information is equal to or smaller than a certain value in step 656j, the frequency control table is updated in step 656k using this transmission information as the n(LAST)th first transmission information data. Or the frequency control table including other data is updated using this transmission information as latest data 614 of latest operating time control table 613. Then, the process moves on to aforementioned step 656d.

On the other hand, back in step 655a, if the result is "Yes", the process moves on to step 655b, sets n=0, regards n+1 as n in step 655d, tries demodulation in step 655e using operating frequency control table 609 in FIG. [18] *22* or the nth operating frequency of latest operating time control table 613 or priority information with high latest operating frequency. In the case of demodulation, that is, "Yes", it is checked in step 655f whether reception continues for a certain time or more and if the result in step 655f is "Yes", the nth frequency information of the second transmission information of operating frequency control table 609 is increased in step 655g or the nth frequency information of the second transmission information of latest operating time control table 613 is recorded in the field of latest rank 614 and the ranks in the newness level of other parameters are decremented by one. If the nth frequency information is higher than the (n−1)th frequency information in step 655h, step the orders of the two are switched round in step 655i. Then, in step 655k, a broadcast signal is received.

Here, back in step 655e, when the result is "No", if n does not exceed the last value in step 6557n, the process goes back to aforementioned step 655d. If n exceeds the last value, the first layer is demodulated in step 655n to acquire the second transmission information in the demodulation information and demodulate the second layer. When reception continues for a certain time or more in step 655p and in the case of the latest time control mode in step 655q, this parameter is recorded in latest rank 614 to lower the newness level of others. In the case of frequency control, when the last frequency information of n is equal to or lower than a certain value, this parameter is replaced in step 655r with the last parameter of n and the parameter is updated and recorded. When the last frequency information of n is not lower than the certain value, a broadcast signal is received in step 655k. As shown above, since frequency control can be performed over transmission information of each broadcasting station in the case of the frequency control mode, this mode is effective when there are many types of transmission parameters of a broadcasting station. Furthermore, the latest operating time control mode is effective for a broadcasting station which changes transmission information in a long cycle such as every year or every season. The latest operating time control mode is also effective when there area few types of transmission parameters. The above-described methods produce an effect of increasing a hit ratio of transmission information.

FIG. [25] *29* shows the same method as the previous one whereby in step 657i the broadcasting station ID is associated with the base station ID and registered in the transmission information control database. Then, in step 657j transmission parameters are patterned as shown in FIG. [18] *22* with specific patterns such as first pattern number 554 and second pattern number 555 and registered in step 657k, thus producing the effect of drastically reducing the volume of registered data.

(6) Sixth Embodiment

An embodiment of a new business model using cellular phone 501 will be described. FIG. [26] *30* is a business flow diagram of this business model.

(6-1) Cellular Phone

First, a cellular phone used in this embodiment will be explained. FIG. [27] *31* is a front view of cellular phone 501 and display section 590 has sub-display section 592. FIG. [27] *31*(a) shows display section 590 displaying a menu screen and FIG. [27] *31*(b) shows display section 590 in a barcode display mode or BC mode. In the BC mode, sub-display section 592 shows a barcode.

FIG. [28] *32* shows a layout of image 701 of the display element of the present invention when display section 590 is provided with a color display function. As shown in FIG. [28] *32*(b), color filters with three colors of RGB are aligned sequentially in the horizontal direction in the part above border line 702. Therefore, expressing one pixel requires three elements 700 in the horizontal direction. If "L" is assumed to be a pitch between neighboring elements, one pixel has a pitch of 3L. Attempting to display bar 703 of a barcode using a conventional color display element results in a pitch of 3L or more such as bar 703, 703a and 703b, failing to display bar 704, 704a, 704b and 704c of a detailed barcode as shown in FIG. [28] *32*(d).

Especially, barcode reader 708 normally uses a red laser or red light beam as light source 709 of light emitting section 710 as shown in FIG. [30] *34*, and therefore the light beam passes through R filter 705 shown in the cross-sectional view of FIG. [29] *33*(a), while the amount of passing light is reduced drastically through a filtering effect of G filter 706 and B filter 707 with shorter wavelength. For this reason, to allow a barcode reader having a red color light source to be read stably, the pitch of the bar should be roughened to 3L or more. In the case of a cellular phone with a small display section in particular, attempting to display a barcode reduces the amount of information significantly.

The present invention allows detailed bar 704 (FIG. [28] *32*(d)) to be displayed by providing sub-display section 592 in part of display section 590. As shown in FIG. [28] *32*(c), the color filter layer below the border line 702 is made up of a transparent filter allowing monochrome display of the barcode. The color filter layer has a pitch of 100 μm in the vertical direction, while pixel pitch L in the horizontal direction can be on the order of 30 μm using the present technology. Thus, since a detailed barcode with a pitch of 30 μm can be displayed as shown in FIG. [28] *32*(d), even a small display section can display a barcode of large data.

Cross-sectional views (a) and (b) of FIG. [29] *33* show the structures of the present invention in sections in part A-A' and part B-B' in FIG. [28] *32* respectively. Color display section 724 in FIG. [29] *33*(a) is constructed of reflector 713, polarizing plate 714 and glass substrate 715 starting from the lowest part. Transistor 716 and electrode 717 are formed on glass substrate 715 and color filter 720 and ITO 719 are formed inside upper glass plate 721 and polarizing plate 722 is formed out side upper glass plate 721.

Liquid crystal material 718 is injected between upper glass plate 721 and lower glass plate 715. Incident light 711a, 711b and 711c from the outside is polarized by polarizing plate 722, passed through liquid crystal 718, reflected by reflector 713, passed through liquid crystal 718 again, passed through polarizing plate 722 and become reflected light 712a, 712b and 712c. The polarization angle and intensity of reflected light 712 are controlled by changing the voltage applied to the liquid crystal.

At this time, in the case of incident light of white light, color filter section 720 absorbs the white light and thereby generates reflected light of RGB. However, when the light source has red light such as barcode reader 708, no absorption occurs with R filter 705 and the light is reflected. However, absorption increases with G filter 706 and almost all the light is absorbed with B filter 707. Therefore, attempting to display the barcode may cause B filter 707 and G filter 706 to be recognized as the bar erroneously.

The present invention uses glass substrate 715 made of one display element and constructs sub-display section 592 with transparent layer 723 having no color filter layer 720 as shown in FIG. [29] *33*(b). For this reason, when incident light 711 is red light, reflected light 712 that has passed through any of pixel elements 700 is subjected to same attenuation, and therefore showing the barcode on sub-display section 592 does not cause even a high-density bar to be recognized erroneously. This produces an effect of displaying a barcode of a large capacity.

In this case, as shown in FIG. [28] *32*, the present invention uses element 700 which has the same width as that of the color display section which is the main display section, and sub-display section 592. By setting the width-to-length ratio of at least the monochrome element to 1:2 or more as shown in element 700 of FIG. [28] *32*, the color display section and sub-display section can share the same display element. Since it is only necessary to use a transparent material instead of a color filter for only the area of the sub-display section, it is just one step that needs to be added. If transparent layer 723 is formed by thickening ITO layer 719, manufacturing is possible without the need to increase steps, which facilitates volume production.

Using the display element of the present invention for an electronic settlement system, etc. requires 3 or 4 barcodes to be displayed. Attempting to display a barcode 3 to 4 times takes a lot of trouble and increases a processing time.

To improve this, the display device of the present invention provides an optical detection section 725 near sub-display section 592 as shown in FIG. [27] *31* to detect light from the barcode reader. For light source 709 of light emitting section 710 of barcode reader 708, red light is normally used. As shown in FIG. [31] *35*, this light is detected by optical detection section 725. To distinguish between disturbance light and reading light, light input window 727 of optical detection section 725 is provided with color filter 726 which allows only a red color to pass This filter makes it possible to reduce optical noise which becomes disturbance. The detected signal is measured by light intensity measuring section 728 and light input time measuring section 729, introduced by separation section 730 into continuous signal detection section 731 and pulse signal detection section 732, its display is updated to a new barcode by barcode display control section 733 and the barcode display of sub-display section 592 is updated by display circuit 734.

This procedure will be explained using the flow chart in FIG. [32] *36*. A barcode display starts in step 661a, n=0 in step 611b, n=1 is added in step 661c and the nth barcode is displayed in step 661d. When optical detection section 725 detects the light read by the barcode reader in step 661e, it is decided in step 661f whether there is incident light with an amount of light equal to or greater than a certain value I1 for a certain time t1 or more to check to see if it is the light from a continuous irradiation type barcode reader or not. If "Yes" here, it is decided to be the light from the barcode reader, and it is decided in step 661h whether n is the final value or not. If "Yes", the process ends and if "No", the process goes back to step 661c, increments n by 1 and displays the nth barcode, that is, the next barcode on sub-display section 592 (FIG. [31] *35*).

Back in step 661f, if the result is "No", it is examined in step 661g whether there is any irradiation of a scan type barcode reader. In the case where a short pulse signal with a certain time t2 (t1>t2) with a specific amount of light I2 or more is detected a certain number of times n1 or more and a certain time t3 (t2<t3) has elapsed in step 661j, it is decided that there was a read of the scan type barcode reader. In step 661n, if n is the final value, the process ends in step 661i. If not the final value, n is incremented by 1 in step 661c. Thus, the barcode reader irradiates reading light, in t1 seconds, new barcodes are automatically displayed one after another and therefore the user need not perform any operation to update the barcode.

(6-2) Explanation of Overall Business Model

FIG. [26] *30* shows a business flow diagram of a business model of purchase with authentication, reception of product and payment using T mode cellular phone 501. First in step 660a, broadcasting station 502 sends product purchasing processing software which is a program written in a Web descriptive language such as HTML for PC, BML for broadcasting or JAVA for mobile devices and product data to cellular phone 501 using airwave.

The user constitutes a Web site on a server using the product purchasing processing software and opens a homepage for purchases of products. In step 660b, the user selects virtual shop 740 and accesses virtual shop 740 via cellular phone company server 742, Internet 741, communication control section 743 and virtual shop sever 744 using uplink 507 of the cellular phone.

In step 660c, cellular base station 503 sends product information and standard price information using downlink 506. In step 660d, the user selects a product, service or ticket and sends order information to virtual shop 740 using uplink 507. In step 660e, information on the payment method, price, discount coupon, etc. is sent to the user.

In step 660f, the user selects methods for payment at a shop with a discount coupon, that is, methods for authentication, payment or settlement and receipt of the product at an actual shop such as a convenience store, and sends the information as well as the cellular phone number of the user to the virtual shop using the uplink.

In step 660g, virtual shop 740 checks the price discount coupon, then calculates the discounted price, encrypts a registration number which associates the product information and the discounted price with the cellular phone number of the user, further encrypts and sends this to the user using downlink 506 or by e-mail. In step 660h, registration number memory 747 of cellular phone 501 registers the registration number indicating that the order has been registered with the nth registration number.

When the processing of the system is completed, in step 660i, user 746 moves to actual shop 748 specified by the user such as a convenience store carrying the cellular phone. In step 660j, the user switches the mode to BC mode, prepares to display m pieces of data such as the nth registration number, product ID, discounted price using a barcode on the sub-display section 592m times one after another and displays the first barcode to begin with.

In step 660k, an employee of actual shop 748 reads barcode 751 displayed on sub-display section 592 of display section 590 using barcode reader 708 connected to POS terminal 750.

In response to the reading light, cellular phone 501 changes and displays the barcode m times according to the detected signal of detection section 725. Or as shown in FIG. [39] *43* or FIG. [40] *44*, cellular phone 501 displays m barcodes one after another at certain intervals. In step 660m, when barcode reader 708 has read the mth barcode, barcode reader 708 sends the data to virtual shop 740 via settlement company 900.

In step 660n, the virtual shop checks the registration number, cellular ID, product ID, discounted price, etc. and if "OK", sends information such as the discounted price, product ID, etc. to POS terminal 750 via settlement company 900 in step 660p. In step 660q, POS terminal 750 settles account for the discounted price using a credit card, etc. and delivers the product to the user upon completion of the settlement.

(6-3) Detailed System

FIG. [26] *30* will be explained in further detail using FIG. [33] *37*. A purchase order is sent from cellular phone 501 including client 800 to server 801. After receiving cellular phone number 804 recorded in a bridge media such as SIM card 803, user ID 805, payment information, shipment information, positional information 816 from client 800 via a cellular phone line, server 801 assigns an assignment ID to control this event.

Server 801 associates this assignment ID with the purchaser information recorded in customer database 812 and records it in client ID customer table 809 and customer database 812. Server 801 then selects actual shop 748 near positional information 816 and actual shop 748 near the user's home or company from actual shop database 813 and obtains nearby shop information 819 of nearby actual shop 748.

Server 801 identifies this information and product assignment ID 806 and sends an HTML document including a product order button to client 800 via the cellular phone line. Client 800 stores assignment ID 806 in memory 802 and displays the an HTML document on display section 590.

At the same time, the server checks the product stock situation with stock database 815 of shop 748 of nearby shop information 819 and selects a shop with the stock. Furthermore, the server issues coupon ID using time information 817 and registers it in coupon control database 820. When the user selects specific actual shop 748 from nearby shop information 819, selects the order button of a specific product and inputs the information, this information is sent to server 801 via the cellular phone line.

Upon receipt of the purchase request of the specific product, server 801 combines using assignment ID 806, associated customer database 812, stock database 810, order database 811 and purchase information using client ID 814 such as cellular phone number 804 of client 800 and/or user ID 805 and client ID customer table 809. The server then sends the selected product, information related to assignment ID 806, product sum 823 calculated based on coupon control database 820 using the discount rate, information on the expiration date of the coupon, the expiration date of purchase, product ID 824 and coupon discount rate 825 to user-selected actual shop 748 so that actual shop 748 stores the information in purchase database 822 of POS terminal 750.

When the consumer visits actual shop 748, selects a product to be purchased of cellular phone 501 and presses the BC mode switch, the cyclic barcode of the present invention is displayed on display section 590, read by barcode reader 708 and at least assignment ID 806 is read. The sum of product 823 and coupon discount rate 825 are extracted from purchase database 822 in the memory, the purchase price is calculated, displayed on POS terminal 750 and the product is delivered upon settlement. When settlement is executed with a credit card, the settlement is done by communication.

This system allows checking without using a communication circuit at the time of purchase and can thereby perform authentication instantaneously and speed up processing. This system is effective for settlement at a convenience store or ticketing at the entrance of a theater where people lineup. If a settlement procedure is completed beforehand using a cellular phone, etc., this system takes almost no time and can thereby handle many users.

(6-4) Actual Electronic Commerce

Next, an example of actual commerce using the above-described business model will be explained. As an example of this product, suppose an airplane ticket which requires a reservation. According to the current airplane ticket reservation system, the user makes a reservation by telephone or a personal computer, receives a registration number, visits an information desk, informs the registration number to an employee orally or using a sheet. The employee manually inputs the registration number, the center checks it and then the user pays and receives the airplane ticket. With the present invention, the user can make a purchase reservation from anywhere using cellular phone 501, and an authentication number and registration number are displayed through a barcode on display section 590 of cellular phone 501 without the need to orally inform data or print out on a sheet.

The present invention allows the user to acquire a ticket by a cellular phone using the same procedure as that explained in FIG. [26] *30*. First, the user accesses the nth virtual shop 740 selling an airplane ticket or music concert ticket and selects a product such as an airplane ticket or ticket (step 660b). The user sends information on a request for a specific date, specific time, specific destination, attribute information such as a seat on the passage side concerning the airplane ticket to virtual shop 740. In the case of a ticket, the user sends information on a specific concert, specific date, specific time or specific time and specific seat and desired fee within a specific range.

In step 660c, virtual shop 740 sends product information. In the case of an airplane ticket, virtual shop 740 sends information on a ticket of flight with vacant seats on a desired date/time, desired destination in ascending order of fares and the information is finally displayed on display section 590 of cellular phone 501 as shown in FIG. [27] *31*(C).

That is, the first row of the list shows flight No., departure time or scheduled arrival time, total number of desired vacant seats, for example, 25 seats of the flight for 99 dollars, the lowest fare, or displays the seat number of the seat closest to the user's preference such as "14B". The nth row shows the nth cheapest airplane ticket. In the case of tickets for a movie, musical, amusement park, etc., the list shows performances or attractions of the same content in ascending order of fees or distance and in order of preferences.

In the case of an amusement park, it is possible to acquire reservations for or the right to reserve different facilities after the purchase of the admission ticket. In this case, as shown in FIG. [34] *38* and FIG. [27] *31*(E), cellular phone 501 receives information on the situation of available space of the attraction or restaurant from the center first, creates a list of attractions or restaurants in ascending order of reservable time of admission and displays the list on display section 590.

When using a cellular phone line, the user sends a request to the center and receives information on the situation of available space from the center. In the case of data broadcasting which is unidirectional, the center broadcasts data repeating information on the situation of available space or reservation situation information many times in a carousel fashion.

The user selects, acquires and displays information of the attraction of his/her choice from the carousel data.

A specific display is shown in FIG. [27] *31*(E). The list shows "Cable car", that is, an attraction name, "11:30", that is, a reservation time, No. "14", that is, the number of remaining available reservations, Area "A", that is, the location of the attraction in the amusement park. The order of display in the list corresponds to the ascending order of time of admission or compares the aforementioned location of the attraction in the amusement park, the GPS system of the user's cellular phone 501, positional information such as the base station ID from the base station or positional information 816 from position detection section 558 (FIG. [33] *37*) such as direction sensor, etc. In this way, the cellular phone searches for an attraction or performance close to cellular phone 501, displays in ascending order of distance, which allows the user to select a nearer attraction easily. In the case of a restaurant, the cellular phone creates a list in ascending order of price and displays the list. If the time is quite early, a discounted price is displayed for a certain period of time.

This procedure is shown in step 827a and 827b of the flow chart in FIG. [34] *38*. In step 827c, cellular phone 501 accesses the homepage of a virtual shop of an amusement park over the Internet and acquires information on attractions and restaurants on the day. The user selects a specific attraction from them, enters in reservation processing mode in step 827d and manually enters the ID number of admission ticket 832 (FIG. [26] *30*) the user has or password written in ticket 832 if necessary in cellular phone 501 (step 827e). When more tickets are needed for family members, etc., a plurality of IDs and passwords are entered.

In step 827f, the cellular phone sends these ticket IDs, cellular phone ID and attraction ID to the center. In the case of an attraction reservation, the center checks based on this ticket ID using a tuner whether the previously issued reservation ticket is valid. In this case, due to some conditions, if the current right to use a specific ticket ID is not valid, a flag indicating prohibition of use for a specific ticket ID is set in the center database, and therefore the use of the ticket is prohibited (step 827g). If the right to use is still valid, the center issues a reservation ticket or provisional ticket.

At this point in time, since the center is far from the ticketing machine and cannot issue the ticket, the center issues an authentication number, that is, provisional ticket information, encrypts and sends it to cellular phone 501. Cellular phone 501 saves this information in memory 802 (FIG. [33] *37*) (step 827k). More specifically, the memory stores the name of the reserved attraction, start time, place, authentication information, etc. Based on the aforementioned start time information, cellular phone 501 drives the speaker or vibration section of cellular phone 501 a certain time before the start time to remind the user of the event and urges the user to go to the place.

Then, the user moves from the place of entry to admission gate apparatus 828 at the entrance of the attraction or ticketing machine 829. Cellular phone 501 enters reservation issuance or admission permission processing mode. If a certain time or more has elapsed or the time is outside the range of the reservation specification time, a use prohibition flag is set, and therefore it is not possible to accept processes in step 827k and 827p (step 827j).

Reservation ticketing machine 829, magnetic reader system of admission gate apparatus 828 or optical reader system or radio IC type card reader 831 in FIG. [26] *30* reads the ticket ID of ticket 832 (step 827k).

In step 827m, it is checked whether the device ID such as the telephone number of cellular phone 501 is registered in the center database or not against the ticket ID, and if registered, the process jumps to step 827q. It registered, an authentication check for the portable terminal is omitted and it is only necessary to insert the ticket into card reader 831.

If not registered, the portable terminal displays the authentication number using a barcode, etc. If the amount of information to be displayed is large, both Bluetooth and barcode displays instead of the authentication number are used. A token for communication mutual authentication or ID information is displayed on display section 590 of cellular phone 501 as shown in FIG. [27] *31*(b). Barcode reader 708 (FIG. [33] *37*) reads this barcode to obtain mutual authentication, communication token or ID information. In the case of a one-dimensional barcode, barcode reader 708 with a one-dimensional sensor is used and in the case of a two-dimensional barcode, a barcode reader with a two-dimensional sensor such as a video camera is used.

Then, cellular phone 501 sends/receives information to/from ticketing machine 829 (FIG. [26] *30*), etc. via Bluetooth, and it is thereby possible to establish reliable communication between specific POS terminal 750 and specific cellular phone 501 and prevent misoperation or fraud (step 827n).

At the entrance, people line up and there is a plurality of portable terminals within the communication service area such as Bluetooth and radio LAN, and therefore it is difficult to identify the terminal with which the machine is communicating. The present invention reads mutual communication parameters such as barcode token on the display section of one portable terminal at the entrance and communicates using those parameters. This makes it possible to identify one communication party, drastically improve security and prevent misoperation.

As shown in 592a (FIG. [27] *31*), a large capacity encryption key for encrypted communication is sent in addition to the token using a two-dimensional barcode with a large display capacity and radio communication is mutually carried out using this encryption key, which allows communication with high security. An example of Bluetooth has been presented here, but similar effects can also be obtained using radio LAN IEEE802.11a.11b.

Then, in step 827p, barcode reader 708 reads the authentication number and in FIG. [26] *30*, when the center indicated by virtual shop 740 checks and decides that the calculation result of the authentication number is correct, the process moves on to a permission mode in step 827r. In the case of an admission mode in step 827t, admission gate 830 in FIG. [26] *30* is opened and the user is allowed to enter the place of attraction, concert or performance (step 827u). After the attraction is finished, the next attraction list is requested in step 827a at the top.

In the case of a reservation ticketing mode back in step 827r, ticketing machine 829 issues a reservation ticket in step 827s and the user can receive actual reservation ticket 832, and when the reserved time comes, the user can pass through the admission gate by inserting the reservation ticket into card reader 831. At this time, a flag of prohibition of admission for the attraction is set to "ON" so that the user cannot enter twice illegally. Then, in step 827r, the center stops issuing any new authentication number or reservation ticket concerning the original ticket ID for a certain period of time to prevent two or more reservation tickets from being issued during the same period. It is also possible to set the aforementioned reservation use prohibition flag.

In the case of an amusement park, when an individual exits and reenters, the system authenticates the individual who once exited using UV ink, etc. for authentication of the individual. However, using the barcode display of the present invention allows authentication. At the time of admission, the admission prohibition flag of the ticket ID is set to "ON". In the case of a user of with portable terminal who exists temporarily, the ticket ID is read from the ticket, the portable terminal ID is displayed with a barcode, the barcode readers reads the barcode and the admission prohibition flag is set to "OFF". At the time of reentry, the ticket ID and portable terminal ID are read likewise and the admission prohibition flag is checked.

In the case of legal use, the ticket ID matches the portable terminal ID and the admission prohibition flag is OFF, and so the reentry is admitted and admission gate apparatus 828 opens the gate. Setting the admission prohibition flag to "ON" after the entry prevents illegal entry. In this case, a barcode display of the portable terminal alone can realize a virtual electronic ticket without using a physical ticket.

The aforementioned admission system allows the user to purchase an electronic ticket through WEB beforehand, acquires an authentication ID, saves it in memory, displays the authentication ID with a barcode and sets the admission prohibition flag to "ON". At the time of exit, the system reads the authentication ID of the portable terminal, sets the admission prohibition flag to "OFF" and at the time of reentry, reads the authentication ID and sets the admission prohibition flag to "ON" and in this way prevents any fraud.

The above-described method allows the user to acquire the right to obtain a reservation ticket anywhere. Thus, this has the effect of allowing the user to acquire the right to obtain a reservation ticket without visiting the place of attraction. In step 827e, once the ticket ID and password are registered, they are registered in memory 802 of portable terminal 501 (FIG. [30] *34*), and therefore no second input is needed. Furthermore, once an authentication of the portable terminal is performed in step 827n and 827p or an authentication is performed using a fixed terminal, authentication is possible only with the ticket ID thereafter. As a result, at the time of the second admission for another attraction, it is not necessary to read the barcode at the entrance on the same day, this has an effect of allowing the user to acquire admission or a reservation ticket by only making a reservation using a portable terminal and letting the entrance machine or reservation ticketing machine read the admission ticket.

The above-described examples are cases of an amusement park and performance, but the same procedure applies to a case of an airplane ticket by making a reservation using a portable terminal, letting the gate at the airport read the barcode and acquiring the seat ticket or letting the machine read the barcode and allowing the user to get aboard the plane directly through the gate.

(6-5) Barcode Display Method 1

Then, a specific example of a method of displaying a barcode used in electronic commerce according to the present invention will be explained. FIG. [27] *31*(b) expresses same data using two kinds of barcodes; two-dimensional barcode 592a and one-dimensional barcode 592. First, when the data is small, the two-dimensional barcode 592a an done-dimensional barcode 592 do not change their display patterns.

Then, when the data is relatively large, the two-dimensional barcode 592a does not change its display pattern, while the one-dimensional barcode 592 displays a plurality of display patterns with different data contents cyclically on a time-sharing basis and thereby displays large data which is consequentially equivalent to the two-dimensional barcode.

When the data is much larger, the two-dimensional barcode 592a changes its display pattern though with a low frequency, while the one-dimensional barcode 592 displays a plurality of display patterns cyclically on a time-sharing basis with a high frequency. Even in the case where encryption causes the amount of display data to increase, this allows the barcode to be displayed speedily.

This allows both the one-dimensional barcode and the two-dimensional barcode to display the same volume of data simultaneously. This also allows barcode reader 708 (FIG. [26] *30*) to read data with either the one-dimensional barcode using a one-dimensional sensor or the two-dimensional barcode using a two-dimensional sensor such as a video camera, which provides compatibility. This has an effect of allowing a barcode reader of any type to read data. Furthermore, by displaying the one-dimensional barcode or two-dimensional barcode, it has the effect of displaying larger data. The above-described example is the case where the one-dimensional barcode and two-dimensional barcode are displayed simultaneously a plurality of times, but displaying either the one-dimensional barcode or two-dimensional barcode individually a plurality of times also has a similar effect of increasing the volume of data displayed.

In the case of a low-priced product, authentication is possible only with a registration number and therefore only one-time display is enough for most applications. Even when the volume of data is large and the barcode needs to be displayed a plurality of times, the present invention automatically presents a plurality of barcodes one by one and allows the user to get authentication processed speedily by only holding display section 590 of cellular phone 501 over barcode reader 708, thus producing the effects of omitting the authentication procedure and improving convenience compared to the conventional system.

A cellular phone having display section 590 with a monochrome display can display a high-density barcode at any location of the screen as far as its pitch in horizontal direction is 50 μm or less. As shown in FIG. [28] *32*(c), setting the aspect ratio to 2:1 or more allows not only characters but also a plurality of high-density barcodes 751, 751a, 751b and 751c to be displayed as shown in FIG. [35] *39*. This makes it possible to display an authentication, product ID and discounted price, etc. at a shop without changing the screen. Thus, all processing is completed with a one-time display.

(6-6) Electronic Authentication Using Downlink

According to FIG. [26] *30* again, an electronic authentication method is shown below which carries out processing with only the downlink without transmission over the uplink, that is, an electronic authentication method available only in broadcasting T mode.

First step 660a in which broadcasting station 502 sends product purchase software and product data and data is downloaded is the same. In step 662a, user 746 of cellular phone 501 selects virtual shop 740. In step 662b, information on the product or service price is displayed using product purchase software and product data of a specific shop. In step 662c, user 746 selects a specific product from among the products displayed. In step 662d, the product purchase software displays the fee and settlement method. In step 662e, if the product is accompanied by coupon information including some benefit such as a discount, the discounted price is displayed in step 662f.

When user 746 selects the purchase of the product in step 662g and there is still an available coupon, the coupon registration number which can be issued during the term of validity of the coupon is registered in the registration number memory section. When settlement at the shop is selected in step 662h and data transmission is not necessary in step 662i, if there are the date of purchase of the product, price or coupon in step 662j, the registration number and discounted price are recorded in the BC mode memory section.

Back in step 660i, the user visits the shop and displays the cellular phone number, product ID, coupon registration number and discounted price, etc. on display section 590 of cellular phone 501 using barcode 751. Then, in step 660k, barcode reader 708 reads the data and when authentication is completed through the POS terminal, a payment is executed. If there is a coupon, it is possible to acquire the product at a discounted price.

This method has the effect of completing an electronic authentication/purchasing system without any transmission through a cellular phone. In this method, since no cellular phone circuit is required, it is possible to implement this business model also by combining a portable TV with the display method of the present invention. Using this method, it is also possible to acquire a coupon registration number, etc. from a general home television set, send the registration data to cellular phone 501 with the BC mode over a radio channel such as Bluetooth from the TV set, take the cellular phone to the shop and purchase a product such as an airplane ticket or a ticket.

(6-7) Example of Purchase of Product or Service uUsing Barcode Mode

Then, a specific example of a procedure for purchasing a product or service in a BC mode will be explained. FIG. [36] *40* and FIG. [37] *41* are flow charts for purchasing a service. In step 663a, data broadcasting "CDE" is received and product purchase menu screen 664a is displayed in step 663b. [Instep] *In step* 663c, if "2" is selected from the menu numbers, for example, first screen 664b with menu number 2 is displayed in step 663d and coupon benefit information is shown as illustrated in the figure. If the coupon is selected in step 663e1, the purchase program or issuance center issues the coupon registration number in step 663e2. In step 663f, the coupon number is received using the program or downlink and the coupon registration number together with the product ID is recorded in the registration number memory.

Then, in step 663h, the second screen of menu n is displayed on screen 664c. Screen 664c displays both the basic fee and the discounted fee when the coupon is used. When the settlement method is instructed in step 663i, a registration control number such as BC-4 is displayed as shown on screen 664d, recorded in the registration number memory section and the coupon registration number, discounted sum and product ID are recorded in the registration number memory section in step 663j.

In step 665a in FIG. [37] *41*, if BC mode switch (SW) 736 (FIG. [27] *31*) is turned ON, the process moves on to step 665b and all registration data of the BC mode registration control numbers is read and part of the data is displayed in a list as shown on screen 666a. If the data of the registration control number of m (e.g., No. 3) is selected in step 665c, a screen without the barcode on screen 666b is displayed.

Here, when BC mode SW 736 shown in FIG. [27] *31*(b) is pressed in step 665d, the BC mode is turned ON and n=0 in step 665e and n is incremented in step 665f. In step 665g, the nth barcode is displayed. In the first case, as shown on screen 666b, and when optical detection section 725 (FIG. [27] *31*) detects reading light in step 665h, the process moves on to step 665j and moves on to step 665k after a certain duration, and if n is not the final value, the process moves back to step 665f and increments n. By the way, even if the result is "NO" in step 665h, the process moves on to step 665i, turns ON BC mode SW 736, then moves on to step 665k, increments n and displays the next barcode.

In this case, constantly cycling barcodes at certain intervals to display barcodes No. 1, No. 2, No. 3, No. 4, and so on is not an efficient way but ensures that all barcodes are read with time.

Screen 666c shows when n=2, screen 666d shows when n is the final value and when n reaches the final value, the process moves back to step 665b and displays screen 666a.

According to the present invention, authentication that used to be performed orally or using paper or a credit card can now be performed by simply reading the display section of a cellular phone using a barcode reader, and therefore the present invention improves convenience.

(6-8) Application to Portable TV Receiver

FIG. [38] *42* shows an example of a case where the display apparatus of the present invention is applied to portable TV receiver which has no portable transmission/reception function. Portable TV receiver 753 has a configuration resulting from removing the transmission/reception section of a cellular phone from the configuration in the block diagram in FIG. [33] *37* and therefore the block diagram is omitted. As shown in FIG. [38] *42*(a), portable TV receiver 753 has display section 590 and sub-display section 592. It is also provided with BC (barcode) mode SW 736 to allow barcode 751 to be displayed.

A procedure for paying a contract rate of data broadcasting will be explained using the BC display flow chart in FIG. [38] *42*(b). FIG. [38] *42*(b) is basically the same as the flow charts in FIG. [36] *40* and FIG. [37] *41*. A fee settlement program and information on the payment sum corresponding to the device ID will be downloaded from data broadcasting. CDE by means of data broadcasting beforehand. As explained using the lower half of FIG. [26] *30*, electronic purchase processing is possible through only broad casting reception. Therefore, explanations of some stages will be omitted and explanations will be started in and after the stage in which advance data for payment is ready.

First, in step 668a in FIG. [38] *42*(b), BC mode SW 736 is pressed and turned ON, a menu screen appears and when the ith menu is selected (step 668b), n=0 in step 668c and n is incremented in step 668d and the nth BC appears (step 668e). Screen 668 shows the case when n=1 and the data of POS reading code: 2436 is displayed in the form of barcode 751.

If a certain time has not elapsed yet in step 665f, the process moves back to step 668d, increments n and displays the next barcode. If a certain time has elapsed in step 668f and n reaches the final value in step 668g, that is, when all barcodes are displayed completely, the process moves on to step 668h, checks the cycle number and if it is m or less, the process moves on to step 668n, displays barcodes No. 1 to the last number that correspond to one cycle of the barcode, and when cycles are completed, the process moves on to step 668i and continues to display barcodes until the user enters a sign indicating that the process has completed. When a completion instruction arrives, the display of BC is finished (step 668j).

Since the system in FIG. [38] *42* can be constructed of only a receiver, the barcode display system of the present invention can be expanded for wider applications. For example, when the user takes this reception terminal to a convenience store to pay an electricity bill, the barcode reader reads the data and only by doing so, the fee, subscriber number and month of payment, etc. are input and upon payment, electronic settlement is executed and the payment of the fee is notified to an electric power company. The present invention omits some of the payment steps so far and thereby results in labor savings.

(6-9) Barcode Display Method 2

FIG. [39] *43* shows a more specific method of displaying barcodes explained in FIG. [38] *42*(b). First, the method will be explained using FIG. [39] *43*(a). First barcodes 751a and 752a (FIG. [39] *43*) are displayed for time T1 in step 668f on the sub-display section which is in a non-display state in step 668e in FIG. [38] *42*(b). If n is not the final value in step 668g, no-display 757a is displayed in step 668k. When the barcodes are displayed for a certain time T2 which is shorter than T1 in step 668m, second barcodes 751b and 752b are displayed for time T1 (step 668f) in steps 668d and 668e and non-display 757b is displayed for time T2 (step 668m). When the display of the last nth barcode 751 is completed, if the cycle is before the mth cycle in step 668h, non-display 757z is displayed for a non-display period 754 of time T3 which is longer than T2 (step 668p) in step 668n and the first barcode 1 is displayed for period T1 755a again. This process is repeated m times.

It is also possible to display either barcode 751a or barcode 752a independently. Or it is also possible to display both barcode 751a and barcode 752a simultaneously as shown in the figure. Simultaneously displaying data of the same content on both barcode 751a and barcode 752a has the effect of allowing data to be read by both the one-dimensional barcode reader and two-dimensional barcode reader. In this case, as shown in FIG. [39] *43*(a), the barcode 751a and barcode 752a show n patterns, but since the two-dimensional barcode has a larger volume of display data, it displays K patterns where K is smaller than n (that is, n>K). This causes the display time of the barcode 752 to be K/n times T1, which makes recognition of the barcode more reliable.

As shown in FIG. [39] *43*(b), non-display 757z is provided only at the beginning of a cycle and by not providing any non-display period between the remaining barcodes 751a, 751b and 751c, it is possible to speed up the display.

By providing the non-display periods 756a, 756b and 756c, the present invention can reduce wrong recognition by the barcode reader. In general, there are scan type barcode readers such as laser scan, manual scan or two-dimensional sensor and these constitute the mainstream. If the display of a barcode changes suddenly during a scan, for example, barcode 1 is read in the first half and barcode 2 is read in the second half with the result that completely different barcodes are read. Of course, it is possible to eliminate most of them by error correction, but it is difficult to eliminate all errors completely. Furthermore, retries caused by errors take time to read.

Providing non-display period 756 between the display period of barcode 1 and the display period of barcode 2 in such a way that T1>T2 as with the present invention can drastically reduce reading errors caused by time cross-talks between barcode 1 and barcode 2. Furthermore, non-display 757z is displayed at the beginning of each cycle for T3 (T3>T2). Then, during a read the barcode reader measures the time and can thereby detect start barcode 1; 751a and has the effect of facilitating the synchronous detection of the start data of the read data. The non-display screen in this case may be a black screen and white screen. The white screen is without signals and is therefore more effective in an aspect of noise.

Furthermore, as shown in FIG. [40] *44*, inserting barcodes 751a and 752a including a start code at the beginning makes it possible to detect the start synchronous detection and has the effect of accelerating and insuring data read. In this case, as shown in FIG. [40] *44*, all non-display period T2's between barcodes may be the same.

Furthermore, display order number 759 indicating the cyclic display order and total display number 760 are displayed at the start parts of barcodes 751a and 752a, specific parts of barcodes 751a and 752a or the start part of the demodulated data. In this way, during a read by the barcode reader, even if it happens that the barcode reader manages to partially read only 751b which is the second display, it is possible to store information in the barcode reader associated with display order number 759, checking display order number 759 sequentially and read all data corresponding to a total display number 760.

This method allows partial reading of random barcodes and therefore has the effect of speeding up a total data read time. In this case, data structure 762 of each barcode display is as shown in FIG. [40] *44*. That is, synchronous display 761, display order number 759, total display number 760, data 764 and end display 763 are aligned in this order.

When reading of all barcodes is completed, normal barcode reader 708 (FIG. [26] *30*) outputs a buzzer tone indicating an end. This end tone is input using microphone 594 shown in FIG. [17] *21* and detected by the detection circuit and the end of reading is detected in this way, and therefore the end state is displayed on the screen or by a blinking lamp after a certain time or an end buzzer tone is output from speaker 753 to notify users 746 with sound and display. After a certain time, the operation of the cyclic type barcode display is finished.

FIG. [41] *45*(a), (b) and (c) show the amount of reflected light of the barcode sand detection signals. As explained with FIG. [40] *44*, there are two kinds of non-display; a white display and black display. FIG. [41] *45*(a) shows a case where non-display 758 in black display is shown instead of a white display in FIG. [39] *43*. As shown in FIG. [41] *45*(b), there are no more signals during non-display of barcodes. In the case of conventional barcode reading operation, when a plurality of barcodes is manually read, if the barcode reader is moved away from a product tag, the reflected light is not returned, and therefore reflected light detection signals are no longer output.

According to the display method in FIG. [41] *45*, the signal level is lowered as in the case where the barcode reader is moved away or there is no barcode display during this non-display period 765. This makes it easier for the normal barcode reader to read the signal following the non-display period 765 recognizing it as a new barcode. This method has the effects of reading without problems even if a plurality of barcodes of the present invention is cyclically displayed and improving compatibility during a read by a barcode reader for reading printed barcodes.

This method allows barcodes to be read reliably by optimizing T1 according to the barcode reader without the need to provide optical detection section 725. When the user presses the BC switch immediately before approving with the POS terminal, barcodes are cycled several tens of times and holding the barcode reader just in front of the display section allows data to be read, when the reading is finished, the Pos terminal informs the completion of reading with a buzzer tone, etc. and therefore the user can press the BC switch to stop continuous display of barcodes. Then, the user can purchase a product or service at a coupon discounted price by paying the price displayed on the POS terminal.

In the case of a purchase using the cellular phone of the present invention, when the user purchases, for example, an expensive article such as a jewel, the user sends authentication data to the center and then the authentication center makes a call or performs a packet communication with the phone number of the cellular phone or the URL, thereby notifying the cellular phone with an arrival tone or allowing an authentication code newly sent from the authentication center to be displayed with a barcode. The barcode reader reads this barcode and resends it to the authentication center for re-authentication thereby making it possible to implement authentication and settlement with high security.

In the event of theft of this cellular phone, when the BC switch is pressed, a password is requested and if the password is wrong, the system is set so as to prevent the barcode display cycle from being entered. This processing prevents erroneous authentication by theft of a cellular phone. Thus, it is possible to implement much higher security than the current credit card system.

Authentication systems with similar effects to those of the present invention but with a different system are also proposed, but all such systems need to additionally introduce a new apparatus into the POS terminal. However, the present invention allows general type barcode readers currently installed at many shops in the world to read barcodes. Thus, the present invention can be implemented without changing infrastructure of conventional apparatuses, etc. at such shops at all. This produces high economical effects. Moreover, the user only needs to press the BC mode switch at a shop and needs no extra conventional operations or inputs, simplifying the authentication or settlement procedure and improving convenience significantly.

Then, optimization conditions in the characteristic aspects of LCD elements to stabilize barcode reading of the LCD element of the present invention will be explained. Since the display section of the present invention is read by a barcode reader, several elements need to meet certain conditions. First is pitch interval: L. During printing, printing a normal barcode requires printing density of 100 dpi or higher. This corresponds to a pitch interval of 250 μm and therefore pitch interval L in horizontal direction is L>250 μm. The present invention implements a readable barcode display by forming it with a horizontal pitch of 250 μm or less.

Furthermore, an optimal condition for a contrast ratio will be explained. In the case of sheet printing, an OD (Optical Density) value is defined. The OD value for general printing sheets necessary for barcode printing is defined to be 0.7 to 1.6. That is, the OD value >0.7 is an optimal condition. Since the OD value is expressed in logarithmic notation, when the OD value is converted to a contrast ratio, if a contrast ratio=4, that is, the LCD display element of the present invention is read by the barcode reader accurately, it is possible to set the contrast ratio to 4 or higher when viewed in a reflected value. From the above-described explanation, the display element of the present invention is set within the two conditions of horizontal pixel pitch L<250 μm and contrast ratio CR>4 during reflection. This ensures stable reading during a read.

In the case of a completely transparent type LCD element of a backlight system without any reflection coat, it is difficult to read barcodes. However, applying the present invention to an LCD display element partially provided with a reflection coat or a semi-transparent type reflection coat allows reading with a barcode reader. When viewed with reflected light, setting the condition in this case to CR>4 allows the barcode reader to read it stably.

(6-10) Application to Electronic Money

Furthermore, the above-described method can also be applied to electronic money using a cellular phone. This will be explained using FIG. [33] *37* below. In this case, to improve security, data to be displayed as a barcode together with time information is encrypted using an encryption key contained in smart card (e.g., SIM card) 803 to generate and display the barcode data. This encrypted barcode is read using barcode reader 708 and decoded using a decoding key contained in POS terminal 750. With this method, even i fa person attempts to copy a barcode illegally acquired from the user and display and execute settlement, the time has already passed and the time information does not match, and thereby this system can maintain the security.

Furthermore, since the encryption key is inside an exchangeable SIM-IC, should information of the encryption key be leaked and the security be broken, all that needs to be done is to replace SIM card 803, and therefore the security is maintained. The security can be improved further by encrypting barcode display data with an encryption circuit in SIM card 803, outputting the barcode display data to the display circuit to display the barcode.

It is also possible to encrypt part or the whole of the barcode display data with the encryption key of server 801 and then receive this data through cellular phone 501. In this case, cellular phone 501 obtains this encrypted data and displays it with a barcode. The data is read by POS terminal 750 and sent to server 801. Decoding the data with the decoding key of server 801 and authenticating it can further improve the security.

When applied to electronic money, mutual authentication communication is performed between server 801 and cellular phone 501 and the sum of electronic money, for example, 100 dollars, is downloaded to memory 802 of cellular phone 501. To use this electronic money, the user visits the actual shop. When the purchase price of the product is 20 dollars, the user presses the BC mode switch to display a barcode in an electronic money mode. The barcode displayed at this time contains the electronic money service ID, service company ID, balance, cellular phone ID or user ID.

FIG. [42] *46* shows a data structure of electronic money of this embodiment and a data structure of electronic money displayed on a barcode. As shown in FIG. [42] *46*(a), in the data structure of electronic money, service ID and service company ID are used as IDs to identify the type of electronic money. Moreover, in addition to the balance, cellular phone ID or user ID, signature data by the server is added as a security authentication ID.

Thus, the signature data put by server 801 using a private key of public key cryptography can prevent the data indicating electronic money from being falsified.

When this electronic money data is displayed on the display section of the cellular phone, encryption is applied to the electronic money data using an encryption key of the smart card. Then as shown in FIG. [42] *46*(b), time information is added to the above-described data and displayed as a barcode. The electronic money data displayed on the barcode is decoded by the POS terminal as described above.

When POS terminal 750 at the shop reads the barcode of the present invention of cellular phone 501, if the purchase sum is small, PUS terminal 750 decodes the read barcode data using a decoding key and executes settlement and if the balance is equal to or greater than the purchase sum, executes settlement and sends a new balance obtained by subtracting the purchase sum from the balance over the Internet and downlink of a cellular phone line to cellular phone 501 and rewrites the balance data in cellular phone 501.

This downlink data can also be sent directly from POS terminal 750 to cellular phone 501 using a communication method such as Bluetooth and radio LAN. Moreover, it is also possible to use Bluetooth, etc. for uplink data. In this case, by displaying ID information such as a communication authentication token and communication encryption key information on the display section of the cellular phone using a barcode and thereby using the barcode for mutual authentication for communication using a token, it is possible to allow the portable terminal and fixed terminal to identify each other, and therefore it is possible to specify communication for one terminal authenticated by the barcode even if there is a plurality of terminals. This improves the security, safety and speed in communications between the portable terminal and fixed terminal. Moreover, encrypted communication can improve the security of information.

In the case where the sum is large, authentication data is added to the data sent to above-described cellular phone 501 over the internet and downlink of a cellular phone line to show it with a barcode on cellular phone 501. The barcode scanner reads this data, PUS terminal 750 verifies this authentication data, checks the authenticated result and completes the settlement. This method can further improve the security.

In the electronic money settlement processing, POS terminal 750 first identities from the service ID indicated by the barcode, the type of service such as electronic money, product purchase coupon, purchase of a ticket, etc. POS terminal 750 then identifies the service company from the service company ID (URL (Uniform Resource Locator) of the service company) indicated by the barcode and accesses the URL, etc. of the service company over a communication channel or the Internet if necessary.

In the case where the balance is equal to or greater than the purchase sum, POS terminal 750 sends a new balance obtained by subtracting the purchase sum from the balance indicated by the barcode to the center and sends the new balance to cellular phone 501 over the cellular phone channel.

Then cellular phone 501 rewrites the balance data in memory in SIM card 803 with the new balance data. At the same time, cellular phone 501 displays the balance data with both normal characters and a barcode on the screen simultaneously to notify the data to the user. At the same time, cellular phone 501 notifies the user of the change in the balance using a buzzer tone. Electronic money is used in this way.

In this case, POS terminal 750 decodes the read barcode data using a decoding key, verifies the signature data and if the balance is equal to or greater than the purchase sum, sends a new balance obtained by subtracting the purchase sum from the decoded barcode data and the balance to server 801. Server 801 updates the balance, then updates the signature data and sends this to the cellular phone over the Internet and the downlink of the cellular phone line and rewrites the electronic money data of cellular phone 501.

Since this system can construct an electronic money system without changing existing hardware of POS terminal 750 and cellular phone 501, this system has the effect of not requiring further investment. Moreover, this system allows an existing barcode reader or POS terminal 750 to be used, offering a wide range of application and convenience.

In this case, the barcode data of cellular phone 501 may be read and abused while the user is absent, but even in the event of such abuse, a new balance is displayed in characters on the cellular phone and a buzzer tone sounds at the time of abuse, allowing the user to discover the abuse.

Furthermore, when a cellular phone number or cellular phone mail address is read when the first barcode is displayed, not only the aforementioned balance but also authentication data are sent through the cellular phone channel and displayed on the cellular phone with a barcode. Barcode reader 708 reads and authenticates this and can thereby prevent abuse by other cellular phones.

Moreover, to avoid privacy problems, personal cellular phone numbers and URLs are encrypted and displayed with a barcode. Then, the system is constructed in such a way that the barcode data is sent through a communication channel to the center, the center decodes it to acquire the cellular phone number or URL, thus preventing POS terminal 750 from decoding them. In this way, this configuration can protect individual privacy.

(6-11) Application of Local Radio Communication

FIG. [43] *47* shows the configuration of cellular phone 501 when the present invention is applied to local radio communications. FIG. [43] *47* assigns the same reference numerals to the same components as those in FIG. [7] *11* and detailed explanations thereof are omitted. This embodiment will describe a case where service terminal 90 is above-described POS terminal 750 and downlink data and uplink data are sent between POS terminal 750 and cellular phone 501 using Bluetooth, thereby realizing a local radio communication.

It is possible to improve speediness using local radio communication such as Bluetooth for downlink data and uplink data and using barcode display for personal authentication. In this case, data communication between the server and cellular phone 501 is performed through POS terminal 750. In this case, if there is a plurality of POS terminals 750, cellular phone 501 needs to establish a communication session with specific POS terminal 750, but it is also possible to display a device address of the cellular phone for local radio communication (e.g., Bluetooth) in cellular phone 501 using a barcode and selectively establish a communication session with POS terminals 750 which reads the device address though local radio communication.

FIG. [44] *48*(a) and (b) are flowcharts showing processing by the cellular phone and POS terminal 750 that selectively establish a communication session through local radio communication using a barcode. In FIG. [44] *48*(a), cellular phone 105 displays a barcode to indicate the device address of cellular phone 105 in step 1fa first. Then, the process moves on to step 2fa and waits to receive a connection request through local radio communication. When the connection request through local radio communication is received, the process moves on to step 3fa and establishes a communication with the device (POS terminal 750) that has requested a connection through local radio communication.

On the other hand, POS terminal 750 reads the barcode displayed on cellular phone 501 in step 1fb first and searches for the device indicated with the device address by the barcode read in step 2fb. Then, in step 3fb, the connection request through local radio communication is sent to the searched device (cellular phone 501) and a communication session with the device (cellular phone 501) through local radio communication is established in step 4fb.

Furthermore, in step 2fa, to prevent a communication session from being erroneously established when a connection request is accidentally sent from another device, it is also possible to display a barcode using not only the device address of the cellular phone but also a random number as the session ID.

FIG. [45] *49*(a) and (b) are flowcharts showing processing by the cellular phone 501 and POS terminal 750 in this case. In FIG. [45] *49*(a), cellular phone 501 generates random number A as the session ID in step 1ga and generates and displays a barcode indicating the device address of the cellular phone 501 and random number A in step 2ga. Then, the process moves on to step 3ga and waits to receive a connection request through local radio communication. When the connection request through local radio communion is received, the process moves on to step 4ga, compares a random number included in the connection request with random number A and if both numbers match, moves to step 5ga and establishes a communication session with the device (POS terminal 750) that requested the connection through local radio communication. In the case of a mismatch, the process moves back to step 3ga and waits to receive a connection request through local radio communication from another device.

On the other hand, POS terminal 750 reads the barcode displayed on cellular phone 501 in step 1gb at this time and searches for the device indicated with the device address pointed by the barcode read in step 2gb. Then, in step 3gb, a connection request is sent to the searched device (cellular phone 501) through local radio communication and in step 4gb, a communication session is established with the device (cellular phone 501) through local radio communication. In this case, in step 3gb, POS terminal 750 includes the random number included in the barcode read in step 3gb as the session ID in the connection request and sends it.

Thus, by displaying the device address of cellular phone 501 and a random number as the session ID with a barcode, cellular phone 501 can reliably establish a communication session with POS terminal 750 which is trying to perform local radio communication.

As shown above, even if there is a plurality of POS terminals 750, cellular phone 501 can establish a communication session with specific POS terminal 750.

Then, the processing procedure by cellular phone 105 when a barcode is automatically displayed through local radio communication will be explained using FIG. [46] *50*. The cellular phone receives identification information indicating the type of coupon from POS terminal 750 in step 1ad. The data that cellular phone 501 receives from POS terminal 750 here has a configuration as shown in FIG. [47] *51*. That is, the data structure of the coupon consists of coupon type identification information made up of a service ID and service company ID, an ID indicating an individual coupon which is a coupon registration number, a product ID and a discounted price.

In step 2ad, cellular phone 501 searches for a coupon corresponding to the type identification information of the received coupon. Cellular phone 501 actually compares the coupon information stored by CPU 107 shown in FIG. [43] *47* in storage section 108 with the coupon information received in step 1ad, and if any matching information is found, the process moves on to step 3ad and displays the coupon information with a two-dimensional barcode.

The present invention is not limited to the above-described embodiments, but can be implemented with various modifications.

The OFDM signal transmission system of the present invention is an OFDM signal transmission system comprising a first reception block equipped with a first reception section that receives a first transmission signal sent from a transmission station that transmits a modulated signal modulated according to an OFDM modulation system using a first frequency band, a tuning section that times the first received signal, a first demodulation section that demodulates the first received signal and an output section, and a second reception block equipped with a second reception section capable of receiving a second transmission signal sent from a transmission/reception station that carries out reception using a second frequency band which is different from the first frequency band and a second demodulation section that demodulates a second received signal, constructed in such a way as to receive the identification information of transmission/reception station included in the second received signal and/or information to perform at least one of tuning or demodulation of above-described first transmission signal, obtain transmission information to perform atleast one of tuning or demodulation of the first transmission signal, perform at least one of tuning or demodulation of the first received signal at above-described first demodulation section.

The OFDM signal transmission system of the present invention is an OFDM signal transmission system comprising a first reception block equipped with a first reception section that receives a first transmission signal sent from a transmission station that transmits a modulated signal modulated according to an OFDM modulation system using a first frequency band, a tuning section that tunes the first received signal, a first demodulation section that demodulates the first received signal and an output section, and a second reception block equipped with a second reception section capable of receiving a second transmission signal sent from a transmission/reception station that carries out reception using a second frequency band which is different from the first frequency band and a second demodulation section that demodulates a second received signal, constructed in such a way as to receive the identification information of transmission/reception station included in the second received signal and/or information to perform tuning and/or demodulation of above-described first transmission signal obtain transmission information to perform tuning and/or demodulation of the first transmission signal, perform tuning and/or demodulation of the first received signal at above-described tuning section and/or said first demodulation section.

The OFDM signal transmission system of the present invention is an OFDM signal transmission system comprising a first reception block equipped with a first reception section that receives a first transmission signal sent from a transmission station that transmits a modulated signal modulated according to an OFDN modulation system using a first frequency band, a tuning section that tunes the first received signal, a first demodulation section that demodulates the first received signal and an output section, and a second reception block equipped with a second reception section capable of receiving a second transmission signal sent from a transmission/reception station that carries out reception using a second frequency band which is different from the first frequency band and a second demodulation section that demodulates a second received signal, constructed in such a way as to receive the identification information of transmission/reception station included in the second received signal and/or information to perform tuning and/or demodulation of above-described first transmission signal, obtain transmission information to perform tuning and/or demodulation of the first transmission signal, perform tuning and/or demodulation of the first received signal at above-described tuning section and/or said first demodulation section, display the demodulation data on the data display section.

These configurations allow transmission parameters necessary for demodulation to be obtained before the received signal is demodulated.

The portable terminal of the present invention comprises receiving means, barcode forming means for forming barcodes and displaying means, constructed in such a way that the above-described barcode forming means forms a barcode from the data received by the above-described receiving means and the above-described displaying means displays the above-described formed barcode.

This configuration allows a barcode to be displayed according to a received signal, and therefore using this configuration for electronic commerce can facilitate settlement. Furthermore, since the portable terminal generates a barcode, it is possible to reduce the size of data to be received compared to a case where a barcode itself is received.

The portable terminal of the present invention further comprises detecting means for detecting light or a signal from a barcode reader provided near the above-described displaying means.

Using this configuration to change the display on the barcode together with the detection result of the detecting means makes it possible to automatically change the barcode display appropriately in synchronization with the reading operation of the barcode reader without the need for operation by the portable terminal user.

The portable terminal of the present invention is constructed in such a way as to update barcodes displayed on the above-described displaying means one by one according to the detection result of the above-described detecting means.

This configuration allows the user to simply hold the barcode reader in front of the display section to update barcodes one after another, making it easier to read information displayed with a plurality of barcodes. The portable terminal of the present invention comprises receiving means, barcode forming means for forming barcodes based on a received signal and displaying means including a main display section and sub-display section for displaying the above-described barcode on the above-described sub-display section.

This configuration allows a barcode to be displayed according to a received signal, and therefore using this configuration for electronic commerce, etc. can facilitate settlement. Moreover, since the sub-display section is provided and the above-described sub-display section displays a barcode, it is possible to display a desired image on the main display section while the barcode is displayed, thus improving convenience.

The portable terminal of the present invention is constructed in such a way that the sub-display section has higher resolution than the main display section.

This configuration allows a detailed bar to be displayed and can thereby suppress a reduction in the amount of information of a barcode despite the small display area.

The portable terminal of the present invention is constructed in such a way that the main display section has a color filter layer and the sub-display section has no color filter layer.

This configuration causes reflected light passing through any pixel to receive the same attenuation when the sub-display section is irradiated with barcode reading light, thus eliminating the possibility of erroneous recognition even with a high-density bar.

The portable terminal of the present invention is constructed in such a way that data to be displayed on the sub-display section is divided into a plurality of pieces of data and the sub-display section displays a barcode a plurality of times with some pieces of data at a time.

This configuration makes it possible. when the volume of data to be displayed with barcodes is large, to display the large volume of data with a plurality of barcodes without raising the density of the barcodes. As a result, it is possible to read a large volume of display barcode data without erroneous recognition.

The portable terminal of the present invention is constructed in such a way that the main display section displays two-dimensional barcodes.

Since the amount of data displayed with two-dimensional barcodes is larger than the amount of data displayed with one-dimensional barcodes, this configuration allows a large volume of data to be displayed with barcodes in short time by selectively displaying two-dimensional barcodes on the main display section when, for example, a large volume of data that cannot be displayed with one-dimensional barcodes or that it would take much time to display the whole of data on the sub-display section is requested to be displayed with barcodes.

The portable terminal of the present invention is constructed in such a way as to adaptively display the above-described one-dimensional barcodes and/or above-described two-dimensional barcodes according to the amount of data to be displayed with barcodes or instructions.

This configuration makes it possible to display barcodes by effectively using the limited screen area without displaying two-dimensional barcodes unnecessarily.

The portable terminal of the present invention is constructed in such a way as to adaptively select update timing of display barcode patterns of one-dimensional barcodes to be displayed on the sub-display section and two-dimensional barcodes to be displayed on the main display section according to the amount of data to be displayed with barcodes.

This configuration makes it possible to speed up the update timing of two-dimensional barcodes when the amount of data to be displayed is large and slow down the update timing of two-dimensional barcodes or not to update the update timing of two-dimensional barcodes and only update one-dimensional barcodes when the amount of data to be displayed is not so larger thus providing barcode displays according to the amount of data.

The portable terminal of the present invention is constructed in such a way as to select update timing of displaying each barcode so that one-dimensional barcodes to be displayed on the sub-display section and two-dimensional barcodes to be displayed on the main display section have the same amount of information displayed per unit time.

This configuration allows both one-dimensional barcodes and two-dimensional barcodes to display the same amount of information displayed per unit time, making the data readable by a barcode reader using a one-dimensional sensor and a barcode reader using a two-dimensional sensor. This makes data readable by any type of barcode reader, thus widening the range of application.

The portable terminal of the present invention is constructed in such a way that when barcodes are displayed a plurality of times on the sub-display section or main display section, barcodes are displayed a plurality of times with predetermined non-display periods inserted between barcode display periods.

This configuration suppresses erroneous recognition of the barcode reader.

The portable terminal of the present invention is constructed in such a way that a barcode display period is selectable to be longer than a non-display period.

This configuration significantly reduces reading errors due to time cross-talks between barcodes displayed consecutively.

The portable terminal of the present invention is constructed in such a way that a plurality of barcodes is formed for each of a plurality of pieces of information, each piece of information is displayed with a plurality of barcodes with a predetermined non-display period inserted between barcode display periods and the non-display period between barcodes corresponding to a break point of information is made longer than the non-display period within each piece of information.

This configuration allows the barcode reader to detect the start barcode of each piece of information by measuring the time of a non-display period during a read of the barcode, thus facilitating synchronous detection of the start data of read data.

The portable terminal of the present invention comprises receiving means, barcode forming means for forming barcodes based on a received signal and displaying means for displaying the above-described barcode, constructed in such a way that when the above-described displaying means displays barcodes a plurality of times, the start part of the barcode shows a display order number indicating the displaying order and a total number of barcodes displayed.

When the barcode reader reads a barcode, even if the barcode reader can only read the second barcode instead of the start barcode, for example, this configuration makes it possible to store the information read by the barcode reader associated with the display order number, detect display order numbers one by one and thereby read all information corresponding to a total number of barcodes displayed. This allows partial reading of random barcodes, making it possible to shorten the time of reading all data.

The portable terminal of the present invention comprises receiving means, barcode forming means for forming barcodes based on a received signal and displaying means for displaying the above-described barcode and a barcode display switch to display a barcode on the above-described display means, constructed in such a way that when the above-described barcode display switch is operated, entry of a preset password is requested and no barcode is displayed when a correct password is not entered.

Since a third person other than the portable terminal user does not know the password, when the barcode display of this portable terminal is used for authentication of electronic commerce, this configuration can prevent erroneous authentication in the event of theft of the portable terminal.

The portable terminal of the present invention further comprises encrypting processing means, constructed in such a way that the above-described encrypting processing means encrypts the data received by the above-described receiving means, the above-described barcode forming means forms barcode data from the data encrypted by the above-described encrypting processing means and the above-described displaying means displays the above-described formed barcode data.

Even if a third person illegally reads the barcode against the will of the portable terminal user, for example, this configuration prevents barcode information from being decrypted without the encryption key, thus improving the security.

The portable terminal of the present invention comprises receiving means for receiving signals sent by radio, barcode forming means for forming barcodes, displaying means and local radio communicating means. constructed in such a way that the local radio communicating means searches for the received identification information from the data received by the above-described receiving means and the above-described displaying means displays the searched data as a barcode.

This configuration allows an appropriate barcode to be displayed without the need for the portable terminal user to perform a selection operation, and therefore using this configuration for electronic commerce can facilitate settlement.

The electronic commerce system of the present invention comprises a portable terminal, an information transmission apparatus that sends product information or service information to the portable terminal and a distribution control apparatus that controls electronic commercial transaction information, constructed in such away that the above-described portable terminal receives product information or service information through the above-described information transmission apparatus and receives auxiliary information on the above-described product information or the above-described service information front the above-described distribution control apparatus.

This configuration makes it possible to receive general information such as the type and price of the product from the information transmission apparatus by radio through unidirectional transmission and receive detailed information from the distribution control apparatus over the Internet through bi-directional communication, allowing a large amount of product information or service information to be received more conveniently and more effectively.

The electronic commerce system of the present invention is constructed in such a way that the above-described product information or service information sent by said information transmission apparatus is broadcast signals and the above-described portable terminal performs bi-directional communication with the above-described distribution control apparatus.

The electronic commerce system of the present invention is constructed in such a way that the above-described auxiliary information is information suitable for the portable terminal or the portable terminal user.

The electronic commerce system of the present invention comprises a portable terminal, a shop terminal equipped with a barcode reader provided at the shop where products are delivered and a distribution control apparatus that controls electronic commercial transaction information, constructed in such a way that the above-described portable terminal displays product information, service information or transaction related information received from the above-described distribution control apparatus with barcodes, the above-described barcode reader reads barcodes displayed on the portable terminal and the above-described shop terminal or the above-described distribution control apparatus executes settlement based on the barcode information read by the barcode reader.

The electronic commerce system of the present invention comprises a portable terminal, a shop terminal equipped with a barcode reader and collating apparatus provided at the shop where products are delivered and an information transmission apparatus that transmits product information by radio, constructed in such a way that the above-described information transmission apparatus sends the above-described product information by radio to both the above-described portable terminal and the above-described shop terminal, the above-described portable terminal displays data according to the received product information on the display section as a barcode, the above-described shop terminal reads the barcode displayed by the above-described barcode reader on the portable terminal and the above-described collating apparatus collates the information of the barcode read by the barcode reader with the product information received from the above-described information transmission apparatus.

These configurations allow commercial transaction to be conducted speedily and easily.

The electronic commerce system of the present invention comprises a portable terminal, a shop terminal equipped with a barcode reader and collating apparatus provided at the shop where products are delivered and an information transmission apparatus that transmits product information or service information to the above-described portable terminal and a distribution control apparatus that controls electronic commercial transaction information, constructed in such a way that the above-described portable terminal displays the product information received front the above-described information transmission apparatus or information on the product selected by the portable terminal user as-a barcode, the above-described barcode reader reads the barcode displayed on the portable terminal, the above-described collating apparatus collates the information of the barcode read by the barcode reader with the control information sent from the above-described distribution control apparatus, sends the commercial transaction information to the above-described distribution control apparatus and the above-described distribution control apparatus changes the control information based on the commercial transaction information.

This configuration allows the portable terminal user to make a reservation for purchasing a product or service easily from anywhere. This configuration also makes it possible to display the product or service purchased or reserved on the display section of the portable terminal with a barcode without the need to orally inform the purchase or reservation data or printing it on paper, read the barcode with a barcode reader and collate it with a collating apparatus, thus providing a simple way of purchasing a product or service. This provides instantaneous authentication and speedy purchase of a product or service.

The electronic commerce system of the present invention is constructed in such a way that the information transmission apparatus sends product or service information according to the position of the portable terminal or time to the portable terminal.

This configuration can actually send product or service information necessary for the portable terminal user to the portable terminal, allowing the user to purchase or reserve the desired product or service easily.

The electronic commerce system of the present invention is constructed in such a way that the shop terminal has a database and the distribution control apparatus stores product or service information selected by the portable terminal user in the shop database selected by the portable terminal user.

When the portable terminal user purchases or reserves (selects) a product or service, the information is stored in the database of the selected shop, and therefore this configuration allows speedy authentication of data read from the barcode used when the portable terminal user visits the shop and purchases the product or service.

The electronic commerce system of the present invention is constructed in such a way that the service information sent from the information transmission apparatus to the portable terminal includes an electricity bill, telephone bill, gas bill or water bill.

According to this configuration, the barcode of the portable terminal displays an electricity bill, telephone bill, gas bill or water bill, the shop terminal provided at a convenience store, etc. reads this barcode, sends it to a distribution control apparatus provided at an electric company, gas company or water service company, thereby allowing the user to pay the above-described bills easily.

The electronic commerce system of the present invention is constructed in such a way that the portable terminal displays encrypted product or service information as a barcode.

Even if a third person illegally reads the barcode against the will of the portable terminal user, for example, this configuration prevents barcode information from being decrypted without the encryption key, thus improving the security.

The electronic commerce system of the present invention comprises a portable terminal and a shop terminal equipped with a barcode reader provided at a shop where products are delivered, constructed in such a way that the above-described portable terminal includes a reading section that reads information stored in a bridge medium, reads product information stored in the above-described bridge medium, displays the information on the above-described product information on the display section as a barcode, the above-described shop terminal reads the barcode displayed on the above-described portable terminal from the above-described barcode reader and conducts commercial transaction based on the read information.

This configuration allows commercial transaction to be conducted speedily and easily.

The electronic commerce system of the present invention is constructed in such a way that the above-described bridge medium includes encryption processing means and the above-described portable terminal reads encrypted product information and displays the encrypted product information with a barcode.

The electronic commerce system of the present invention comprises a portable terminal, a shop terminal equipped with a barcode reader and a collating apparatus provided at a shop where products are delivered, an information transmission apparatus that transmits product information to the above-described portable terminal and a distribution control apparatus that controls electronic commercial transaction information, constructed in such a way that the above-described distribution control apparatus sends a product purchasing program and product information in storage to the above-described portable terminal through the above-described information transmission apparatus, the above-described portable terminal displays the product related information formed according to the above-described received product purchasing program and product information on the display section, displays the product related information selected by the portable terminal user with reference to the product related information displayed on the display section as a barcode on the display section, the above-described barcode reader reads the barcode displayed on the portable terminal, the above-described collating apparatus collates the barcode information read by the barcode reader with the control information sent from the above-described distribution control apparatus.

This configuration allows the portable terminal user to see product related information(e.g., discounted product prices) formed sequentially according to the own selection according to the product purchasing program to select the product related information of preferences in the end. Then, the selected product related information is displayed as a barcode. The portable terminal user lets the shop terminal read the barcode and if the barcode information matches the information in the shop terminal, commercial transaction is established. This allows commercial transaction to be completed using only the downlink without using the uplink to the information transmission apparatus, allowing the system to be applicable to a portable TV with no transmission function, for example.

The electronic commerce system of the present invention uses data displayed with a barcode as electronic money.

With this configuration, it is possible to conduct settlement easily by reading the barcode.

The electronic commerce system of the present invention is an electronic commerce system comprising a portable terminal, a shop terminal and a distribution control apparatus, constructed in such a way that processing of purchase ordering of a product or service is performed with the distribution control apparatus beforehand, the shop terminal receives information necessary for settlement processing from the distribution control apparatus beforehand when the portable terminal user visits the shop to conduct settlement processing, and displays information necessary for settlement processing on the display section of the portable terminal as a barcode when the portable terminal user visits the shop, the barcode reader at the shop terminal reads the barcode, collates the content of the barcode read with the information necessary for the settlement processing received by the shop terminal beforehand and conducts settlement processing.

This configuration allows the portable terminal user to purchase or make a reservation for a product or service easily from anywhere. This configuration also makes it possible to display the product or service purchased or reserved on the display section of the portable terminal with a barcode without the need to orally inform the purchase or reservation data or printing it on paper, read the barcode using a barcode reader at the shop terminal and collate the read information with the information received by the shop terminal from the distribution control apparatus beforehand using a collating apparatus, thus providing a simple and speedy way of settlement.

The electronic commerce system of the present invention is constructed in such away that the information necessary for settlement processing includes time information when purchase order processing is conducted between the portable terminal and distribution control apparatus.

According to this configuration, time information becomes the information that can only be shared by the portable terminal and the shop terminal, making it impossible for other portable terminals to conduct settlement, thus improving the security of electronic commerce.

The electronic commerce system of the present invention is constructed in such a way that the portable terminal encrypts information necessary for settlement processing and displays the encrypted information with a barcode.

Even if a third person illegally reads the barcode against the will of the portable terminal user, for example, this configuration prevents barcode information from being decrypted without the encryption key, thus improving the security.

The electronic commerce system of the present invention is constructed in such a way that the distribution control apparatus encrypts information necessary for settlement processing using a predetermined encryption key and sends the encrypted information to the portable terminal, the portable terminal displays the information necessary for the encrypted settlement with a barcode, the shop terminal sends the information read from the barcode to the distribution control apparatus, the distribution control apparatus decrypts the information received from the shop terminal using the own encryption key and authenticates the settlement.

In the case where the information necessary for settlement processing includes personal cellular phone numbers or URLs, etc., even if the barcode including this information is read by the shop terminal, the shop terminal cannot decode this information, and this configuration can thereby protect privacy.

The electronic commerce system of the present invention is constructed in such a way that the distribution control apparatus adds signature data to information necessary for settlement and sends the information to the portable terminal and shop terminal.

Since settlement cannot be conducted unless the signature data matches, this configuration can further improve the security.

The electronic commerce system of the present invention is constructed in such a way that the portable terminal and shop terminal can directly communicate with each other by radio and the shop terminal rewrites the balance data after settlement of the portable terminal by radio.

This configuration makes it possible to rewrite the balance data of the portable terminal speedily.

The admission control system of the present invention comprises a portable terminal owned by an applicant for admission, an admission control terminal equipped with a barcode reader and collating apparatus provided at the entrance and an information transmission apparatus that transmits admission information to the portable terminal, and is constructed in such a way that the portable terminal displays the admission information received by radio from the information transmission apparatus as a barcode, the admission control terminal admits the entry of admission applicant according to the barcode information displayed on the portable terminal.

This configuration allows the admission applicant to simply acquire admission data which is substitutable for an admission ticket anywhere at any time, display this with a barcode and acquire admission by simply reading the barcode with the admission control terminal, thus facilitating the admission to the desired place.

The admission control system of the present invention is constructed in such a way that the admission control terminal further comprises communicating means for radio communication with the portable terminal and admits the entry of the applicant according to the radio communication information with the portable terminal in addition to the barcode.

This configuration is effective when the amount of information displayed on the barcode is large.

The local radio system of the present invention is a local radio system comprising a first communication terminal and a second communication terminal capable of communicating with the above-described first communication terminal and equipped with a barcode reader, constructed in such a way that the display section of the above-described first communication terminal displays the identification information of the first communication terminal with a barcode, the above-described second communication terminal reads the barcode displayed by the above-described barcode reader, searches for the above-described first communication terminal indicated by the above-described identification information from a plurality of communication terminals and carries out radio communication with the above-described first communication terminal.

This configuration makes it possible to selectively carry out local radio communication from among a plurality of communication terminals. Since a communication is established only between the communication terminal that has displayed the barcode and the communication terminal that has read the barcode, and can thereby allow local radio communication with extremely high confidentiality.

The local radio system of the present invention is constructed in such a way that the barcode displayed by the first communication terminal is a two-dimensional barcode.

The present invention is not limited to the above described embodiments, and various variations and modifications may be possible without departing from the scope of the present invention.

This application is based on the Japanese Patent Application No. 2000-371539 filed on Dec. 6, 2000, the Japanese Patent Application No. 2000-371570 filed on Dec. 6, 2000 and the Japanese Patent Application No. 2000-403517 filed on Dec. 28, 2000, entire content of which is expressly incorporated by reference herein.

What is claimed is:

1. A portable terminal, comprising:

a receiver configured to receive data;

a barcode former configured to form barcode data from the received data, the barcode data including a plurality of display barcodes, information representing the display order of the plurality of display barcodes, information representing a total number of the plurality of display barcodes and information representing an end of the display of the plurality of display barcodes, each of the display barcodes is displayed with predetermined non-display periods between display periods of the display barcodes;

a display configured to display, in order, the display barcodes included in the barcode data; and a detector configured to detect light or a signal from a barcode reader, wherein the display is switched, from the currently displayed display barcode to the display barcode next in the display order, according to the detection result of the detector.

2. The portable terminal according to claim 1, wherein the light or the signal includes information from which the detector can determine that the barcode reader has completed reading of the displayed barcode.

*3. A portable terminal comprising, control circuitry, communication circuitry, and a storage device, the control circuitry operable to:*

*acquire, from a service provider via the communication circuitry, ticket information, a start time, and place information related to a facility, the ticket information permitting a user of the portable terminal to utilize the facility, the start time indicating a time from when the facility is scheduled to start operating;*

*store, in the storage device, the ticket information, the start time and the place information; and*

*control the portable terminal to issue a notification to the portable terminal a predetermined time before the start time using the stored start time, without using the stored place information,*

*wherein the ticket information comprises transportation information,*

*the facility comprises a transportation vehicle,*

*the start time comprises a departure time of the transportation vehicle, and*

*the place information related to the facility comprises a corresponding ticket gate within a transport station.*

*4. The portable terminal according to claim 3, wherein*

*the transportation information comprises an airplane ticket,*

*the transportation vehicle comprises an airplane,*

*the start time comprises a departure time of the airplane, and*

*the place information related to the facility comprises a corresponding boarding gate within an airport.*

*5. A portable terminal comprising, control circuitry, communication circuitry, and a storage device, the control circuitry operable to:*

*acquire, from a service provider via the communication circuitry, ticket information, a start time, and place information related to a facility, the ticket information permitting a user of the portable terminal to utilize the facility, the start time indicating a time from when an event at the facility is scheduled to start;*

*store, in the storage device, the ticket information, the start time and the place information; and*

*control the portable terminal to issue a notification to the portable terminal a predetermined time before the start time using the stored start time, without using the stored place information,*

*wherein the ticket information comprises information for an amusement event at an amusement venue*

*the facility comprises the amusement venue, and*

*the start time comprises a start time of the amusement event.*

*6. The portable terminal according to claim 3, wherein*

*the control circuitry is operable to control the portable terminal to issue the notification, by a speaker which is part of the portable terminal, at said predetermined time.*

*7. The portable terminal according to claim 3, wherein*

*the control circuitry is operable to control the portable terminal to issue the notification, by a vibrator which is part of the portable terminal, at said predetermined time.*

*8. A control circuit that is configured to be connected to a storage device, and to communication circuitry, the control circuit being configured to:*

*acquire, from a service provider via the communication circuitry, ticket information, a start time and place information related to a facility, the ticket information permitting a user of the portable terminal to utilize the facility, the start time indicating a time from when the facility is scheduled to start operating;*

*store, in the storage device, the ticket information, the start time and the place information; and*

*control the portable terminal to issue a notification to the portable terminal a predetermined time before the start time using the stored start time, without using the stored place information,*

*wherein the ticket information comprises transportation information,*

*the facility comprises a transportation vehicle,*

*the start time comprises a departure time of the transportation vehicle, and*

*the place information related to the facility comprises a corresponding ticket gate within a transport station.*

*9. The control circuit according to claim 8, wherein*

*the transportation information comprises an airplane ticket,*

*the transportation vehicle comprises an airplane,*

*the start time comprises a departure time of the airplane, and*

*the place information related to the facility comprises a corresponding boarding gate within an airport.*

*10. A control circuit that is configured to be connected to a storage device, and to communication circuitry, the control circuit being configured to:*

*acquire, from a service provider via the communication circuitry, ticket information, a start time and place information related to a facility, the ticket information permitting a user of the portable terminal to utilize the facility, the start time indicating a time from when the facility is scheduled to start;*

*store, in the storage device, the ticket information, the start time and the place information; and*

*control the portable terminal to issue a notification to the portable terminal a predetermined time before the start time using the stored start time, without using the stored place information,*

*wherein*

*the ticket information comprises information for an amusement event at an amusement venue,*

*the facility comprises the amusement venue, and*

*the start time comprises a start time of the amusement event.*

*11. The control circuit according to claim 8, wherein*

*the control circuitry is configured to control the portable terminal to issue the notification, by a speaker which is part of the portable terminal, at said predetermined time.*

*12. The control circuit according to claim 8, wherein*

*the control circuitry is configured to control the portable terminal to issue the notification, by a vibrator which is part of the portable terminal, at said predetermined time.*

*13. The portable terminal according to claim 3, wherein*

*the transportation information includes the start time.*

*14. The portable terminal according to claim 3, further comprising a display, wherein*

*the controller controls the display to display the transportation information on the display, the transportation information being displayed at the display as a scannable ticket.*

*15. The portable terminal according to claim 14, wherein*

*the scannable ticket displayed at the display is generated based on the transportation information.*

*16. The control circuit according to claim 8, wherein*

*the transportation information includes the start time.*

*17. The control circuit according to claim 8, further comprising a display, wherein*

*the controller controls the display to display the transportation information on the display, the transportation information being displayed at the display as a scannable ticket.*

*18. The control circuit according to claim 14 wherein*

*the scannable ticket displayed at the display is generated based on the transportation information.*

*19. The portable terminal according to claim 5, further comprising a display, wherein*

*the controller controls the display to display the information for the amusement event on the display, the information for the amusement event being displayed at the display as a scannable ticket.*

*20. The control circuit according to claim 10, further comprising a display, wherein*

*the controller controls the display to display the information for the amusement event on the display, the information for the amusement event being displayed at the display as a scannable ticket.*

* * * * *